(12) United States Patent
Makino et al.

(10) Patent No.: US 9,935,305 B2
(45) Date of Patent: Apr. 3, 2018

(54) SECONDARY BATTERY FOR LARGE CURRENT CHARGE AND DISCHARGE CHARACTERISTIC

(75) Inventors: Tetsuya Makino, Fukushima (JP); Hiroshi Takabayashi, Fukushima (JP); Tomoyuki Nakamura, Fukushima (JP); Kunihiko Hayashi, Fukushima (JP); Yosuke Konishi, Fukushima (JP); Akira Sasaki, Fukushima (JP); Akira Saito, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 803 days.

(21) Appl. No.: 13/293,738

(22) Filed: Nov. 10, 2011

(65) Prior Publication Data

US 2012/0121965 A1 May 17, 2012

(30) Foreign Application Priority Data

Nov. 17, 2010 (JP) ................... 2010-257350
Jun. 17, 2011 (JP) ................... 2011-135752

(51) Int. Cl.
*H01M 2/06* (2006.01)
*H01M 2/10* (2006.01)
(Continued)

(52) U.S. Cl.
CPC .............. *H01M 2/22* (2013.01); *H01M 4/70* (2013.01); *H01M 2004/021* (2013.01); *H01M 2220/30* (2013.01)

(58) Field of Classification Search
CPC .................. H01M 2/22; H01M 4/70
See application file for complete search history.

(56) References Cited

U.S. PATENT DOCUMENTS 6,515,449 B1 2/2003 Thomas et al.
2001/0019797 A1* 9/2001 Kezuka et al. ............... 429/161
(Continued)

FOREIGN PATENT DOCUMENTS

JP 2001-102033 4/2001
JP 2002-270241 9/2002
(Continued)

OTHER PUBLICATIONS

Reasons for refusal notice issued in connection with Japanese Patent Application No. 2011-135752, dated Sep. 9, 2014. (3 pages).
(Continued)

*Primary Examiner* — Stephan Essex
(74) *Attorney, Agent, or Firm* — Chip Law Group

(57) ABSTRACT

There is provided a secondary battery including a battery device that has a thickness of 3 to 20 mm, and a battery discharge capacity of 3 to 50 Ah, and an exterior material that packages the battery device. The battery device includes a positive electrode that has a positive electrode current collector and a positive electrode active material layer, a negative electrode that has a negative electrode current collector and a negative electrode active material layer, a separator that is interposed between the positive electrode and the negative electrode that are alternately laminated, a positive electrode tab that is electrically connected to a positive electrode current collector exposed portion and is led-out to the outside of the exterior material, and a negative electrode tab that is electrically connected to a negative electrode current collector exposed portion and is led-out to the outside of the exterior material.

15 Claims, 37 Drawing Sheets

(51) Int. Cl.
   *H01M 4/64*   (2006.01)
   *H01M 2/22*   (2006.01)
   *H01M 4/70*   (2006.01)
   *H01M 4/02*   (2006.01)

(56) References Cited

U.S. PATENT DOCUMENTS

| | | | |
|---|---|---|---|
| 2002/0160263 A1* | 10/2002 | Corrigan et al. | 429/209 |
| 2005/0132562 A1* | 6/2005 | Saito | H01M 4/0404 29/623.5 |
| 2006/0115722 A1* | 6/2006 | Kim | 429/161 |
| 2006/0188777 A1* | 8/2006 | Kaneta | 429/128 |
| 2007/0196732 A1* | 8/2007 | Tatebayashi et al. | 429/181 |
| 2008/0241680 A1* | 10/2008 | Lee | H01M 2/021 429/185 |
| 2010/0055558 A1* | 3/2010 | Choi et al. | 429/162 |

FOREIGN PATENT DOCUMENTS

| | | |
|---|---|---|
| JP | 2003-178747 | 6/2003 |
| JP | 2003-229117 | 8/2003 |
| JP | 2006-252855 | 9/2006 |
| JP | 2006-252855 A | 9/2006 |
| JP | 2007-227090 | 9/2007 |
| KR | 10-2007-0099430 A | 10/2007 |
| KR | 10-2007-0105118 A | 10/2007 |

OTHER PUBLICATIONS

Office Action for KR Patent Application No. 10-2011-0111490, dated Oct. 20, 2017, 11 pages of Office Action and 11 pages of English Translation.

\* cited by examiner

SECONDARY BATTERY FOR LARGE CURRENT CHARGE AND DISCHARGE CHARACTERISTIC

CROSS REFERENCES TO RELATED APPLICATIONS

The present application claims priority to Japanese Patent Application No. 2010-257350 filed on Nov. 17, 2010, and Japanese Patent Application No. P2011-135752 filed on Jun. 17, 2011, the disclosures of which are incorporated herein by reference.

BACKGROUND

The present disclosure relates to a secondary battery, a battery unit, and a battery module, and more particularly, to a secondary battery, a battery unit, and a battery module that have a large current charge and discharge characteristic.

In recent years, a portable electronic apparatus such as a camera-integrated VTR (Video Tape Recorder), a cellular phone, and a notebook PC have become wide spread and weight reduction of such an apparatus has been attempted. With respect to batteries, especially, secondary batteries, which are used as a portable power source of such an electronic apparatus, research and development have been actively performed in order to improve an energy density thereof.

Among secondary batteries using nonaqueous electrolytic solution, in a lithium ion secondary battery, a large energy density may be obtained, compared to a lead battery and a nickel-cadmium battery that are aqueous electrolytic solution secondary batteries in the related art, such that a market has growing significantly. Particularly, recently, a light weight characteristic and a high energy density characteristic of the lithium ion secondary battery are suitable for an electric tool, an electric automobile or a hybrid electric automobile, and an electric assisted bicycle, such that an increase in size and a high output of the secondary battery has been energetically reviewed for the application to such a vehicle.

A nonaqueous based secondary battery represented by a lithium ion secondary battery includes a plurality of positive electrodes and negative electrodes with separators interposed therebetween, and a tab connected to each of the positive electrodes and the negative electrodes. Commonly, the tab, and a positive electrode terminal (negative electrode terminal) interposed between the tab and the positive electrode (negative electrode) have a width thinner than that of the positive electrode (negative electrode) (Japanese Patent Unexamined Patent Application Publication No. 2003-178747).

SUMMARY

For realizing a high output of a secondary battery, it is necessary for the secondary battery to have a large current charge and discharge characteristic. However, in the secondary battery including a tab or a terminal that has a width thinner than that of a positive electrode and a negative electrode as disclosed in Japanese Patent Unexamined Patent Application Publication No. 2003-178747, an amount of input and output current is restricted, such that it is difficult to cope with a large current input and output. Therefore, in a secondary battery adopting such a configuration, there is a restriction realizing high output.

Therefore, it is desirable to provide a secondary battery, a battery unit, and a battery module that have a large current charge and discharge characteristic.

According to an embodiment of the present disclosure, there is provided a secondary battery including a battery device that has a thickness of 3 to 20 mm, and a battery discharge capacity of 3 to 50 Ah; and an exterior material that packages the battery device. The battery device includes, a positive electrode that has a positive electrode current collector, and a positive electrode active material layer, in which the positive electrode active material layer is formed on the positive electrode current collector in such a manner a positive electrode current collector exposed portion is formed and a width we of the positive electrode current collector exposed portion and a width We of the positive electrode active material layer satisfy the following equation (1), a negative electrode that has a negative electrode current collector, and a negative electrode active material layer, in which the negative electrode active material layer is formed on the negative electrode current collector in such a manner a negative electrode current collector exposed portion is formed and a width wa of the negative electrode current collector exposed portion and a width Wa of the negative electrode active material layer satisfy the following equation (2), separators that are interposed between the positive electrodes and the negative electrodes that are alternately laminated, a positive electrode tab that is electrically connected to the positive electrode current collector exposed portion and is led-out to the outside of the exterior material, and a negative electrode tab that is electrically connected to the negative electrode current collector exposed portion and is led-out to the outside of the exterior material.

$$0.5 < (wc/Wc) \leq 1.0 \tag{1}$$

$$0.5 < (wa/Wa) \leq 1.0 \tag{2}$$

According to another embodiment of the present disclosure, there is provided a battery unit including a set of secondary batteries; and a supporting member that has an outer peripheral wall portion surrounding an outer peripheral side surface of the set of secondary batteries. The set of secondary batteries are inserted into the outer peripheral wall portion from a front side and a rear side of the supporting member, respectively. Each of the secondary batteries includes a battery device having a thickness of 3 to 20 mm and a battery discharge capacity of 3 to 50 Ah, and an exterior material that packages the battery device. The battery device includes a positive electrode that has a positive electrode current collector, and a positive electrode active material layer, in which the positive electrode active material layer is formed on the positive electrode current collector in such a manner a positive electrode current collector exposed portion is formed and a width we of the positive electrode current collector exposed portion and a width We of the positive electrode active material layer satisfy the following equation (7), a negative electrode that has a negative electrode current collector, and a negative electrode active material layer, in which the negative electrode active material layer is formed on the negative electrode current collector in such a manner a negative electrode current collector exposed portion is formed and a width wa of the negative electrode current collector exposed portion and a width Wa of the negative electrode active material layer satisfy the following equation (8), a separator that is interposed between the positive electrode and the negative electrode that are alternately laminated, a positive electrode tab that is electrically connected to the positive electrode current collector exposed portion and is led-out to the outside of the exterior material, and a negative electrode tab that is electrically connected to the negative electrode current collector exposed portion and is led-out to the outside of the exterior material.

$$0.5<(wc/Wc)\leq 1.0 \quad (7)$$

$$0.5<(wa/Wa)\leq 1.0 \quad (8)$$

According to still another embodiment of the present disclosure, there is provided a battery module including a plurality of battery units. Each of the battery units includes a set of secondary batteries and a supporting member that has an outer peripheral wall portion surrounding an outer periphery side surface of the set of secondary batteries, the set of secondary batteries are inserted into the outer peripheral wall portion from a front side and a rear side of the supporting member, respectively. The secondary battery includes a battery device having a thickness of 3 to 20 mm and a battery discharge capacity of 3 to 50 Ah, and an exterior material that packages the battery device. The battery device includes a positive electrode that has a positive electrode current collector, and a positive electrode active material layer, in which the positive electrode active material layer is formed on the positive electrode current collector in such a manner a positive electrode current collector exposed portion is formed and a width we of the positive electrode current collector exposed portion and a width Wc of the positive electrode active material layer satisfy the following equation (9), a negative electrode that has a negative electrode current collector, and a negative electrode active material layer, in which the negative electrode active material layer is formed on the negative electrode current collector in such a manner a negative electrode current collector exposed portion is formed and a width wa of the negative electrode current collector exposed portion and a width Wa of the negative electrode active material layer satisfy the following equation (10), a separator that is interposed between the positive electrode and the negative electrode that are alternately laminated, a positive electrode tab that is electrically connected to the positive electrode current collector exposed portion and is led-out to the outside of the exterior material, and a negative electrode tab that is electrically connected to the negative electrode current collector exposed portion and is led-out to the outside of the exterior material.

$$0.5<(wc/Wc)\leq 1.0 \quad (9)$$

$$0.5<(wa/Wa)\leq 1.0 \quad (10)$$

According to the embodiment of the present disclosure, the battery device has a thickness of 3 to 20 mm, and a battery discharge capacity of 3 to 50 Ah. When the thickness of the battery device is less than 3 mm, the used proportion of the total volume of the battery device decreases, such that the energy density decreases. In addition, when the thickness of the battery device exceeds 20 mm, heat dissipation of the battery device decreases, such that there is a concern that a life cycle duration during which charge and discharge is repeated may decrease. When the discharge capacity is less than 3 Ah, a rate characteristic is secured without taking the above-described structure.

Furthermore, the positive electrode is formed in such a manner that the width we of the positive electrode current collector exposed portion and the width We of the positive electrode active material layer satisfy the following equation (1) and, the negative electrode is formed in such a manner that the width wa of the negative electrode current collector exposed portion and the width Wa of the negative electrode active material layer satisfy the following equation (2), such that input and output of a large current may be realized.

$$0.5<(wc/Wc)\leq 1.0 \quad (1)$$

$$0.5<(wa/Wa)\leq 1.0 \quad (2)$$

As described above, according to the embodiments of the present disclosure, an input and output of a large current is realized, such that an additional high output of the secondary battery can be realized. Therefore, for example, the secondary battery may be used as a secondary battery that is used in an electric automobile, a hybrid electric automobile, or the like that uses a plurality of secondary batteries which are combined to obtain a high output.

Additional features and advantages are described herein, and will be apparent from the following Detailed Description and the figures.

DETAILED DESCRIPTION

Embodiments of the present disclosure will be described with reference to the attached drawings in the following order.

First Embodiment (example where a positive electrode and a negative electrode are laminated with each separator interposed therebetween)

Second Embodiment (example where a positive electrode and a negative electrode are laminated with one sheet of strip-shaped separator folded in a zigzag fashion interposed therebetween)

Third Embodiment (example where a positive electrode and a negative electrode are laminated with a pair of separators interposed therebetween, in which the pair of separators are folded in a zigzag fashion with a negative electrode interposed therebetween)

Fourth Embodiment (example where a positive electrode tab and a negative electrode tab are lead-out from the same side surface)

Fifth Embodiment (a battery unit and a battery module that use a secondary battery)

First Embodiment

Configuration of Secondary Battery

Figure 1A:
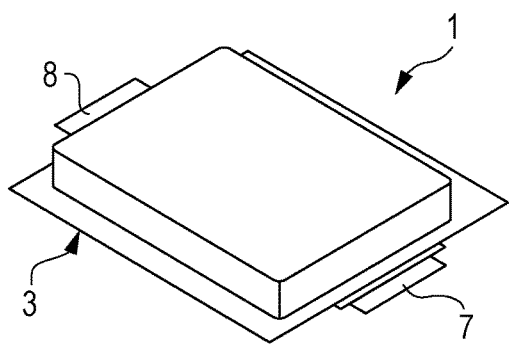
FIG. 1A is an exterior perspective view illustrating a first configuration example of a secondary battery according to a first embodiment of the present disclosure.
Figure 1B:
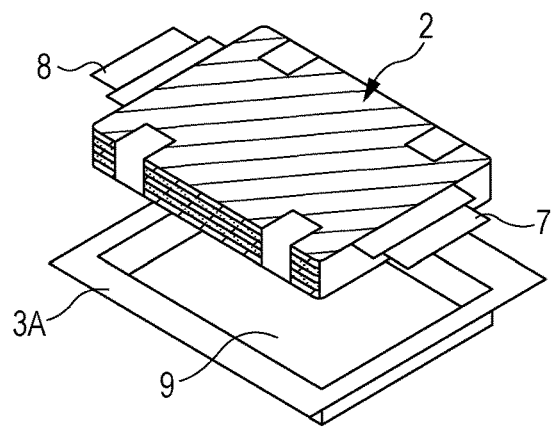
FIG. 1B is a schematic diagram illustrating a configuration of the secondary battery.
Figure 1C:
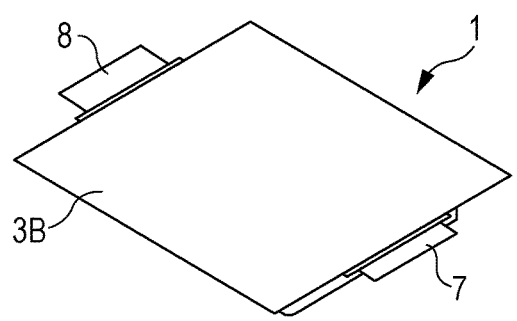
FIG. 1C is an exterior perspective view illustrating an exterior bottom side of the secondary battery.
Figure 1D:
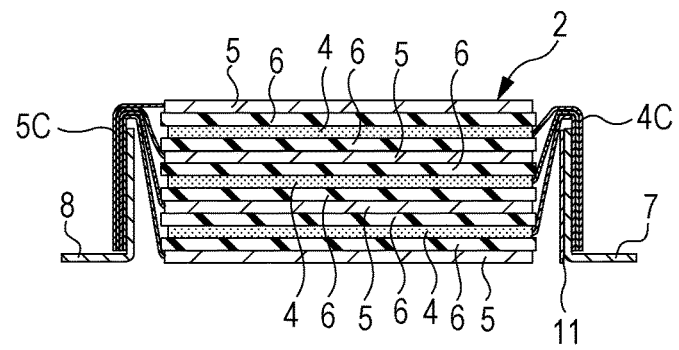
FIG. 1D is a side view of a battery device packaged by an exterior material.

FIG. 1A shows a schematic diagram illustrating an exterior appearance of a nonaqueous electrolyte battery (hereinafter, appropriately referred to as a secondary battery 1) according to a first embodiment of the present disclosure, FIG. 1B shows a schematic diagram illustrating a configuration of the secondary battery 1. In addition, FIG. 1B shows a configuration of the secondary battery 1 shown in FIG. 1A in a case where the top surface and the bottom surface are reversed. In addition, FIG. 1C shows a schematic diagram illustrating an exterior bottom side of the secondary battery 1. The secondary battery 1 is a so-called lithium ion secondary battery, and includes a battery device 2 and an exterior material 3. FIG. 1D shows a side view of the battery device 2 packaged by the exterior material 3. The exterior material 3 includes a first exterior material 3A that accommodates the battery device 2, and a second exterior material 3B that functions as a lid covering the battery device 2. The thickness of the battery device 2 is 3 to 20 mm, and a discharge capacity thereof is 3 to 50 Ah. When the thickness of the battery device 2 is less than 3 mm, the used proportion of the total volume of the battery device 2 decreases, such that the energy density decreases. In addition, when the thickness of the battery device 2 exceeds 20 mm, heat dissipation of the battery device 2 decreases, such that there is a concern that a life cycle duration during which charge and discharge is repeated may decrease. When the discharge capacity is less than 3 Ah, a rate characteristic is secured without taking the above-described structure.

The battery device 2 has a lamination type electrode structure in which a positive electrode 4 that has an approximately rectangular shape and negative electrodes 5 that are disposed to be opposite to the positive electrodes 4 and have an approximately rectangular shape are laminated alternately with separators 6 interposed therebetween. In addition, a positive electrode current collector exposed portion 4C that is electrically connected to each of plural sheets of positive electrodes 4, and a negative electrode current collector exposed portion 5C that is electrically connected to each of plural sheets of negative electrodes 5 are lead-out from the battery device 2. A positive electrode tab 7 and a negative electrode tab 8 are connected to the positive electrode current collector exposed portion 4C and the negative electrode current collector exposed portion 5C, respectively. In addition, the positive electrode current collector exposed portion 4C and the negative electrode current collector exposed portion 5C are bent in such a manner that a cross-section thereof has an approximate U-shape.

The battery device 2 is packaged by the exterior material 3, and the positive electrode tab 7 and the negative electrode tab 8, which are connected to the positive electrode current collector exposed portion 4C and the negative electrode current collector exposed portion 5C, respectively, are lead-out from a sealing portion of the exterior material 3 to the outside of the secondary battery 1. A concave portion is formed in advance in one surface or both surfaces of the exterior material 3 by a deep drawing, and the battery device 2 is accommodated in this concave portion. In FIG. 1B, a first exterior material 3A making up the exterior material 3 has the concave portion 9, and the battery device 2 is accommodated in the concave portion 9. A second exterior material 3B is disposed to cover an opening of the concave portion 9, and the periphery of the opening of the concave portion 9 is bonded through thermal fusion or the like and is sealed. The positive electrode tab 7 and the negative electrode tab 8, which are connected to the positive electrode current collector exposed portion 4C and the negative electrode current collector exposed portion 5C, respectively, are lead-out from a sealed portion of the exterior material 3 to the outside in directions different from each other.

Positive Electrode

Figure 2B:
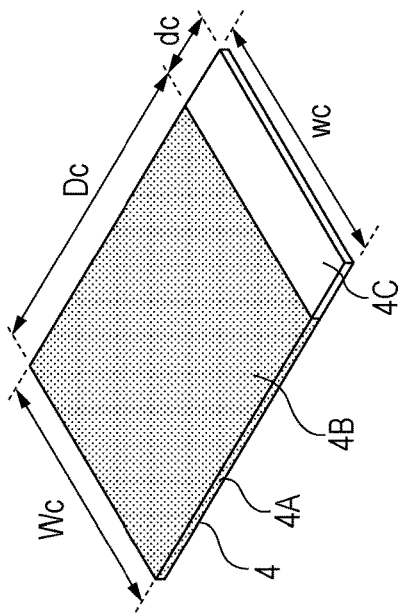
FIGS. 2A and 2B are schematic diagrams illustrating a configuration example of a positive electrode used in the secondary battery according to the first embodiment of the present disclosure.
Figure 2D:
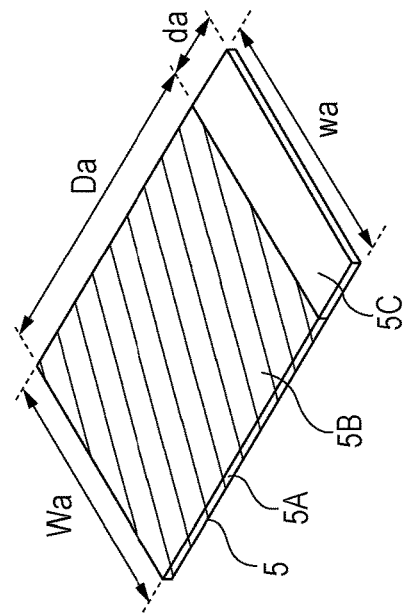
FIGS. 2C and 2D are schematic diagrams illustrating a configuration example of a negative electrode used in the secondary battery according to the first embodiment of the present disclosure.
Figure 2A:
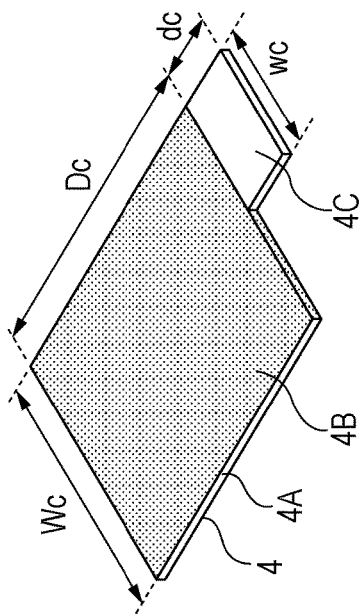
Figure 2C:
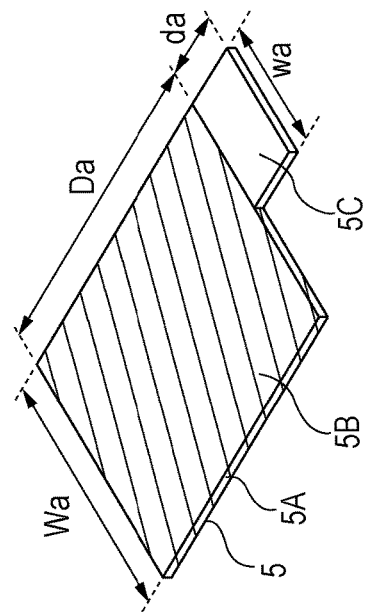

FIGS. 2A and 2B show schematic diagrams illustrating a structure of the positive electrode 4 making up the battery device 2. FIGS. 2C and 2D show schematic diagrams illustrating a structure of the negative electrode 5 making up the battery device 2. For example, the positive electrode 4 has a structure in which the positive electrode active material layer 4B is provided on both surfaces of the positive electrode current collector 4A. In addition, although not shown in the drawing, the positive electrode active material layer 4B may be provided only one surface of the positive electrode current collector 4A.

In the embodiment of the present disclosure, the positive electrode active material layer 4B is formed in such a manner that the positive electrode current collector exposed portion 4C having a depth of a predetermined dimension is formed on the both surfaces of the positive electrode current collector 4A, not being provided on the entirety of both surfaces of the positive electrode current collector 4A. The positive electrode current collector exposed portion 4C serves as a positive electrode terminal. A width we of the positive electrode current collector exposed portion 4C (in FIGS. 2A and 2B, a dimension of the positive electrode current collector exposed portion 4C in a longitudinal direction) and a width We of the positive electrode active material layer 4B (in FIGS. 2A and 2B, a dimension of the positive electrode active material layer 4B in a lateral direction) are configured to satisfy the following equation (1).

$$0.5 < (wc/Wc) \leq 1.0 \tag{1}$$

In equation (1), when $0.5 < (wc/Wc)$, this indicates that a width of the positive electrode current collector exposed portion 4C is larger than a half of the width of the positive electrode active material layer 4B. FIG. 2A illustrates a case where $(wc/Wc)=0.5$.

In addition, in equation (1), when $(wc/Wc)=1.0$, this indicates that the width of the positive electrode current collector exposed portion 4C is the same as the width of the positive electrode active material layer 4B. FIG. 2B illustrates a case where $(wc/Wc)=1.0$. In this way, in the embodiment of the present disclosure, the width of the positive electrode current collector exposed portion 4C as a positive electrode terminal is configured to be larger than that of a battery in the related art. When the width of the positive electrode current collector exposed portion 4C is configured to be large, an input and output of a large current may be realized. In addition, when the width of the positive electrode current collector exposed portion 4C and the width of the positive electrode active material layer 4B become the same as each other, in regard to a manufacturing process of the positive electrode 4, a process such as a punching process or a cutting process for making the positive electrode current collector exposed portion 4C thin is not necessary, such that it is possible to make a manufacturing process simple.

In addition, the positive electrode current collector 4A and the positive electrode current collector exposed portion 4C serving as a positive electrode terminal may be integrally configured, or may be configured independently and be connected to each other. FIGS. 2A and 2B illustrate an example where the positive electrode current collector 4A and the positive electrode current collector exposed portion 4C are integrally formed. In the case of being integrally formed, the positive electrode current collector exposed portion 4C may be formed by providing the positive electrode active material layer 4B on the positive electrode current collector 4A, such that it is possible to make a process of manufacturing the positive electrode 4 simple.

In addition, in a case where the positive electrode current collector exposed portion 4C is formed in a direction parallel to an application direction of the positive electrode active material layer 4B, it is preferable that the width of a raw sheet of the positive electrode current collector 4A be an integral multiple of the sum of the width of the positive electrode active material layer 4B and the width of the positive electrode current collector exposed portion 4C. More preferably, the width of a raw sheet of the positive electrode current collector 4A may be an even multiple of the sum of the width of the positive electrode active material layer 4B and the width of the positive electrode current collector exposed portion 4C. In this way, a yield ratio of a material is increased.

In addition, it is preferable that the depth dc of the positive electrode current collector exposed portion 4C (in FIGS. 2A and 2B, a dimension of the positive electrode current collector exposed portion 4C in a lateral direction) and the depth Dc of the positive electrode active material layer 4B (in FIGS. 2A and 2B, a dimension of the positive electrode active material layer 4B in a longitudinal direction) satisfy the following equation (2).

$$0.02 < (dc/Dc) \leq 0.40 \quad (2)$$

When a value of (dc/Dc) is less than 0.02, a connection area between the positive electrode current collector exposed portion 4C and the positive electrode tab 7 becomes small, such that an input and output characteristic deteriorates. On the other hand, when the value of (dc/Dc) is 0.40 or more, a battery capacity per positive electrode sheet becomes small. Therefore, to obtain a desired battery capacity in the entirety of the secondary battery 1, it becomes necessary to increase the number of stacked sheets. When the number of stacked sheets is increased, in a case where the positive electrode current collector exposed portion 4C and the positive electrode tab 7 are connected through an ultrasonic welding, a relatively large amount of power and energy are necessary. Therefore, there is a concern that the positive electrode current collector exposed portion 4C may be damaged, and poor welding may occur. In addition, as a harmful influence of the increasing of the number of stacked sheets, a decrease in heat dissipation may be exemplified. When the heat dissipation is decreased, the inside of the secondary battery 1 becomes hot when a large current is input and output, such that there is a concern that a life duration of the secondary battery 1 may be decreased.

The positive electrode current collector 4A is configured by metallic foil such as aluminum foil. The positive electrode active material layer 4B includes, for example, one kind or two or more kinds of positive electrode materials that can occlude and emit lithium, as a positive electrode active material, and may include a conductive material such as graphite and a binding agent such as polyvinylidene fluoride according to necessity.

As the positive electrode material that can occlude and emit lithium, for example, a lithium containing compound such as a lithium oxide, a lithium phosphorus oxide, a lithium sulfide, and an interlayer compound containing lithium is appropriate, and two kinds or more of these may be mixed and used. To increase an energy density, a lithium containing compound that containing lithium, a transition metallic element, and oxygen (O) is preferable, and among these, it is more preferable to contain at least one kind selected from a group consisting of cobalt (Co), nickel (Ni), manganese (Mn), and iron (Fe). As such a lithium containing compound, for example, a lithium composite oxide having a layered rock-salt type structure shown by a composition formula (I), a composition formula (II) or a composition formula (III), a lithium composite oxide having a spinel type structure shown by a composition formula (IV), a lithium composite phosphate having an olivine type structure shown by a composition formula (V), or the like may be exemplified. Specifically, $LiNi_{0.50}CO_{0.20}Mn_{0.30}O_2$, $Li_aCoO_2$ (a≅1), $Li_bNiO_2$ (b≅1), $Li_{c1}Ni_{c2}Co_{1-c2}O_2$ (c1≅1, 0<c2<1), $Li_dMn_2O_4$ (d≅1), $Li_eFePO_4$ (e≅1), or the like may be exemplified.

$$Li_fMn_{(1-g-h)}Ni_gM1_hO_{(2-j)}F_k \quad (I)$$

(wherein, M1 represents at least one kind selected from a group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k represent values within the following ranges: 0.8≤f≤1.2, 0<g<0.5, g+h<1, −0.1≤j≤0.2, 0≤k≤0.1. In addition, a composition of lithium is different depending on a charge and discharge state, and the value f represents a value in a fully discharged state.)

$$Li_mNi_{(1-n)}M2_nO_{(2-p)}F_q \quad (II)$$

(wherein, M2 represents at least one kind selected from a group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q represent values within the following ranges: 0.8≤m≤1.2, 0.005≤n≤0.5, −0.1≤p≤0.2, 0≤q≤0.1. In addition, a composition of lithium is different depending on a charge and discharge state, and the value m represents a value in a fully discharged state.)

$$Li_rCo_{(1-s)}M3_sO_{(2-t)}F_u \quad (III)$$

(wherein, M3 represents at least one kind selected from a group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u represent values within the following ranges: 0.8≤r≤1.2, 0≤s<0.5, −0.1≤t≤0.2, 0≤u≤0.1. In addition, a composition of lithium is different depending on a charge and discharge state, and the value r represents a value in a fully discharged state.)

$$Li_vMn_{2-w}M4_wO_xF_y \quad (IV)$$

(wherein, M4 represents at least one kind selected from a group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y represent values within the following ranges: 0.9≤v≤1.1, 0≤w≤0.6, 3.7≤x≤4.1, 0≤y≤0.1. In addition, a composition of lithium is different depending on a charge and discharge state, and the value v represents a value in a fully discharged state.)

$$Li_zM5PO_4 \quad (V)$$

(wherein, M5 represents at least one kind selected from a group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z represents a value within the following range: $0.9 \leq z \leq 1.1$. In addition, a composition of lithium is different depending on a charge and discharge state, and the value z represents a value in a fully discharged state.)

As a positive electrode material that can occlude and emit lithium, in addition to the above-described materials, an inorganic compound that does not contain lithium, for example, $MnO_2$, $V_2O_5$, $V_6O_{13}$, NiS, MoS, or the like, may be exemplified.

Negative Electrode

A negative electrode 5 has a structure in which a negative electrode active material layer 5B is provided on both surfaces of a negative electrode current collector 5A. In addition, although not shown in the drawing, the negative electrode active layer 5B may be provided on only one surface of the negative electrode current collector 5A. The negative electrode current collector 5A is formed of, for example, metallic foil such as copper foil.

The negative electrode active material layer 5B includes one kind or two kinds or more of negative electrode materials that can occlude and emit lithium, as a negative electrode active material, and may include the same binding agent as in the positive electrode active material layer 4B according to necessity.

In addition, the battery device 2 is configured in such a manner that an electrochemical equivalent of the negative electrode material, which can occlude and emit lithium, is larger than that of the positive electrode 5, and lithium metal does not precipitate to the negative electrode 5 while being charged.

As shown in FIGS. 2C and 2D, the negative electrode active material layer 5B is provided in such a manner that the negative electrode current collector exposed portion 5C having a depth of a predetermined dimension is formed at both surfaces of the negative electrode current collector 5A, not being provided on the entirety of both surfaces of the negative electrode current collector 5A. The negative electrode current collector exposed portion 5C serves as a negative electrode terminal. In this embodiment, the width wa of the negative electrode current collector exposed portion 5C (in FIGS. 2C and 2D, a dimension of the negative electrode current collector exposed portion 5C in a longitudinal direction) and the width Wa of the negative electrode active material layer 5B (in FIGS. 2C and 2D, a dimension of the negative electrode active material layer 5B in a lateral direction) are configured to satisfy the following equation (3).

$$0.5 < (wa/Wa) \leq 1.0 \tag{3}$$

In equation (3), when $0.5 < (wa/Wa)$, this indicates that the width of the negative electrode current collector exposed portion 5C is larger than a half of the width of the negative electrode active material layer 5B. In addition, in equation (3), when $(wa/Wa)=1.0$, this indicates that the width of the negative electrode current collector exposed portion 5C is the same as the width of the negative electrode active material layer 5B. In this way, similarly to the above-described positive electrode 4, when the width of the negative electrode current collector exposed portion 5C is configured to be large, an input and output of a large current may be realized. In addition, when the width of the negative electrode current collector exposed portion 5C and the width of the negative electrode active material layer 5B become the same as each other, in regard to a manufacturing process of the negative electrode 5, a process such as a punching process or a cutting process for making the negative electrode current collector exposed portion 5C thin is not necessary, such that it is possible to make a manufacturing process simple.

In addition, the negative electrode current collector 5A and the negative electrode current collector exposed portion 5C serving as a negative electrode terminal may be integrally configured, or may be configured independently and be connected to each other. FIGS. 2C and 2D illustrate an example where the negative electrode current collector 5A and the negative electrode current collector exposed portion 5C are integrally formed. In the case of being integrally formed, the negative electrode current collector exposed portion 5C may be formed by providing the negative electrode active material layer 5B on the negative electrode current collector 5A, such that it is possible to make a process of manufacturing the negative electrode 5 simple.

In addition, in a case where the negative electrode current collector exposed portion 5C is formed in a direction parallel to an application direction of the negative electrode active material layer 5B, it is preferable that the width of a raw sheet of the negative electrode current collector 5A be an integral multiple of the sum of the width of the negative electrode active material layer 5B and the width of the negative electrode current collector exposed portion 5C. More preferably, the width of a raw sheet of the negative electrode current collector 5A may be an even multiple of the sum of the width of the negative electrode active material layer 5B and the width of the negative electrode current collector exposed portion 5C. In this way, a yield ratio of the material is increased.

In addition, it is preferable that the depth da of the negative electrode current collector exposed portion 5C (in FIGS. 2C and 2D, a dimension of the negative electrode current collector exposed portion 5C in a lateral direction) and the depth Da of the negative electrode active material layer 5B (in FIGS. 2C and 2D, a dimension of the negative electrode active material layer 5B in a longitudinal direction) satisfy the following equation (4).

$$0.02 < (da/Da) \leq 0.40 \tag{4}$$

As a negative electrode material that can occlude and emit lithium, for example, carbon material such as non-graphitization carbon, easy-graphitization carbon, graphite, pyrolytic carbon, coke, glassy carbon, organic polymer compound baked body, carbon fiber, and activated charcoal may be exemplified. Among these, as the coke, pitch coke, needle coke, petroleum coke, or the like, may be exemplified. The organic polymer compound baked body represents a polymer material such as a phenol resin and a furan resin that is baked at an appropriate high temperature and carbonized, and in some cases, may be classified into non-graphitization carbon or easy-graphitization carbon. In addition, as the polymer material, polyacetylene, polypyrrole, or the like may be exemplified. In these carbon materials, variation in crystalline structure, which occurs at the time of charge and discharge, is small, a high charge and discharge capacity is obtained, and an excellent cycle characteristic is obtained, such that these carbon materials are preferable. Particularly, graphite is preferable. This is because an electrochemical equivalent is large and a high energy density is obtained. In addition, the non-graphitization carbon is preferable, because an excellent characteristic is obtained. In addition, a material that has a low charge and discharge potential, specifically, a material that has a charge and discharge potential that is close to that of lithium metal is preferable. This is because a high energy density of a battery may be realized.

As a negative electrode material that can occlude and emit lithium, a material that can occlude and emit lithium and contain at least one kind in a metallic element and a metalloid element as a constituent element may be exemplified. This is because when using these materials, a high energy density may be obtained. Particularly, when these materials are used together with a carbon material, a high energy density is obtained and an excellent cycle characteristic is obtained, such that this is preferable. This negative electrode material may be elementary substance of a metallic element or a metalloid element, an alloy thereof, a compound thereof, or a material including one kind or two or more kinds of phases of the metallic element and the metalloid element. In addition, in this embodiment, as an alloy, in addition to an alloy containing two kinds or more of metallic elements, an alloy containing one kind or more of metallic elements and one kind or more of metalloid elements may be exemplified. In addition, nonmetallic element may be contained. In a structure of the negative electrode material, a solid solution, eutectic (eutectic mixture), an intermetallic compound, or two kinds or more thereof may coexist.

As the metallic element or the metalloid element that makes up the negative electrode material, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), or the like may be exemplified. These may have a crystalline structure or an amorphous structure.

Among these, as the negative electrode material, it is preferable to contain a metallic element or a metalloid element of group 4B in a short-period type table as a constituent element, and is particularly preferable to contain at least one side of silicon (Si) and tin (Sn) as the constituent element. This is because silicon (Si) and tin (Sn) have a large capability of occluding and emitting lithium (Li) and a high energy density can be obtained.

As an alloy of tin (Sn), for example, an alloy containing at least one kind selected from a group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chrome (Cr) as a second constituent element other than tin (Sn) may be exemplified. As an alloy of silicon (Si), for example, an alloy containing at least one kind selected from a group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than silicon may be exemplified.

As a compound of tin (Sn) or a compound of silicon (Si), for example, a compound containing oxygen (O) or carbon (C) may be exemplified. In addition to tin (Sn) or silicon (Si), the above-described second constituent element may be contained.

Furthermore, as a negative electrode material that can occlude and emit lithium, another metallic compound or polymer material may be exemplified. As another metallic compound, an oxide such as $MnO_2$, $V_2O_5$, and $V_6O_{13}$, a sulfide such as NiS and MoS, a lithium transition metal oxide such as $LiNiO_2$ and $Li_4Ti_5O_{12}$, or a lithium nitride such as $LiN_3$ may be exemplified. As the polymer material, polyacetylene, polypyrrole, or the like may be exemplified.

Separator

The separator 6 isolates the positive electrode 4 and the negative electrode 5, and passes lithium ion therethrough while preventing a short circuit of a current due to a contact between the both electrodes. The separator 6 may be configured by, for example, a single layer or plural laminated layers of a synthetic resin-based porous film such as polytetrafluoroethylene, polypropylene, and polyethylene, or a ceramic porous film. In addition, non-woven fabric or a cellulose porous film may be used. Particularly, as the separator 6, a porous film formed of polyolefin is preferable. This is because a short prevention effect is excellent and stability of a battery is promoted due to a shutdown effect. In addition, as the separator 6, a layer, which is obtained by forming a porous resin layer formed of polyvinylidene fluoride (PVdF), polytetrafluoroethylene (PTFE), or the like on a minutely porous film formed of polyolefin or the like, may be used.

In general, a thickness of the separator 6, which can be appropriately used, is 5 to 50 μm, but more preferably, the thickness is 5 to 20 μm. When the separator 6 is too thick, a filled amount the active material is decreased and thereby a battery capacity is decreased and an ion conductivity is also decreased. Therefore, a current characteristic is deteriorated. On the contrary, when the separator 6 is too thin, a mechanical characteristic is deteriorated, and thereby both of a positive electrode and a negative electrode may be shorted due to a foreign matter or be broken.

Positive Electrode Tab and Negative Electrode Tab

Figure 3C:
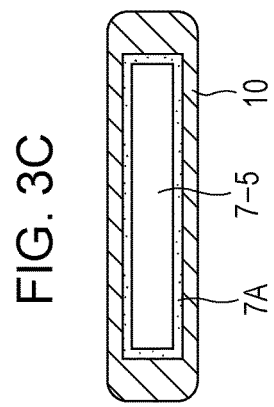
FIGS. 3A to 3E are schematic diagrams illustrating a configuration example of a positive electrode tab and a negative electrode tab used in the secondary battery according to the first embodiment of the present disclosure.
Figure 3B:
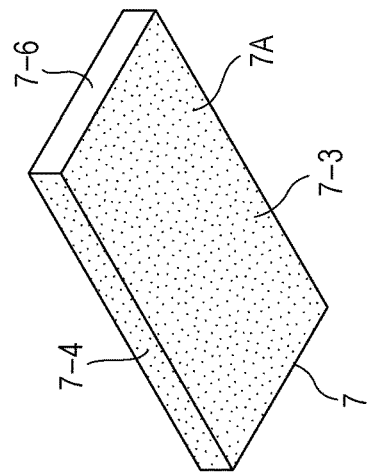
Figure 3A:
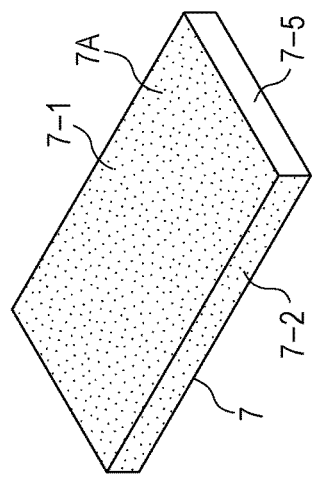

FIGS. 3A to 3E show schematic diagrams illustrating an exterior appearance of the positive electrode tab 7 making up the secondary battery 1 according to the first embodiment of the present disclosure. In addition, the negative electrode tab 8 has the same exterior appearance and therefore is not drawn in the drawings. FIG. 3A shows a perspective view illustrating the top surface 7-1 and a left side surface 7-2, FIG. 3B shows a perspective view illustrating the bottom surface 7-3 and a right side surface 7-4, and FIG. 3C shows a cross-sectional view.

The positive electrode tab 7 that is connected to the positive electrode current collector exposed portion 4C, and the negative electrode tab 8 that is connected to the negative electrode current collector exposed portion 5C are members that relay the positive electrode current collector exposed portion 4C and the negative electrode current collector exposed portion 5C and an electronic apparatus connected to the secondary battery 1. The positive electrode tab 7 and the negative electrode tab 8 are formed in a plate shape or a rectangular parallelepiped shape.

It is preferable that the thickness of the positive electrode tab 7 and the negative electrode tab 8 be 50 to 400 μm. When the thickness is less than 50 μm, there is a concern that cracking may occur in a bending process after the bonding with the current collector exposed portion. On the other hand, the thickness exceeds 400 μm, there is a concern that a sealing property at a portion that is thermally welded with the exterior material 3 may be deteriorated, and therefore leakage and moisture penetration occur, and a life duration of the secondary battery 1 may be shortened.

In addition, it is preferable that a conductivity of the positive electrode tab 7 and the negative electrode tab 8 be 50% IACS (International annealed copper standard: a volume resistivity of annealed standard soft copper, which is internationally adopted as an electrical resistance (or electrical conductivity), is defined as $1.7241 \times 10^{-2}$ μΩ). When the conductivity is less than 50% IACS, heat generation of a tab is increased when a large current is made to flow. When the heat generation of the tab is increased, a thermally welded portion with the exterior material 3 is softened, a sealing property is deteriorated. In addition, when an external short circuit is generated, the temperature of the tab becomes high to an extent where the tab is in a red hot state. Therefore, there is a concern that an electrolytic solution formed of an organic solvent may be ignited and the secondary battery 1 may be exploded.

The positive electrode tab 7 and the negative electrode tab 8 may be configured by a material such as nickel (Ni), copper (Cu), aluminum (Al), stainless steel (SUS), titanium (Ti), and aluminum (Al), or an alloy containing phosphorus (P), silver (Ag), tin (Sn), iron (Fe), zirconium (Zr), chromium (Cr), silicon (Si), magnesium (Mg), or nickel (Ni). Preferably, the positive electrode tab 7 and the negative electrode tab 8 may be configured by using an alloy of copper (Cu), aluminum (Al), and copper (Cu).

In addition, as shown in FIGS. 3A to 3C, the positive electrode tab 7 is covered with a covering layer 7A formed of any one of nickel (Ni), silver (Ag), gold (Au), and tin (Sn), in four surfaces including the top surface 7-1, the left side surface 7-2, the bottom surface 7-3, and the right side surface 7-4 except for one end surface 7-5 and another end surface 7-6. The above-described four covered surfaces are surfaces in which the positive electrode tab 7 and the negative electrode tab 8 are thermally welded with the exterior material 3 through sealant 10. In these thermally welded surfaces, for example, when copper (Cu) or a Cu alloy containing phosphorus (P), silver (Ag), tin (Sn), iron (Fe), zirconium (Zr), chromium (Cr), silicon (Si), magnesium (Mg), or nickel (Ni) is exposed, a thermal welding property with the sealant 10, that is, a sealing property is significantly deteriorated, such that there is a concern that the life duration of a battery may be shortened. In addition, it is not necessarily necessary for the positive electrode tab 7 to be covered with the covering layer 7A, but it is preferable that at least one of the positive electrode tab 7 and the negative electrode tab 8 be covered.

In addition, when as the material of the positive electrode tab 7 or the negative electrode tab 8, copper (Cu) or an alloy containing copper (Cu) is used, when the copper (Cu) or the copper (Cu) containing alloy is exposed, a resin that is brought into contact with the copper (Cu) or the copper (Cu) containing alloy is deteriorated, that is, damage by copper occurs. When damage by copper occurs, this has an adverse effect on the life duration of the secondary battery 1. Therefore, when the positive electrode tab 7 or the negative electrode tab 8 is formed using copper (Cu) or a copper (Cu) containing alloy, it is preferable that the covering layer 7A be provided. In this manner, the copper (Cu) or the copper (Cu) containing alloy is prevented from being directly brought into contact with the resin, such that it is possible to suppress damage by copper.

As a method of covering the positive electrode tab 7 and the negative electrode tab 8, for example, an electrolytic plating or the like may be exemplified. When the covering is performed using an electrolytic plating is performed, a base material, which is extended into a roll shape, of copper (Cu) or a copper alloy containing phosphorus (P), silver (Ag), tin (Sn), iron (Fe), zirconium (Zr), chromium (Cr), silicon (Si), magnesium (Mg), or nickel (Ni) is slit to have a predetermined width and is passed through an electrolyte bath. In this way, the plating process is performed.

It is preferable that a thickness of the covering layer 7A be 0.1 to 3 µm. When the thickness is less than 0.1 µm, there is a concern that the covering layer 7A may be peeled off and the tab base material is exposed, such that the sealing property is deteriorated. On the other hand, the thickness of the covering layer 7A exceeds 3 µm, a connection state (a fixing state in the case of the welding) between the current collector exposed portion and the tab becomes insufficient, such that the tab may not exhibit a high conductivity thereof.

Figure 4A:
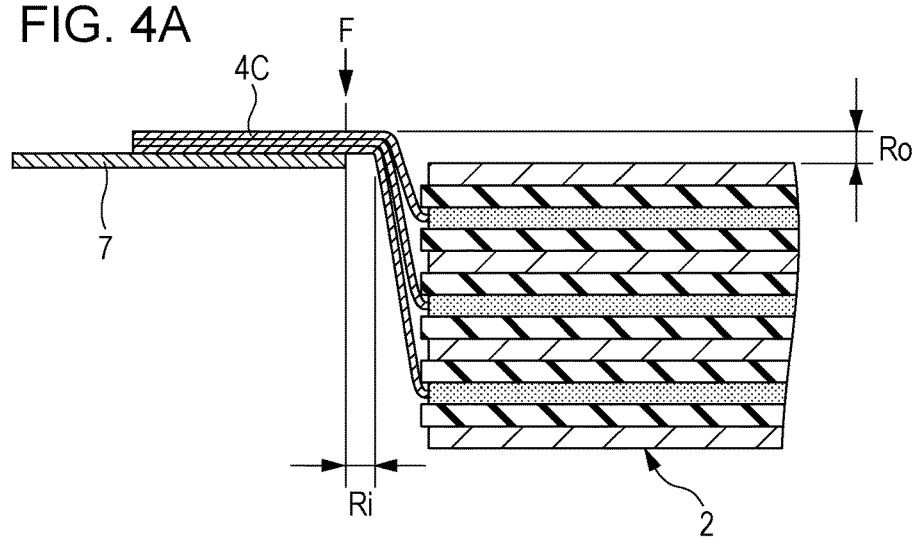
FIGS. 4A to 4C are partially enlarged views illustrating a connection state between the positive electrode tab and an a positive electrode current collector exposed portion.
Figure 4B:
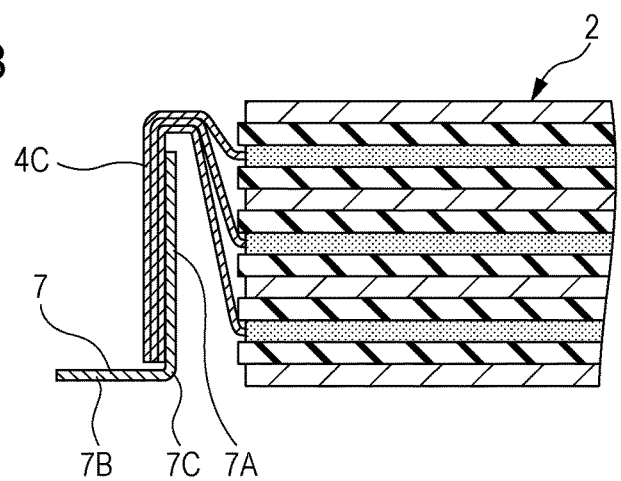
Figure 4C:
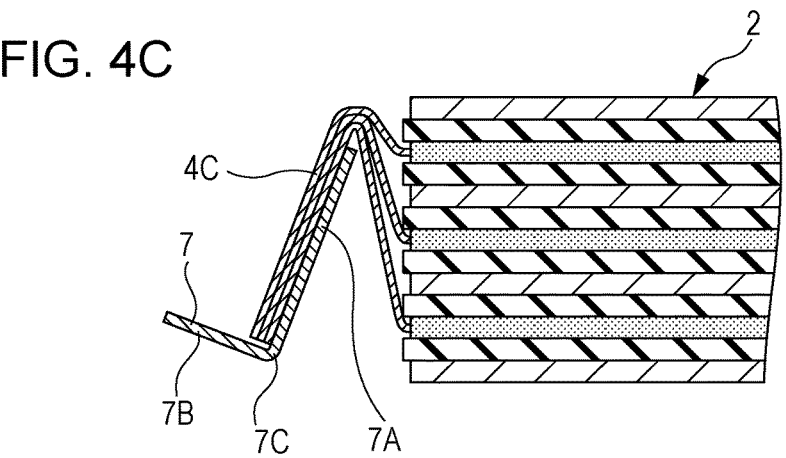

FIGS. 4A to 4C show partially enlarged views illustrating a connection state between the positive electrode tab 7 and the positive electrode current collector exposed portion 4C. FIG. 4A illustrates a state where the positive electrode current collector exposed portion 4C is not bent, FIGS. 4B and 4C illustrate a state where the positive electrode current collector exposed portion 4C is bent. The positive electrode tab 7 is fixed to a plurality of positive electrode current collector exposed portions 4C that are laminated and are bent to have an approximate U-shape in a cross-section. In this way, the positive electrode tab 7 is electrically connected to each of the positive electrode current collector exposed portions 4C. A portion, which is used for the connection with the positive electrode current collector exposed portion 4C, of the positive electrode tab 7 is referred to as the connection portion 7A, a portion that is led-out from the exterior material 3 is referred to as a lead-out portion 7B, and a portion that is bent is referred to as a bent portion 7C. The positive electrode tab 7 is configured in such a manner that the bottom surface of the lead-out portion 7B is flush with the bottom surface of the battery device 2. In addition, although not shown, in a case where the battery device 2 is packaged by the exterior material 3 whose both surfaces have a concave portion, or the like, it is not necessarily necessary that the positive electrode tab 7 be flush with the bottom surface of the battery device 2. As a method of connecting the positive electrode tab 7 and the positive electrode current collector exposed portion 4C, a connection using an ultrasonic welding, a resistance welding, a laser welding, a spot welding, or the like, a clamp fixing, a caulking connection, or the like may be exemplified. Among these, the ultrasonic welding is particularly preferable. This is because plural sheets of thin positive electrode current collector exposed portion 4C and the positive electrode tab 7 may be strongly connected to each other in a broad area.

In this embodiment, the positive electrode current collector exposed portion 4C is bent such that an outer periphery side bending margin Ro having a predetermined width is formed. In a case where the outer periphery side bending margin Ro is not provided, when positive electrode current collector exposed portion 4C to which the positive electrode tab 7 is connected is bent in a direction that is approximately orthogonal to the surface of the positive electrode 4, as shown in FIG. 4C, the positive electrode tab 7 comes into contact with the battery device 2, and it is difficult to bend the positive electrode current collector exposed portion 4C. In addition, even when the positive electrode current collector exposed portion 4C is bent in a direction that is approximately orthogonal to the surface of the positive electrode 4, the positive electrode current collector exposed portion 4C, the positive electrode tab 7, and the battery device 2 are deformed along with the bending. In this case, an inserting property into a pack of the battery device 2 is deteriorated. Therefore, when the outer periphery side bending margin Ro is provided, as shown in FIG. 4B, it is possible to bend the positive electrode current collector exposed portion 4C in a direction that is approximately orthogonal to the surface of the positive electrode 4 while not bringing the positive electrode tab 7 into contact with the laminated positive electrode 4 and the negative electrode 5.

In addition, it is preferable that the positive electrode tab 7 be fixed to the laminated positive electrode current collector exposed portion 4C at a position where an inner periphery side bending margin R1 having a predetermined width is formed. When the inner periphery side bending margin R1 is formed, even though the positive electrode current collector exposed portion 4C is bent with a position F in FIG. 4A made as a supporting point, it is possible to bend the positive electrode current collector exposed portion 4C in a direction that is approximately orthogonal to the surface of the positive electrode 4 while not bringing the positive electrode tab 7 into contact with the laminated positive electrode 4 and the negative electrode 5. Therefore, it is necessary that the width of the inner periphery side bending margin R1 is equal to or larger than a thickness of the positive electrode tab 7. In addition, the negative electrode tab 8 is also connected to the negative electrode current collector exposed portion 5C in this manner. In addition, the details of the U-shaped bending process will be described later.

Figure 5A:
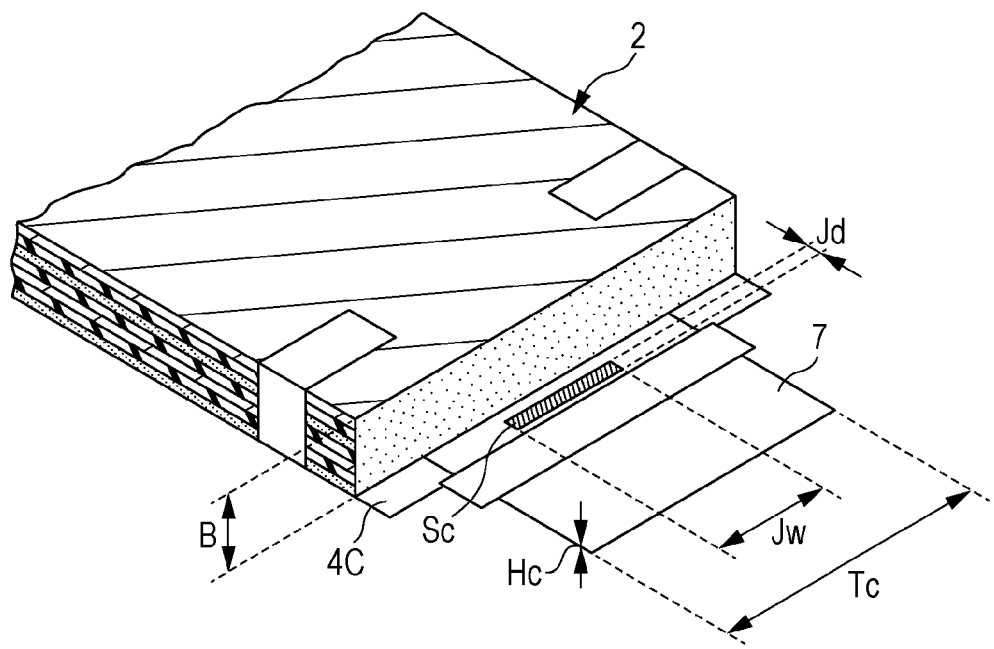
FIG. 5A is a schematic diagram illustrating a connection state between the positive electrode current collector exposed portion and the positive electrode tab.

FIG. 5A shows a schematic diagram illustrating a connection area between the positive electrode current collector exposed portion 4C and the positive electrode tab 7. When the width of the positive electrode tab 7 is set to Tc, the thickness of the positive electrode tab 7 is set to Hc, the thickness of the battery device 2 is set to B, the width of the connection range is set to Jw, and the depth of the connection range is set to Jd, it is preferable that an area (connection area) Sc of the connection range expressed by Jw×Jd be set so as to satisfy the following equation (5).

$$Hc \leq Sc/Tc \leq B \qquad (5)$$

In a case where the connection area Sc is too narrow, a current density increases, such that when a large current is made to flow, heat may be generated. On the other hand, in a case where the connection area Sc is too broad, for example, when connection is performed through an ultrasonic welding, a large amount of power and energy is necessary to fix plural sheets of positive electrode current collector exposed portions 4C, but the positive electrode current collector exposed portions 4C may be damaged due to this, and therefore a problem such as a dissolution defect may occur. Therefore, when the connection area Sc is set to satisfy the above-described equation (5), this adverse effect may be prevented.

In addition, as specific dimensions, a value of "connection area Sc/width Tc of positive electrode tab 7" may be set to 0.05 to 10.0 mm. Furthermore, preferably, the value of "connection area Sc/width Tc of positive electrode tab 7" may be set to 0.2 to 7.0 mm. When this value is less than 0.05, the connection area Sc becomes narrow, and a current density is focused thereto, such that when a large current is made to flow, heat may be generated. On the other hand, this value exceeds 10.0 mm, for example, when a connection is performed through an ultrasonic welding, a large amount of power and energy is necessary to fix plural sheets of positive electrode current collector exposed portions 4C, but the positive electrode current collector exposed portions 4C may be damaged due to this, and therefore a problem such as a dissolution defect may occur.

Figure 5B:
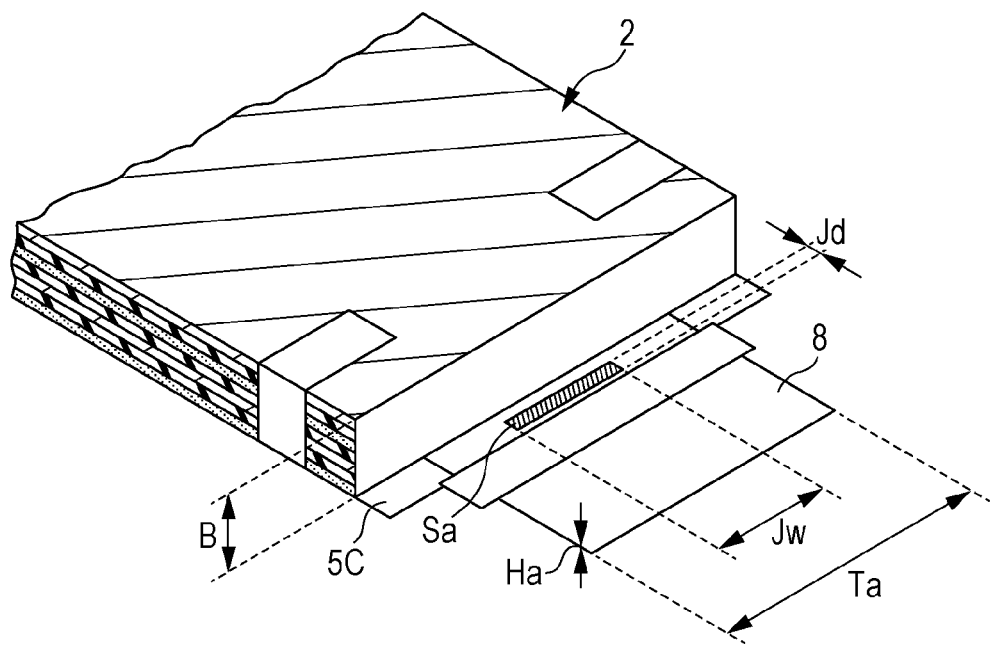
FIG. 5B is a schematic diagram illustrating a connection state between a negative electrode current collector exposed portion and a negative electrode tab.

In addition, the negative electrode current collector exposed portion 5C and the negative electrode tab 8 are connected to each other in this way. That is, as shown in FIG. 5B, when the width of the negative electrode tab 8 is set to Ta, the thickness of the negative electrode tab 8 is set to Ha, the thickness of the battery device 2 is set to B, the width of the connection range is set to Jw, and the depth of the connection range is set to Jd, it is preferable that an area (connection area) Sa of the connection range expressed by Jw×Jd be set so as to satisfy the following equation (6).

$$Ha \leq Sa/Ta \leq B \qquad (6)$$

In addition, as specific dimensions, a value of "connection area Sa/width Ta of negative electrode tab 8" may be set to 0.05 to 10.0 mm. Furthermore, preferably, the value of "connection area Sa/width Ta of negative electrode tab 8" may be set to 0.2 to 7.0 mm.

Electrolyte

As an electrolyte, an electrolyte salt and a nonaqueous solvent, which are generally used in a lithium ion secondary battery, may be used. As the nonaqueous solvent, specifically, ethylene carbonate (EC), propylene carbonate (PC), γ-butyrolactone, dimethyl carbonate (DMC), diethyl carbonate (DEC), ethyl methyl carbonate (EMC), dipropyl carbonate (DPC), ethyl propyl carbonate (EPC), or a solvent obtained by substituting hydrogen in such ester carbonate series with halogen, or the like may be exemplified. One kind of these solvents may be used alone, or plural kinds of these solvents may be mixed in a predetermined composition and used.

As the electrolyte salt, a salt that is dissolved in the nonaqueous solvent is used, and cation and anion is coupled. As the cation, alkali metal or alkali earth metal may be used. As the anion, $Cl^-$, $Br^-$, $I^-$, $SCN^-$, $ClO_4^-$, $BF_4^-$, $PF_6^-$, $CF_3SO_3^-$, or the like may be used. Specifically, lithium hexafluorophosphate ($LiPF_6$), lithium tetrafluoroborate ($LiBF_4$), lithium bis(trifluoromethane sulfonyl)imide ($LiN(CF_3SO_2)_2$), lithium bis(pentafluoroethane sulfonyl)imide ($LiN(C_2F_5SO_2)_2$), lithium perchlorate ($LiClO_4$), or the like may be exemplified. As a concentration of the electrolyte salt, there is no problem as long as the electrolyte salt is dissolved in the solvent at the concentration, but it is preferable that a concentration of the electrolyte salt be 0.4 to 2.0 mol/kg with respect to the nonaqueous solvent.

When a polymer electrolyte is used, a gel type electrolytic solution obtained by mixing the nonaqueous solvent and the electrolyte salt is taken into a matrix polymer and thereby the polymer electrolyte is obtained. The matrix polymer has a property that is compatible with the nonaqueous solvent. As such a matrix polymer, a silicone gel, an acryl gel, an acrylonittrile gel, a polyorganophosphazene-modified polymer, polyethylene oxide, a polypropylene oxide, and a complex polymer, a cross-linked polymer, and a modified polymer thereof, or the like may be used. In addition, as a fluorine-based polymer, a polymer such as a polyvinylidene fluoride (PVdF), a copolymer including vinylidene fluoride (VdF) and hexafluoropropylene (HFP) in a repeating unit, and a copolymer including vinylidene fluoride (VdF) and trifluoroethylene (TFE) in a repeating unit may be exemplified. One kind of these polymers may be used alone, or may be used in a state where two kinds or more are mixed.

Sealant

Figure 6A:
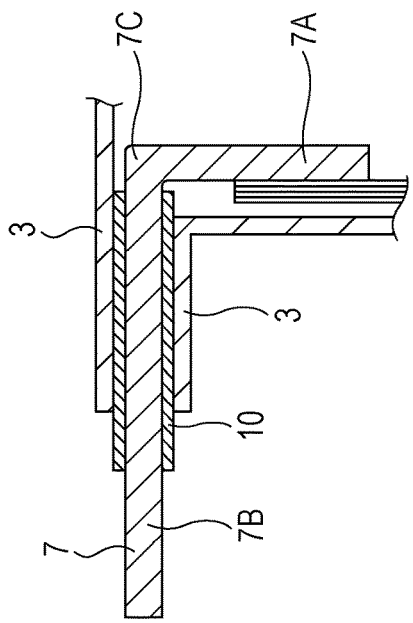
FIG. 6A is an exterior perspective view illustrating the secondary battery according to the first embodiment of the present disclosure.
Figure 6B:
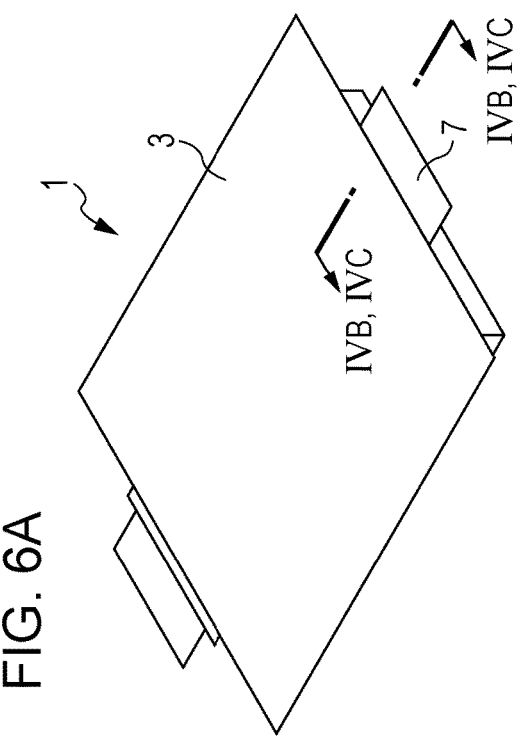
FIGS. 6B and 6C are cross-sectional views taken along line VIB-VIB and VIC-VIC in FIG. 6A.
Figure 6D:
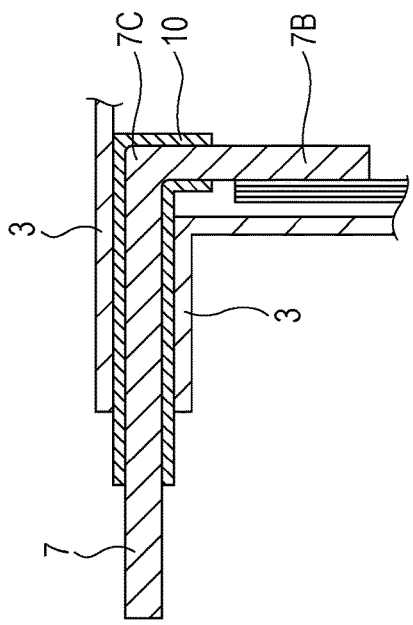
FIG. 6D is a side view of the battery device illustrating a state where a sealant is provided.
Figure 6C:
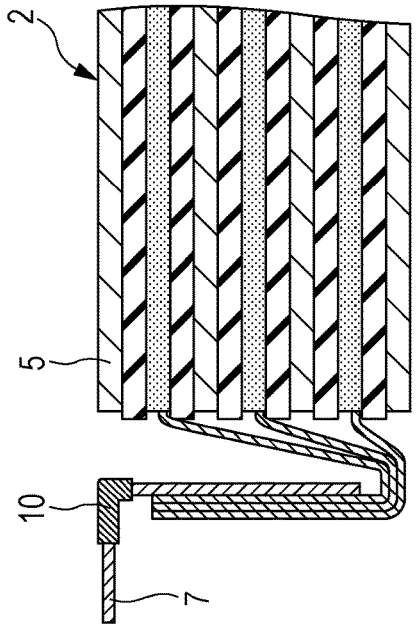

FIGS. 6A to 6D show diagram illustrating a configuration of a sealant 10. FIG. 6A shows a schematic diagram illustrating an exterior appearance of the secondary battery 1, and FIGS. 6B and 6C show cross-sectional views taken along lines VIB-VIB and VIC-VIC in FIG. 6A. FIG. 6D shows a side view of the battery device 2.

The sealant 10, which is provided to the positive electrode tab 7 and the negative electrode tab 8, respectively, is formed of a resin material that is excellent in adhesiveness with the positive electrode tab 7 and the negative electrode tab 8. As such a resin material, a modified polymer such as acid-modified polypropylene (PP) may be exemplified. The sealant 10 is provided for improving adhesiveness between the positive electrode tab 7 and the negative electrode tab 8, and the exterior material 3, and for preventing the penetration of external air, moisture, or the like.

As a configuration of the sealant 10, configurations shown in FIGS. 6B and 6C may be adopted, but the configuration shown in FIG. 6C is preferable from a viewpoint described below. In FIG. 6B, the sealant 10 is provided to the positive electrode tab 7, but the bent portion 7C having a corner shape, which is formed by bending the positive electrode tab 7, is not covered with the sealant 10. In this case, this bent portion 7C directly comes into contact with the exterior material 3, and there is a concern that the exterior material 3 may be broken through by the bent portion 7C. Therefore, when the sealant 10 and the positive electrode tab 7 are configured to be bent together, the positive electrode tab 7 including the bent portion 7C is covered with the sealant 10 like an example as shown in FIG. 6C. In this manner, the bent portion 7C of the positive electrode tab 7 does not come into contact with the exterior material 3, such that it is possible to prevent the exterior material 3 from being broken through by the bent portion 7C.

In addition, when the sealant 10 is provided to cover the bent portion 7C of the positive electrode tab 7, as shown in FIG. 6D, the positive electrode tab 7 does not directly contact the negative electrode 5 that is positioned at the outermost layer of the battery device 2. In this manner, it is possible to prevent the occurrence of an internal short circuit that is caused when the positive electrode tab 7 and the negative electrode 5 directly come into contact with each other.

However, as a method of preventing a short circuit, a method in which an extra separator 6 is provided to the outermost-layer negative electrode 5, and an insulating tape is adhered to cover a cross-section of the outermost-layer negative electrode 5 may be used.

Insulator

FIG. 7A to 7F show schematic diagrams illustrating a configuration of an insulator 11. The insulator 11 is an insulating member that has a flat plate shape, a sheet shape, or a film shape and that is provided between the positive electrode tab 7 and the battery device 2 in which the positive electrode 4 and the negative electrode 5 are laminated with the separator 6 interposed therebetween. As described above, when the sealant 10 is provided to the bent portion of the positive electrode tab 7, it is possible to prevent a short circuit, which is caused when the positive electrode tab 7 and the negative electrode tab 5 directly come into contact with each other. However, there is a concern that the positive electrode current collector exposed portion 4C (particularly, a corner portion) and the negative electrode 5 with the sealant 10 not interposed therebetween may come into contact with each other and an internal short circuit may occur. When the insulator 11 is interposed between the battery device 2 and the positive electrode tab 7, it is possible to prevent a short circuit, which is caused when the battery device 2 and the positive electrode current collector exposed portion 4C.

The insulator 11 is configured in such a manner that the height thereof is equal to or larger than a depth dimension of the connection portion 7A of the positive electrode tab 7, and is equal to or less than the thickness of the battery device 2. When the height of the insulator 11 is less than the depth dimension of the connection portion 7A of the positive electrode tab 7, there is a concern that the positive electrode tab 7 may go around the insulator 11 and directly contact the battery device 2. On the other hand, when the height of the insulator 11 is larger than the thickness of the battery device 2, there is a concern that the insulator 11 may protrude from a plane in which the battery device 2 is flush with the lead-out portion of the tab and an end portion of the insulator 11 comes into contact with the exterior material 3 and therefore causes damage to the exterior material 3. As specific dimensions, it is preferable that the thickness of the insulator 11 be approximately 0.2 mm or more, and more preferably, 0.2 to 1.0 mm. When the thickness is less than 0.2 mm, a long-term insulating property is not secured due to an effect of vibration or the like. On the other hand, when the thickness exceeds 1.0 mm, a volume ratio of the battery device 2 with respect to the insulator 11 increases, and therefore a volume energy density decreases.

The insulator 11 may be configured by a material such as polypropylene (PP), polyethylene telephthalate (PET), polyethylene (PE), polyimide (PI), and non-woven fabrics.

However, in addition to the above-described method, as a method of preventing a short circuit which is caused when the battery device 2 directly comes into contact with the positive electrode current collector exposed portion 4C, a method in which an extra separator is provided to the outermost layer of the battery device 2, a method in which an insulating tape is adhered to an end portion of the outermost layer of the battery device 2 to cover it, a method in which an insulating tape is adhered to the positive electrode current collector exposed portion 4C, or the like may be exemplified. However, there is a concern that a function of preventing a short circuit through the provision of such a separator and the adhesion of such an insulating tape may be lost due to the scraping caused by long-term vibration and due to the peeling-off of the insulating tape caused by an electrolytic solution. In addition to this, there is a method in which a flowable resin is filled to the bent portion of the tab, and is fixed thereto. However, there is a concern that the resin may penetrate into the inside of the battery device 2 and therefore a battery function may be deteriorated. Therefore, it is preferable to provide the insulator 11 between the battery device 2 and the positive electrode tab 7 so as to prevent a short circuit in the long term, which is caused when the battery device 2 directly comes into contact with the positive electrode tab 7.

Figure 7A:
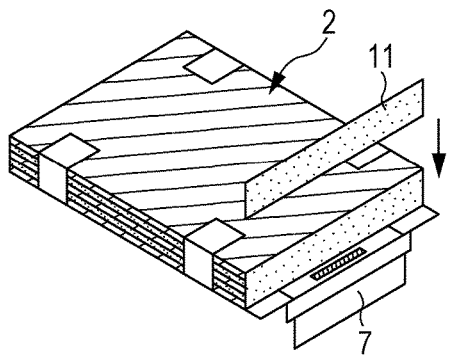
FIGS. 7A to 7F are schematic diagrams illustrating a configuration example of an insulator.

The insulator 11 shown in FIG. 7A is configured in a rectangular-shaped flat plate, but the shape of the insulator 11 is not limited to the flat plate shape. For example, as shown in FIG. 7B, an approximately lateral U-shape is also possible. When the insulator 11 is formed in the approximately lateral U-shape, the battery device 2 is prevented from being brought into contact with the positive electrode tab 7, and exterior damage resistance of the battery device 2 is improved, such that it is possible to protect a side surface from impact or the like.

However, corners of the insulator 11 are formed to have an acute angle, and the insulator 11 and the exterior material 3 packaging the battery device 2 may be damaged by the corners. Therefore, as shown in FIG. 7C, the insulator 11 may be configured by a rectangular-shaped flat plate having round corners (curvature R=0.5 to 2.0). When the insulator 11 is configured to have the rectangular shape with round corners, it is possible to prevent the exterior material 3 from being damaged by the corners of the insulator 11.

Figure 7E:
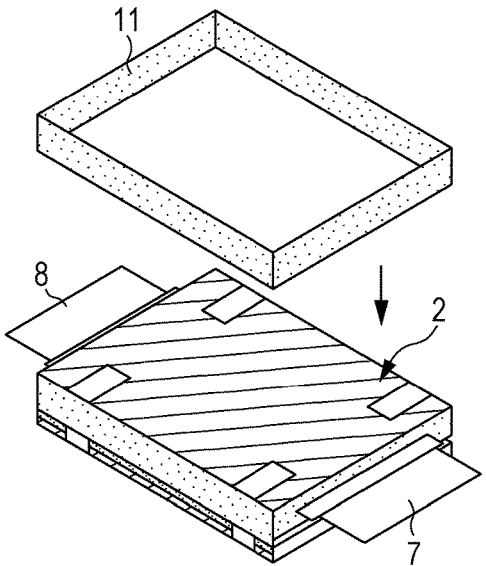
Figure 7B:
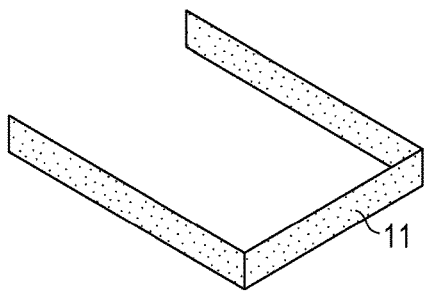
Figure 7C:
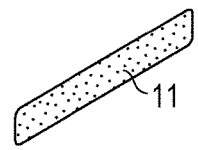
Figure 7F:
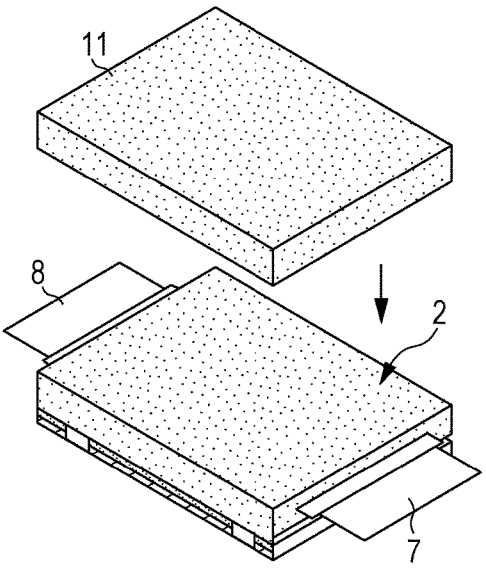
Figure 7D:
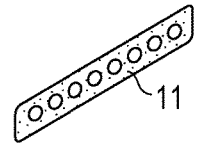

In addition, as shown in FIG. 7D, the insulator 11 may have a plurality of holes formed through a punching process. In this manner, it is possible to secure an electrolytic solution injecting property into the inside of the battery device 2. A shape of the holes may be arbitrarily selected as long as, the prevention of a short circuit in the long term, which is caused when the battery device 2 directly comes into contact with the positive electrode tab 7, is secured as an original purpose of the insulator 11.

In addition, the insulator 11 may have a shape such as an approximate square shape covering all side surfaces of the battery device 2 as shown in FIG. 7E, and a box shape covering all side surfaces and the top surface of the battery device 2 as shown in FIG. 7F. When the insulator 11 is configured to have the approximately square shape or the box shape, an effect of maintaining the battery device 2 in which the positive electrode 4, the negative electrode 5, and the separator 6 are laminated and maintaining the shape of the battery device 2 may be achieved, in addition to an effect of improving the exterior damage resistance of the secondary battery 1 by preventing the battery device 2 and the positive electrode tab 7 from being brought into contact with the positive electrode tab 7 as described above.

Exterior Material

A laminated film, which is used as an example of the exterior material 3, is formed of a multi-layer film in which an external side resin layer and an internal side resin layer are formed on both surfaces of metallic foil and that has a water-proofing property and an insulation property. As the external side resin layer, nylon (Ny) or polyethylene telephthalate (PET) is used from the aesthetics aspect, tenacity aspect, or softness aspect. The metallic foil performs the most important function that protects the battery device 2 inside thereof by preventing the penetration of moisture, oxygen, and light, and aluminum (Al) is the most frequently used from the aspects of lightness, extensibility, price, and easy workability. The internal side resin layer is a portion that is melted by heat or ultrasonic waves and fuses to another inner side resin layer, and a polyolefin-based resin material such as casted polypropylene (CPP) is used for the internal side resin layer. In addition, the exterior material 3 may be configured by a polymer film such as polypropylene or a metallic film instead of the laminated film.

Battery Device

Figure 8A:
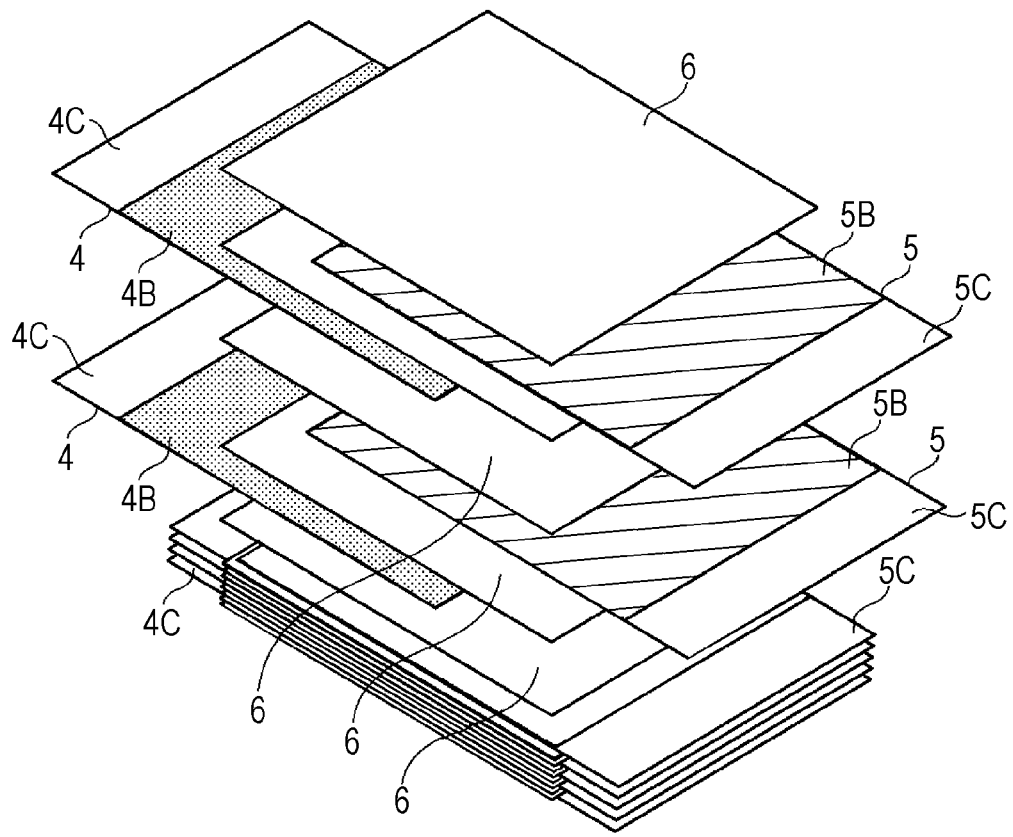
FIG. 8A is a schematic diagram illustrating a laminated structure of a positive electrode, a negative electrode, and a separator in the secondary battery according to the first embodiment of the present disclosure.
Figure 8B:
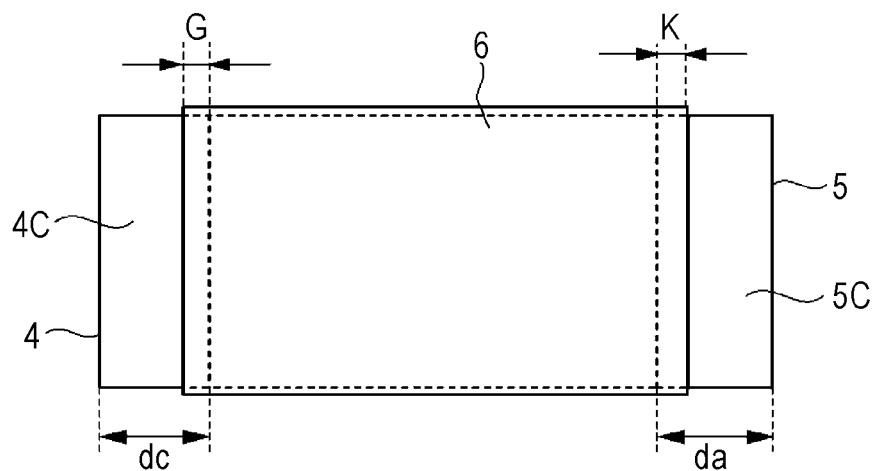
FIG. 8B is a plan view illustrating the laminated structure of the positive electrode, the negative electrode, and the separator.

FIGS. 8A and 8B show diagrams illustrating a lamination structure of the positive electrode 4, the negative electrode 5, and the separator 6. FIG. 8A is an exterior perspective view, and FIG. 8B is a plan view. In the first embodiment, as shown in FIG. 8A, the battery device 2 has a configuration in which the positive electrode 4 and the negative electrode 5 are laminated alternately with the separator 6 interposed therebetween, for example, in the order of the negative electrode 5, the separator 6, the positive electrode 4, the separator 6, the negative electrode 5, . . . the separator 6, and the negative electrode 5.

In addition, as shown in FIG. 8B, it is preferable that the dimensions of the separator 6 be set so as not to cover a half or more of the depth dc of the positive electrode current collector exposed portion 4C. That is, as shown in FIG. 8B, it is preferable that the depth G in which the positive electrode current collector exposed portion 4C and the separator 6 overlap each other, and the depth dc of the positive electrode current collector exposed portion 4C satisfy the following equation (7).

$$G < (dc/2) \tag{7}$$

As shown in FIG. 8B, it is preferable that the dimensions of the separator 6 be set so as not to cover a half or more of a depth da of the negative electrode current collector exposed portion 5C. That is, as shown in FIG. 8B, it is preferable that a depth K in which the negative electrode current collector exposed portion 5C and the separator 6 overlap each other, and the depth da of the negative electrode current collector exposed portion 5C satisfy the following equation (8).

$$G < (da/2) \tag{8}$$

This is because when a half or more of a depth of the positive electrode current collector exposed portion 4C and the negative electrode current collector exposed portion 5C are covered by the separator 6, a connection area between the positive electrode current collector exposed portion 4C and the positive electrode tab 7, and a connection area between the negative electrode current collector exposed portion 5C and the negative electrode tab 8 become narrow, and therefore an input and output characteristic becomes deteriorated.

1-2. Method of Manufacturing Secondary Battery

The above-described secondary battery 1 may be manufactured by processes described below.

Manufacturing of Positive Electrode

First, for example, a positive electrode active material, a low crystalline carbon, a conducting agent, and a binding agent are mixed to produce a positive electrode mixture. This positive electrode mixture is dispersed in a solvent such as N-methyl-pyrrolidone, and thereby positive electrode mixture slurry is obtained. Subsequently, this positive electrode mixture slurry is applied onto both surfaces of the positive electrode current collector 4A. In addition, in this application process, the positive electrode mixture slurry is applied in such a manner that the positive electrode current collector exposed portion 4C in which the positive electrode active material layer 4B is not present on the positive electrode current collector 4A is formed, instead of being applied onto the entire surface of the positive electrode current collector 4A. Next, the positive electrode mixture slurry is dried, and then the positive electrode current collector 4A is compression-molded by a roll pressing machine or the like and thereby the positive electrode active material layer 4B is formed. Then, after being cut to have a predetermined size, the positive electrode 4 is manufactured.

Manufacturing of Negative Electrode

First, for example, a negative electrode active material and a binding agent are mixed, and this negative electrode mixture is dispersed in a solvent such as N-methylpyrrolidone and thereby a negative electrode mixture slurry is obtained. Subsequently, this positive electrode mixture slurry is applied onto both surfaces of the negative electrode current collector 5A. In addition, similarly to the above-described positive electrode 4, in this application process, the negative electrode mixture slurry is applied in such a manner that the negative electrode current collector exposed portion 5C in which the negative electrode active material layer 5B is not present on the negative electrode current collector 5A is formed, instead of being applied onto the entire surface of the negative electrode current collector 5A. Next, the negative electrode mixture slurry is dried, and then the negative electrode current collector 5A is compression-molded by a roll pressing machine or the like and thereby the negative electrode active material layer 5B is formed. Then, after being cut to have a predetermined size, the negative electrode 5 is manufactured.

Lamination Process

The positive electrode 4 and the negative electrode 5 are laminated alternately with the separator 6 interposed therebetween, for example, in the order of the negative electrode 5, the separator 6, the positive electrode 4, the separator 6, the negative electrode 5, . . . the separator 6, and the negative electrode 5, and thereby a predetermined number of positive electrodes 4 and negative electrodes 5 are laminated. In addition, in the embodiment of the present disclosure, as shown in FIG. 8A, the positive electrode 4 and the negative electrode 5 are laminated in such a manner that the positive electrode current collector exposed portion 4C and the negative electrode current collector exposed portion 5C are opposite to each other. That is, the positive electrode current collector exposed portion 4C and the negative electrode current collector exposed portion 5C are configured so as not to face the same direction. In this manner, it is possible to make the width of the positive electrode tab 7 connected to the positive electrode current collector exposed portion 4C and the width of the negative electrode tab 8 connected to the negative electrode current collector exposed portion 5C can be approximately equal to the width of the battery device 2 to be the optimal, such that an input and output of the large current may be realized.

The positive electrode 4, the negative electrode 5, and the separator 6 are fixed to closely come into contact with each other, and thereby a laminated electrode body is manufactured. In this fixing process, a fixing member such an adhesive tape is used. The fixing member is provided at both side portions and the bottom portion of the laminated electrode body. In the case of using a gel electrolyte, a gel electrolyte layer is formed on both surfaces of the positive electrode 4 and the negative electrode 5, respectively, and the positive electrode 4 and the negative electrode 5 are laminated with the separator 6 interposed therebetween.

Post Process of Lamination

Figure 9A:
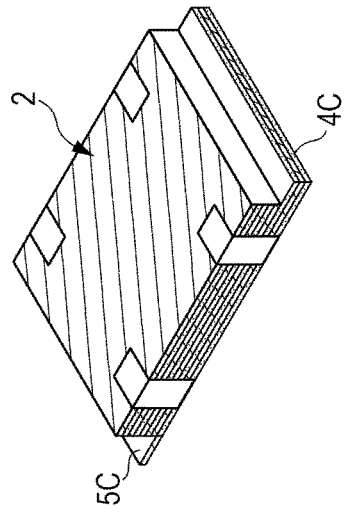
FIGS. 9A to 9F are schematic diagrams illustrating a process of manufacturing the secondary battery.
Figure 9B:
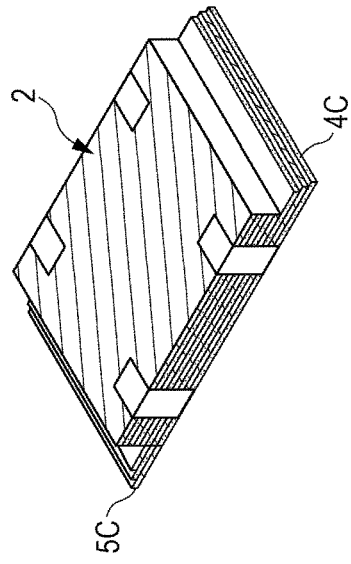
Figure 9C:
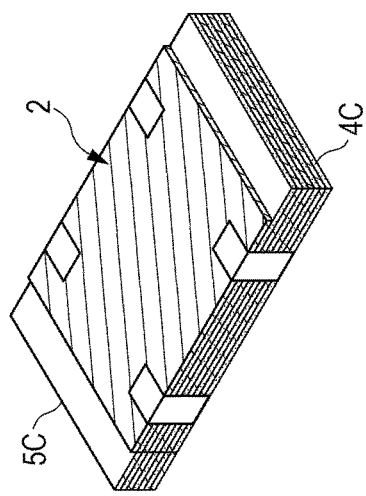

Next, a manufacturing process after the lamination process will be schematically described with reference to FIGS. 9A to 10F. FIG. 9A illustrate the battery device 2 configured by laminating the positive electrode 4, the negative electrode 5, and the separator 6 through the lamination process. After the lamination process, first, in a first U-shaped bending process, the positive electrode current collector exposed portion 4C and the negative electrode current collector exposed portion 5C are bent as shown in FIG. 9B. Next, in a current collector cutting process, as shown in FIG. 9C, a surplus portion in the front end of the bent positive electrode current collector exposed portion 4C is cut and thereby the front end is made to be even. Similarly, the front end of the negative electrode current collector exposed portion 5C is cut and made to be even.

Figure 9D:
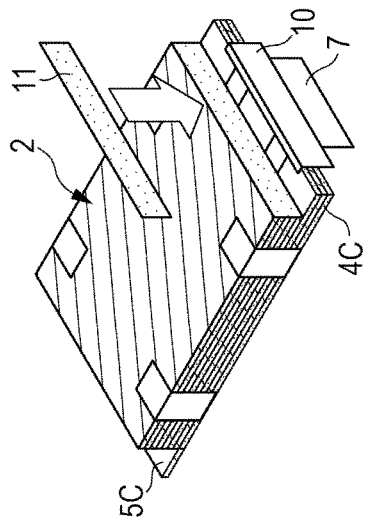
Figure 9E:
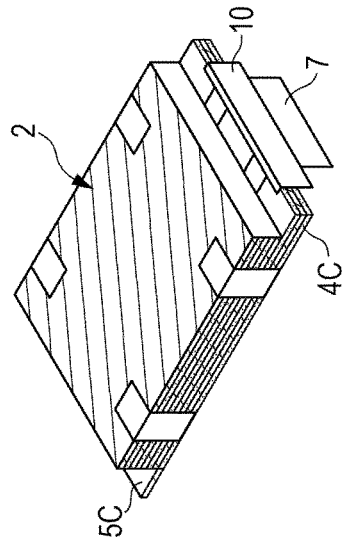
Figure 9F:
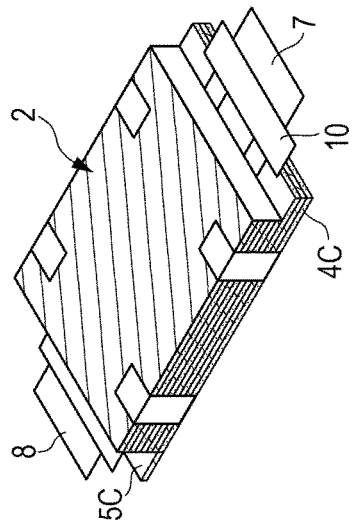

Next, in a tab connection process, as shown in FIG. 9D, a connection between the positive electrode current collector exposed portion 4C and the positive electrode tab 7, and a connection between the negative electrode current collector exposed portion 5C and the negative electrode tab 8 are performed, respectively. In addition, in this process, a process of providing the sealant 10 to the positive electrode tab 7 and the negative electrode tab 8 is also included. Next, in the tab bending process, as shown in FIG. 9E, the positive electrode tab 7 connected to the positive electrode current collector exposed portion 4C and the negative electrode tab 8 connected to the negative electrode current collector exposed portion 5C are bent into a predetermined shape. Next, in a process of providing the insulator, as shown in FIG. 9F, the insulator 11 is provided to a side surface of the battery device 2 at the side of the positive electrode current collector exposed portion 4C. Next, according to necessity, the insulator 11 is further provided to a side surface of the battery device 2 at the side of the negative electrode current collector exposed portion 5C.

Figure 10C:
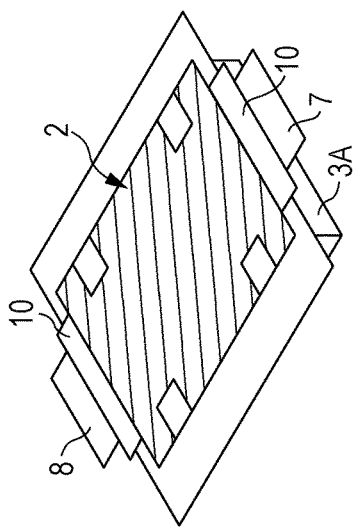
FIGS. 10A to 10F are schematic diagrams illustrating a process of manufacturing the secondary battery.
Figure 10B:
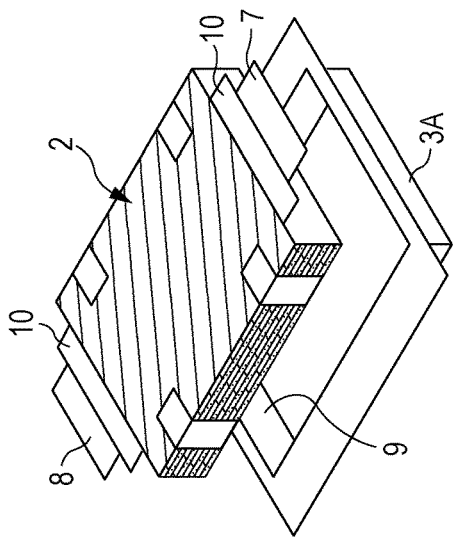
Figure 10A:
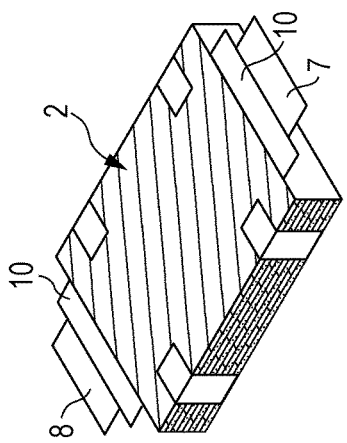
Figure 10F:
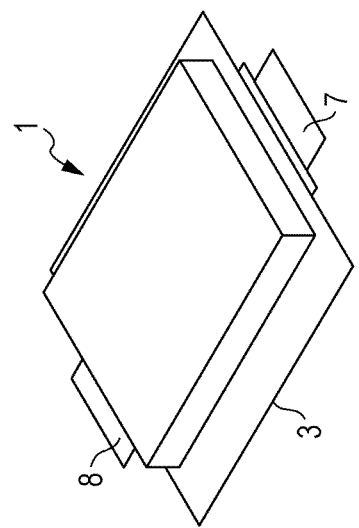

Next, as shown in FIG. 10A, in a second U-shape bending process, in regard to the positive electrode current collector exposed portion 4C, a portion connected to the positive electrode tab 7 is bent at an angle of 90°. Next, in regard to the negative electrode current collector exposed portion 5C, a portion connected to the negative electrode tab 8 is bent at an angle of 90°. Next, as shown in FIGS. 10B and 10C, in a first packaging process, in an approximately central concave portion 9 of a first exterior material 3A that has an approximately rectangular shape, the battery device 2 is accommodated and is packaged. Next, as shown in FIG. 10D, in a second packaging process, the accommodating portion is covered by a second exterior material 3B that has a flat plate shape. In this manner, the battery device 2 is packaged by the exterior material 3.

Figure 10E:
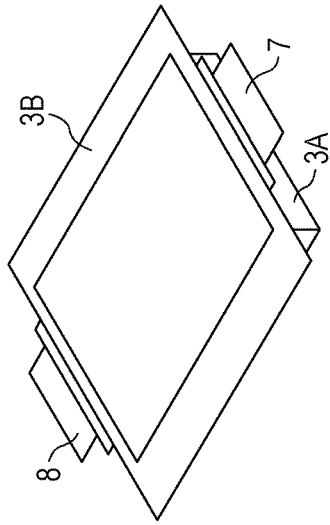
Figure 10D:
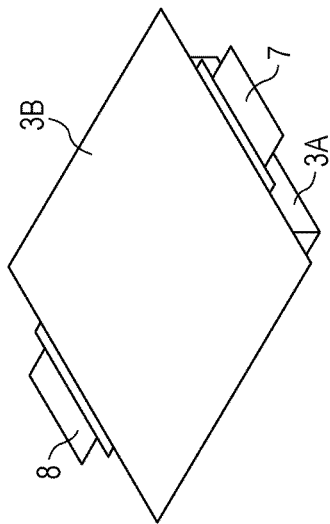

As shown in FIG. 10E, in an injecting and sealing process, a peripheral portion of the concave portion 9 with one side left is thermally fused through a thermal fusion, and an electrolytic solution is injected from the non-fused side, and then the remaining one side is thermally welded and is sealed. Through the above-described processes, the secondary battery 1 as shown in FIG. 10F is manufactured.

First U-Shape Bending Process

A plurality of positive electrode current collector exposed portions 4C that is led-out from the laminated positive electrodes 4 and a plurality of negative electrode current collector exposed portions 5C that is led-out from the laminated negative electrodes 5 are bent to have an approximately U-shaped shape. The first U-shape bending process is a process for providing in advance an optimal U-shaped bent shape to the positive electrode current collector exposed portions 4C and the negative electrode current collector exposed portions 5C. In a case where the optimal U-shaped bent shape is provided in advance, when each of the positive electrode current collector exposed portions 4C and each of the negative electrode current collector exposed portions 5C, which are connected to the positive electrode tabs 7 and the negative electrode tabs 8, respectively, are bent and a U-shaped bent portion is formed, it is possible to prevent stress such as tensile stress from being applied to the positive electrode and negative electrode exposed portions 4C and 5C.

FIGS. 11A to 11E show side views illustrating the first U-shape bending process of the positive electrode current collector exposed portions $4C_1$ to $4C_3$. In FIGS. 11A to 11E, each process performed with respect to the positive electrode current collector exposed portions $4C_1$ to $4C_3$ will be described. In addition, such a first U-shape bending process is also performed with respect to the negative electrode current collector exposed portion 5C.

Figure 11A:
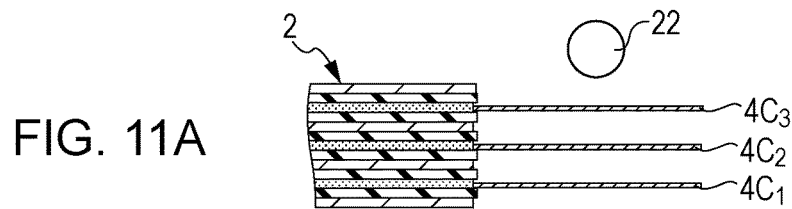
FIGS. 11A to 11E are schematic diagrams illustrating a process of forming a bent portion of a current collector exposed portion.

First, as shown in FIG. 11A, a laminated electrode body is placed over a work setting stand 20a having a U-shape bending thin plate 21. The U-shape bending thin plate 21 is provided to protrude from the work setting stand 20a with a height that is slightly less than a thickness of the battery device 2, specifically, with a height less than the thickness of the battery device 2 by a total thickness of at least a plurality of the positive electrode current collector exposed portions $4C_1$ to $4C_3$. In this configuration, a bending outer periphery side of the positive electrode current collector exposed portion $4C_3$ is a position within a range of the thickness of the battery device 2, such that it is possible to prevent an increase in the thickness of the secondary battery 1 and occurrence of an exterior appearance defect.

Figure 11B:
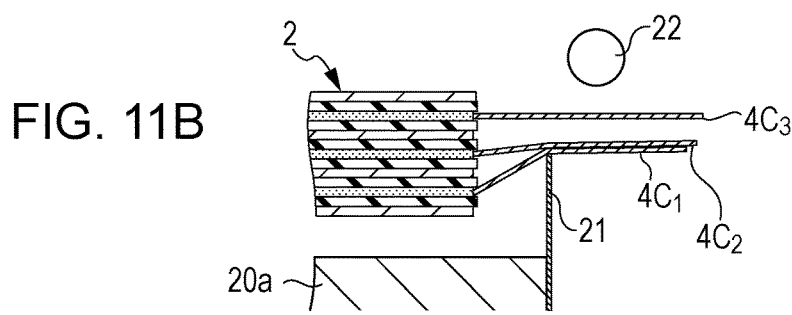

Subsequently, as shown in FIG. 11B, the battery device 2 is allowed to descend, or the work setting stand 20a is allowed to ascend. At this time, the smaller a gap between the battery device 2 and the U-shape bending thin plate 21, the more a space efficiency of the secondary battery 1 increases, such that for example, the gap between the battery device 2 and the U-shape bending thin plate 21 is made to be small step by step.

Figure 11C:
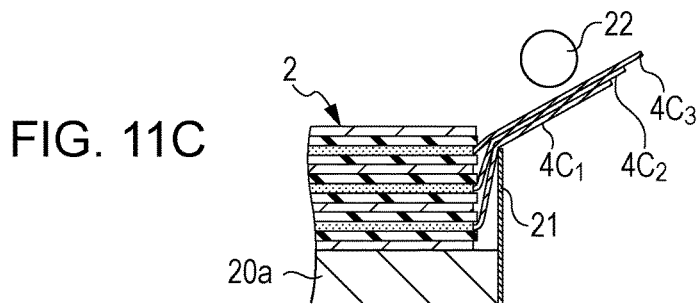
Figure 11D:
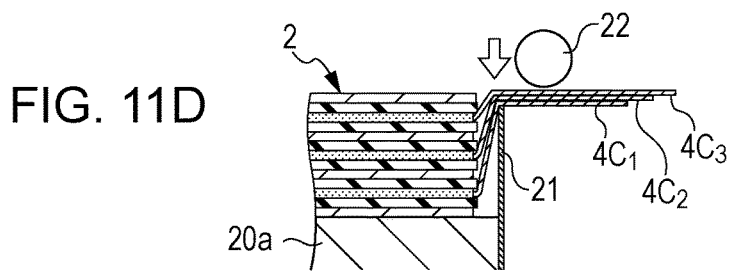
Figure 11E:
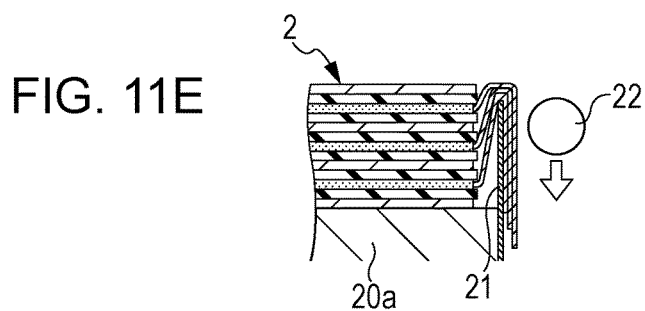

As shown in FIG. 11C, the battery device 2 is placed on the work setting stand 20a and a bending portion is formed in the positive electrode current collector exposed portions $4C_1$ to $4C_3$, and then as shown in FIGS. 11D and 11E, a roller 22 is allowed to descend and the positive electrode current collector exposed portions $4C_1$ to $4C_3$ are bent to have a U-shaped shape.

It is preferable that the U-shape bending thin plate 21 have a thickness of 1 mm or less, for example, an approximately 0.5 mm. As the U-shape bending thin plate 21, a material having strength necessary for forming a bent shape in the plurality of positive electrode current collector exposed portions 4C or the negative electrode current collector exposed portions 5C even in a small thickness may be used. The strength necessary for the U-shape bending thin plate 21 varies depending on the number of laminated sheets of the positive electrode 4 and the negative electrode 5, or hardness of a material used for the positive electrode current collector exposed portion 4C and the negative electrode current collector exposed portion 5C. The thinner the U-shape bending thin plate 21 is, the smaller a curvature of the positive electrode current collector $4C_1$ of the bending innermost periphery is, such that this is preferable because it is possible to make a space necessary for the bending of the positive electrode current collector exposed portion 4C small. As the U-shape bending thin plate 21, for example, stainless steel (SUS), reinforced plastic, plated steel, or the like may be used.

Process of Cutting Current Collector Exposed Portion

Next, the front ends of positive electrode current collector exposed portions $4C_1$ to $4C_3$ in which the U-shape bent portion is formed are cut and are made to be even. In a process of cutting a current collector exposed portion, a U-shape bent portion having an optimal shape is formed in advance, and a surplus portion of the positive electrode current collector exposed portion 4C and the negative electrode current collector exposed portion 5C are cut in conformity to the U-shaped bent shape. FIGS. 12A to 12E show side views illustrating a process of cutting the positive electrode current collector exposed portion 4C. Similarly, with respect to the negative electrode current collector exposed portion 5C, the process of cutting a current collector exposed portion is performed.

Figure 12A:
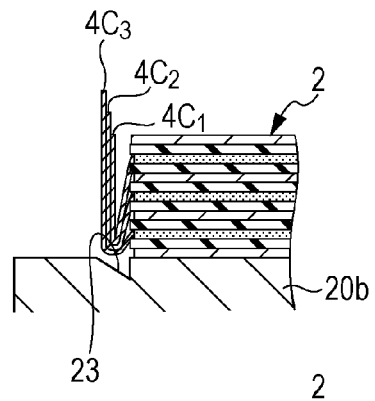
FIGS. 12A to 12E are schematic diagrams illustrating a process of forming a bent portion of a current collector exposed portion.

As shown in FIG. 12A, the top surface and the bottom surface of the battery device 2 in which the U-shaped bent portion is formed in the first U-shape bending process are inverted, and the battery device 2 is fixed to a work setting stand 20b provided with a recess 23 for a current collector sagging.

Figure 12B:
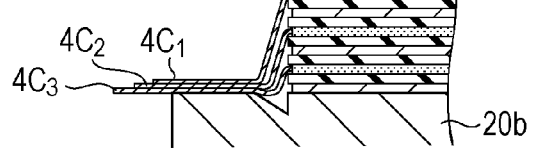

Next, as shown in FIG. 12B, the front end portion ranging from the U-shaped bent portion to the front end of the positive electrode current collector exposed portions $4C_1$ to $4C_3$ in which the U-shaped bending portion is formed is deformed in such a manner that the front end portion has an approximate L shape in conformity to the work setting stand 20b. At this time, a shape necessary for forming the U-shaped bent portion again is maintained, such that sagging that is as large as the positive electrode current collector exposed portion 4C3 of the bending outer periphery side occurs. This sagging penetrates into the recess 23 for a current collector sagging of the work setting stand 20b, and thereby the positive electrode current collector exposed portions $4C_1$ to $4C_3$ may be deformed without stress. In addition, the positive electrode current collector exposed portions $4C_1$ to $4C_3$ may be deformed with the front end portion of the positive electrode current collector exposed portions $4C_1$ to $4C_3$ being fixed.

Figure 12C:
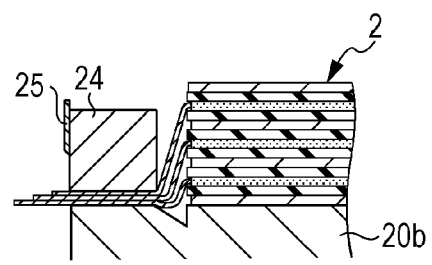
Figure 12D:
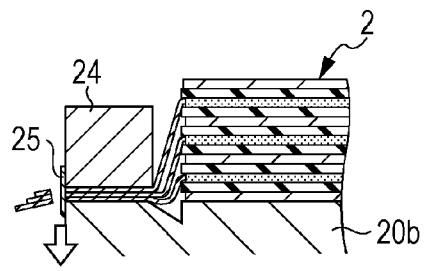
Figure 12E:
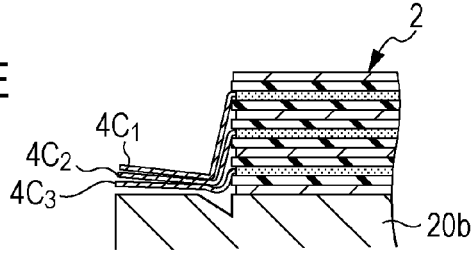

Subsequently, as shown in FIG. 12C, the positive electrode current collector exposed portions $4C_1$ to $4C_3$ are pressed against the work setting stand 20b using a current collector presser 24, and as shown in FIGS. 12D and 12E, for example, the front end of each of the positive electrode current collector exposed portions $4C_1$ to $4C_3$ is cut using a cutting knife 25 provided in conformity to the current collector presser 24 and is made to be even. A cutting place of the positive electrode current collector exposed portions $4C_1$ to $4C_3$ is determined such that the front end of the positive electrode current collector exposed portions $4C_1$ to $4C_3$ when the U-shape bending is performed again is located within a thickness range of the battery device 2 after at least the surplus portion of the front end of the positive electrode current collector exposed portions $4C_1$ to $4C_3$ is cut.

Tab Connection Process

Figure 13A:
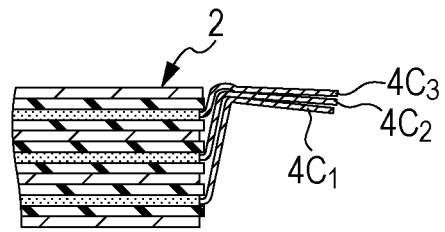
FIGS. 13A to 13C are schematic diagrams illustrating a process of connecting a tab.
Figure 13B:
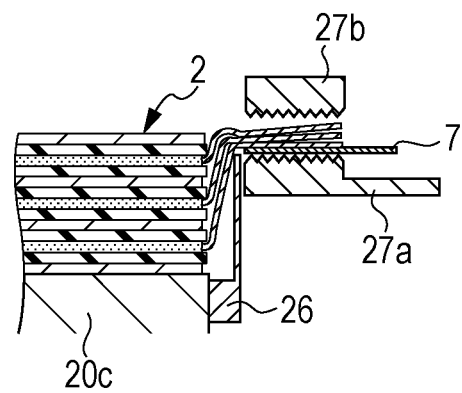
Figure 13C:
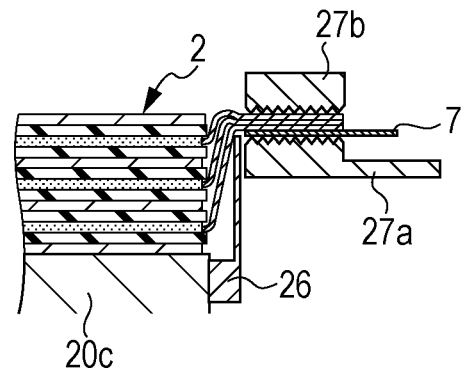

Subsequently, the connection between the positive electrode current collector exposed portions $4C_1$ to $4C_3$ and the positive electrode tab 7 is performed. In this tab connection process, the positive electrode current collector exposed portion 4C and the negative electrode current collector exposed portion 5C are fixed to the positive electrode tab 7 and the negative electrode tab 8, respectively, while the optimal U-shape bent shape formed in the first U-shape bending process being maintained. In this manner, the positive electrode current collector exposed portion 4C and the positive electrode tab 7, and the negative electrode current collector exposed portion 5C and the negative electrode tab 8 are electrically connected, respectively. FIGS. 13A to 13C show side views illustrating a connection process of the positive electrode current collector exposed portions $4C_1$ to $4C_3$ and the positive electrode tab 7. In addition, although not shown in the drawing, it is assumed that the sealant 10 is provided to the positive electrode tab 7 in advance. With respect to the negative electrode current collector exposed portion 5C and the negative electrode tab 8, the same connection process is performed.

As shown in FIG. 13A, the top surface and the bottom surface of the battery device 2 in which the surplus portion of the positive electrode current collector exposed portions $4C_1$ to $4C_3$ is cut in the process of cutting an electrode terminal are inverted again. Next, as shown in FIG. 13B, the battery device 2 is fixed to a work setting stand 20c provided with current collector shape maintaining plate 26. The front end of the current collector shape maintaining plate 26 is located at the bending inner periphery side of the positive electrode current collector exposed portion $4C_1$, such that the bent shape of the positive electrode current collector exposed portions $4C_1$ to $4C_3$ is maintained and an effect caused by an external factor such as ultrasonic vibration generated from a fixing device is prevented.

Subsequently, as shown in FIG. 13C, the positive electrode current collector exposed portions $4C_1$ to $4C_3$ and the positive electrode tab 7 are fixed through, for example, an ultrasonic welding. In the ultrasonic welding, for example, an anvil 27a provided under the positive electrode current collector exposed portions $4C_1$ to $4C_3$ and a horn 27b provided over the positive electrode current collector exposed portions $4C_1$ to $4C_3$ are used. The positive electrode current collector exposed portions $4C_1$ to $4C_3$ are set in advance on the anvil 27a, and the horn 27b descends and thereby the positive electrode current collector exposed portions $4C_1$ to $4C_3$ and the positive electrode tab 7 are interposed between the anvil 27a and the horn 27b. Ultrasonic vibration is applied to the positive electrode current collector exposed portions $4C_1$ to $4C_3$ and the positive electrode tab 7 by the anvil 27a and the horn 27b. In this manner, the positive electrode current collector exposed portions $4C_1$ to $4C_3$ and the positive electrode tab 7 are fixed to each other.

In addition, in the tab connection process, the positive electrode tab 7 may be connected to the positive electrode current collector exposed portion 4C in such a manner that the above-described inner periphery side bending margin R1 is formed with reference to FIG. 4A.

Tab Bending Process

Figure 14A:
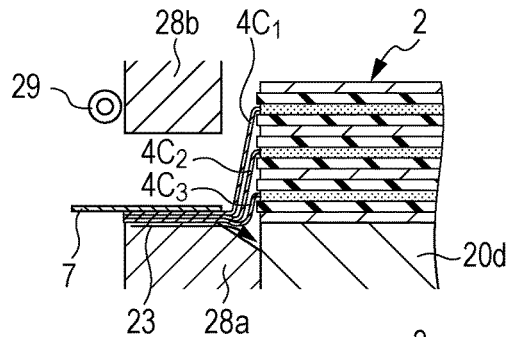
FIGS. 14A to 14E are schematic diagrams illustrating a process of forming a bent portion of the tab and the current collector exposed portion.
Figure 14B:
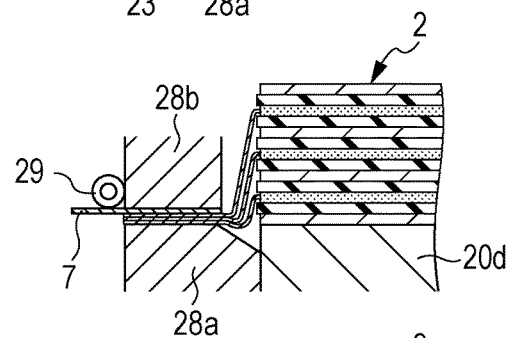
Figure 14C:
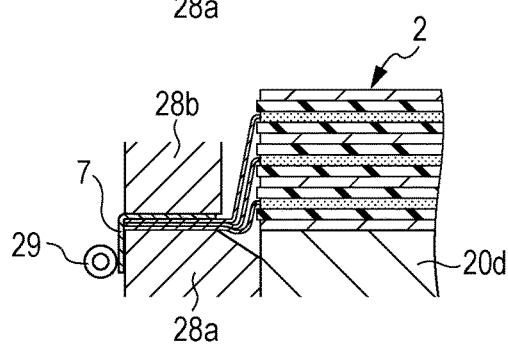

Next, the positive electrode current collector exposed portions $4C_1$ to $4C_3$ and the positive electrode tab 7 that are fixed to each other are bent to have a predetermined shape. FIGS. 14A to 14C show side vies illustrating the tab bending process of the positive electrode tab 7. In addition, although not shown in the drawing, in the tab bending process, the sealant 10 provided on the tab is also bent. In addition, with respect to the negative electrode current collector exposed portion 5C and the negative electrode tab 8, the tab bending process is performed.

As shown in FIG. 14A, in the tab connection process, the top surface and the bottom surface of the battery device 2 in which the positive electrode current collector exposed portions $4C_1$ to $4C_3$ and the positive electrode tab 7 are fixed to each other are inverted again, and the battery device 2 is fixed on a work setting stand 20d provided with a recess 23 for a current collector sagging. A connection portion between the positive electrode current collector exposed portions $4C_1$ to $4C_3$ and the positive electrode tab 7 are placed on a tab bending stand 28a.

Subsequently, as shown in FIG. 14B, the connection portion between the positive electrode current collector exposed portions $4C_1$ to $4C_3$ and the positive electrode tab 7 are pressed by a block 28b, and as shown in FIG. 14C, a roller 29 is allowed to descend, and thereby the positive electrode tab 7 protruded from the tab bending stand 28a and the block 28b is bent.

At this time, it is preferable that the positive electrode tab 7 be bent together with the sealant 10 that is thermally welded in advance. In this case, the bent portion of the positive electrode tab 7 is covered with the sealant 10, such that the positive electrode tab 7 and the exterior material 3 do not directly come into contact with each other. In this structure, the scraping between the resin layer inside the exterior material 3 and the positive electrode tab 7, damage to the exterior material 3, and a short circuit risk between the exterior material 3 and the metallic layer, which are caused by long-term vibration, an impact, or the like, may be decreased.

Insulator Providing Process

Figure 14D:
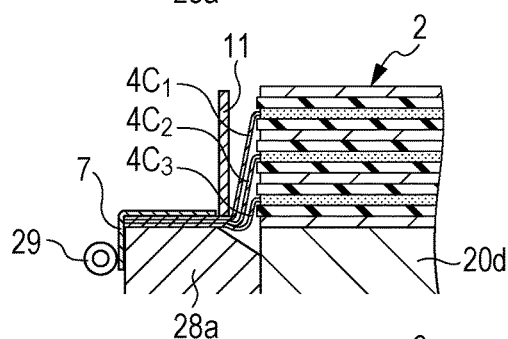

Subsequently, as shown in FIG. 14D, an insulator 11 is provided to be interposed between the battery device 2 and the positive electrode current collector exposed portions $4C_1$ to $4C_3$ that are bent in a second U-shape bending process described later. The insulator 11 is interposed between the battery device 2 and the positive electrode tab 7 when the positive electrode current collector exposed portions $4C_1$ to $4C_3$ are bent at an angle of 90° in the second U-shape bending process described later. In addition, when the insulator 11 is configured to have the approximately square shape or the box shape, the insulator 11 covers the battery device 2 in such a manner that the insulator 11 covers all side surfaces of the battery device 2.

Second Bending Process

Figure 14E:
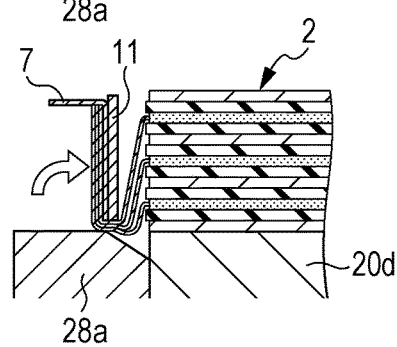

Subsequently, as shown in FIG. 14E, the connection portion between the positive electrode current collector exposed portions $4C_1$ to $4C_3$ and the positive electrode tab 7 are bent at an angle of 90° and thereby the battery device 2 is manufactured. In this second bending process, the positive electrode tab 7 and the negative electrode tab 8 form a U-shape bending portion, respectively, in the positive electrode current collector exposed portion 4C and the negative electrode current collector exposed portion 5C in conformity to the U-shaped shape formed in advance in the first U-shape bending process.

At this time, in a portion, which has a curvature, of the U-shaped bent portion, it is preferable that a bending external side curvature of a bent portion of the positive electrode current collector exposed portion $4C_1$ and a bending internal side curvature of a bent portion of the positive electrode current collector exposed portion $4C_2$ adjacent to the positive electrode current collector exposed portion $4C_1$ be approximately the same as each other. In addition, it is preferable that an outer curvature of the bent portion of the positive electrode current collector exposed portion $4C_2$ and an inner curvature of a bent portion of the positive electrode current collector exposed portion $4C_3$ adjacent to the positive electrode current collector exposed portion $4C_2$ be approximately the same as each other. It is preferable that in the positive electrode current collector exposed portion $4C_1$ of the innermost periphery, an inner side shape of the bent portion is formed in conformity to a shape of the U-shape bending thin plate 21.

That is, in the U-shaped bent portion, it is preferable that curvatures in surfaces, which are opposite to each other, of two adjacent positive electrode current collector exposed portions 4C be approximately the same as each other. In this manner, in a portion ranging from the U-shaped bent portion of the positive electrode current collector exposed portion 4C to the front end thereof, a unnecessary gap is not generated between the adjacent two positive electrode current collector exposed portions 4C, and thereby space efficiency is improved.

In addition, in the above-described process, the description is given only with respect to the positive electrode current collector exposed portions $4C_1$ to $4C_3$, but the U-shape bending may be performed with respect to the negative electrode current collector exposed portion 5C by using the same method.

Packaging Process and Injecting and Sealing Process

The battery device 2 manufactured as described above is packaged by the exterior material 3 such as a laminated film, as shown in FIGS. 10B to 10D. In addition, the sealant 10 is provided at each region, which comes into contact with the exterior material 3, of the positive electrode tab 7 and the negative electrode tab 8.

In this packaging process, first, the battery device 2 is accommodated in the concave portion 9, which is formed by a deep drawing, of the first exterior material 3A, and the battery device 2 is interposed between the first exterior material 3A and the second exterior material 3B in the vertical direction. Then, a peripheral portion of the concave portion 9 with one side left is thermally fused through a thermal fusion, and an electrolytic solution is injected from the non-fused side, and then the remaining one side is thermally welded and is sealed. Through the above-described processes, the secondary battery 1 is obtained. In addition, the insulator 11 is also packaged together with the battery device 2 by the exterior material 3. In addition, in regard to the exterior material 3, in addition to the configuration where the battery device 2 is vertically interposed between the two sheets of laminated films, a configuration where a part of one sheet of exterior material 3 is subjected to a deep drawing and the exterior material 3 is folded back to cover a concave portion 9 may be adopted. In addition, the concave portion 9 formed in the exterior material 3 may be formed in each surface of the first and second exterior material 3A and 3B opposite to each surface of the battery device 2 through the deep drawing. In this case, the positive electrode tab 7 and the negative electrode tab 8 are configured to be bent at a middle portion of the battery device 2 in a thickness direction thereof and to be lead-out to the outside of the exterior material 3.

In the secondary battery 1 manufactured as described above, the U-shaped bent portion of each of the positive electrode current collector exposed portion 4C and the negative electrode current collector exposed portion 5C has maintained an optimal U-shaped bent shape obtained in the first U-shape bending process. Therefore, it is possible to improve space efficiency without enormous stress, wrinkling, or twisting occurred in the U-shaped bent portion of the positive electrode current collector exposed portion 4C and the negative electrode current collector exposed portion 5C.

Second Embodiment

Configuration of Secondary Battery

Figure 15A:
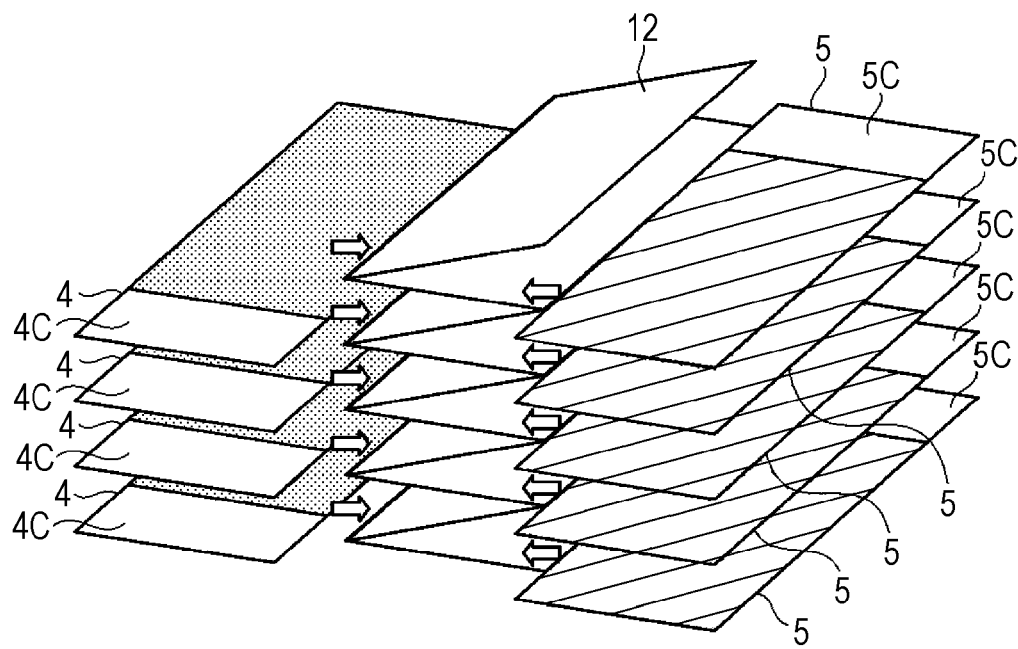
FIG. 15A is a schematic diagram illustrating a laminated structure of a positive electrode, a negative electrode, and a separator in a secondary battery according to a second embodiment of the present disclosure.
Figure 15B:
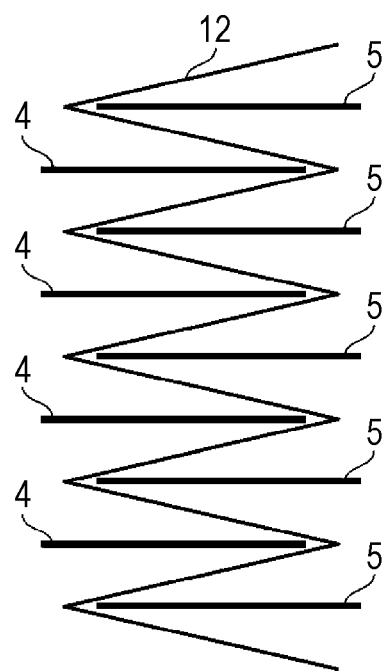
FIG. 15B is a side view illustrating the laminated structure of the positive electrode, the negative electrode, and the separator.

Next, a second embodiment of the present disclosure will be described. FIGS. 15A and 15B show schematic diagrams illustrating a method of laminating a positive electrode 4, a negative electrode 5, and a separator 12 according to the second embodiment. FIG. 15A shows a perspective view illustrating an exterior appearance of a laminated state, and FIG. 15B shows a schematic side view illustrating the laminated state. In the second embodiment, like reference numerals will be given to substantially the same parts as those in the first embodiment, or parts corresponding thereto. The second embodiment is different from the first embodiment in that the separator 12 is formed in a long strip shape and is folded in a zigzag fashion, and the battery device 2 is configured by laminating the positive electrode 4 and the negative electrode 5 with these interposed between the folded portions of folded separator 12, respectively. In addition, a configuration of the secondary battery 1 other than a configuration of the separator 12 is the same as that in the first embodiment.

Separator

The separator 12 isolates the positive electrode 4 and the negative electrode 5, and allows lithium ions to pass therethrough while preventing a short circuit of current caused when both electrodes come into contact with each other. In the second embodiment, the separator 12 has a long strip shape. The separator 12 is folded in a zigzag fashion with an interval that is substantially the same as that of the positive electrode 4 and the negative electrode 5. The width of a surface of each separator 12 formed by folding the separator 12 having the strip shape in a zigzag fashion is substantially the same as that of the positive electrode 4 and the negative electrode 5. For example, the separator 12 is folded by bringing a claw-like protrusion into contact with a folded portion. In addition, similarly to the first embodiment, the separator 12 may be configured by, for example, a single layer or plural laminated layers of a synthetic resin-based porous film such as polytetrafluoroethylene, polypropylene, and polyethylene, a ceramic porous film, non-woven fabric, or a cellulose porous film. Particularly, as the separator 12, a porous film formed of polyolefin is preferable. In addition, as the separator 12, a film, which is obtained by forming a porous resin layer such as polyvinylidene fluoride (PVdF) or polytetrafluoroethylene (PTFE) on a minutely porous film such as polyolefin, may be used.

Battery Device

Each of plural sheets of positive electrodes 4 and each of plural sheets of negative electrodes 5 are alternately interposed between the folded portions of the separator 12 folded in a zigzag fashion, and thereby the battery device 2 is configured. The positive electrode 4 is interposed in such a manner that the positive electrode current collector exposed portion 4C leads-out from a space between the folded portions of the separator 12 in a direction parallel with the folding direction of the separator 12. The negative electrode 5 is also interposed in such a manner the negative electrode current collector exposed portion 5C leads-out from a space between the folded portions of the separator 12 in a direction parallel with the folding direction of the separator 12.

In addition, the positive electrode 4 and the negative electrode 5 are interposed between the folded portions of the separator 12 in such a manner that the positive electrode current collector exposed portion 4C and the negative electrode current collector exposed portion 5C are opposite to each other. As described above, similarly to the first embodiment, in the second embodiment, the battery device 2 is configured in such a manner that the positive electrode current collector exposed portion 4C and the negative electrode current collector exposed portion 5C do not face the same direction. In this manner, a width of the positive electrode tab 7 connected to the positive electrode current collector exposed portion 4C and a width of the negative electrode tab 8 connected to the negative electrode current collector exposed portion 5C can be approximately equal to a width of the battery device 2 to the most, such that an input and output of a large current may be realized.

Method of Manufacturing Secondary Battery

The secondary battery 1 according to the second embodiment may be manufactured by the following process. In addition, a process of manufacturing the positive electrode 4 and a process of manufacturing the negative electrode 5 are similar to the first embodiment.

Lamination Process

As shown in FIGS. 15A and 15B, the positive electrode 4 and the negative electrode 5 are provided to be interposed between the folded portions, which are folded in a zigzag fashion, of the separator 12. In this manner, predetermined sheets of positive electrode 4 and predetermined sheets of negative electrode 5 can be laminated in such a manner that the positive electrode 4 and the negative electrode 5 are laminated alternately with the separator 12 interposed therebetween, for example, in the order of the negative electrode 5, the separator 12, the positive electrode 4, the separator 12, the negative electrode 5, . . . the separator 12, and the negative electrode 5.

The positive electrode 4, the negative electrode 5, and the separator 12 are fixed to closely come into contact with each other, and thereby a laminated electrode body is manufactured. In this fixing process, a fixing member (not shown) such an adhesive tape is used. The fixing member is provided at both side portions and the bottom portion of the laminated electrode body. In the case of using a gel electrolyte, a gel electrolyte layer is formed on both surfaces of the positive electrode 4 and the negative electrode 5, respectively, and the positive electrode 4 and the negative electrode 5 are laminated with the separator 12 interposed therebetween. In this manner, the battery device 2 is configured.

In addition, similarly to the first embodiment, it is preferable that the dimensions of the separator 12 be set so as not to cover a half or more of a depth of the positive electrode current collector exposed portion 4C and the negative electrode current collector exposed portion 5C. This is because when a half or more of the depth of the positive electrode current collector exposed portion 4C and the negative electrode current collector exposed portion 5C is covered by the separator 12, a bonding area between the positive electrode current collector exposed portion 4C and the positive electrode tab 7, and a bonding area between the negative electrode current collector exposed portion 5C and the negative electrode tab 8 become narrow, and therefore an input and output characteristic becomes deteriorated.

Post Process of Lamination

Post processes of a lamination process are similar to the first embodiment. That is, after the lamination process, first, in a first U-shaped bending process, the positive electrode current collector exposed portion 4C and the negative electrode current collector exposed portion 5C are bent as shown in FIG. 9B. Next, in a current collector cutting process, as shown in FIG. 9C, a surplus portion in the front end of the bent positive electrode current collector exposed portion 4C is cut and thereby the front end is made to be even. Similarly, the front end of the negative electrode current collector exposed portion 5C is cut and made to be even.

Next, in a tab connection process, as shown in FIG. 9D, a connection between the positive electrode current collector exposed portion 4C and the positive electrode tab 7, and a connection between the negative electrode current collector exposed portion 5C and the negative electrode tab 8 are performed, respectively. In addition, in this process, a process of providing the sealant 10 to the positive electrode tab 7 and the negative electrode tab 8 is also included. Next, in the tab bending process, as shown in FIG. 9E, the positive electrode tab 7 connected to the positive electrode current collector exposed portion 4C and the negative electrode tab 8 connected to the negative electrode current collector exposed portion 5C are bent into a predetermined shape.

Next, in a process of providing the insulator, as shown in FIG. 9F, the insulator 11 is provided to a side surface of the battery device 2 at the side of the positive electrode current collector exposed portion 4C. Next, according to necessity, the insulator 11 is further provided to a side surface of the battery device 2 at the side of the negative electrode current collector exposed portion 5C. Next, as shown in FIG. 10A, in a second U-shape bending process, in regard to the positive electrode current collector exposed portion 4C, a portion connected to the positive electrode tab 7 is bent at an angle of 90°. Next, in the second U-shape bending process, in regard to the negative electrode current collector exposed portion 5C, a portion connected to the negative electrode tab 8 is bent at an angle of 90°. Next, as shown in FIGS. 10B and 10C, in a first packaging process, in a concave portion 9 of a laminated film (first exterior material 3A) as an exterior material that has an approximately rectangular shape and the concave portion 9 formed at a central portion by a deep drawing, the battery device 2 is accommodated and is packaged. Next, as shown in FIG. 10D, in a second packaging process, the concave portion 9 is covered by a laminated film (second exterior material 3B) that has a flat plate shape. In this manner, the battery device 2 is packaged by the exterior material 3.

As shown in FIG. 10E, in an injecting and sealing process, a peripheral portion of the concave portion with one side left is thermally fused through a thermal fusion, and an electrolytic solution is injected from the non-fused side, and then the this remaining one side is thermally welded and is sealed. Through the above-described processes, the secondary battery 1 as shown in FIG. 1A or FIG. 10F is obtained.

According to the second embodiment, in the process of manufacturing the secondary battery device 2, it is not necessary to sequentially laminate the positive electrode 4, the negative electrode 5, and the separator 12, and an operation for inserting the positive electrode 4 between the folded portion of the separator 12 and an operation for inserting the negative electrode 5 between the folded portion of the separator 12 may be performed concurrently. Therefore, manufacturing efficiency of the secondary battery 1 is increased, and productivity is improved.

Figure 16A:
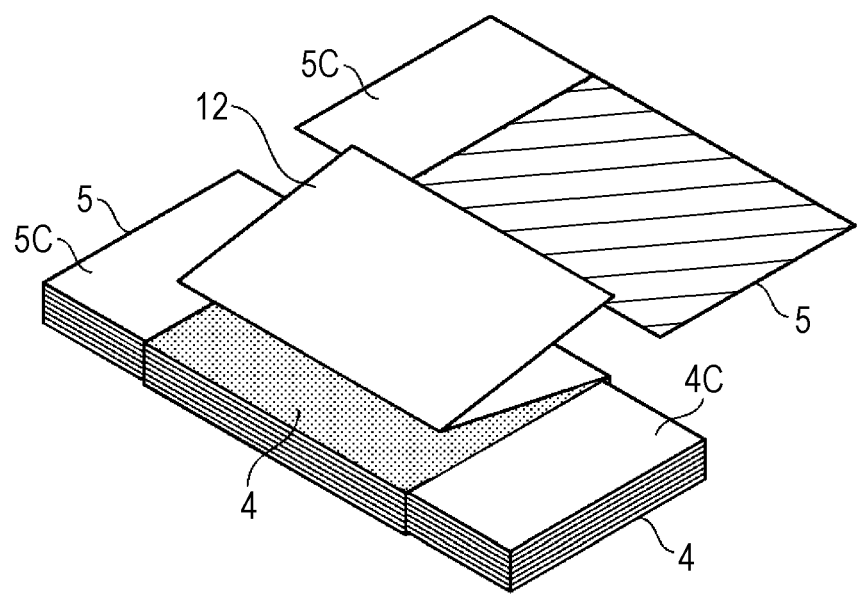
FIGS. 16A and 16B are schematic diagrams illustrating a modification of the laminated structure of the positive electrode, the negative electrode, and the separator.
Figure 16B:
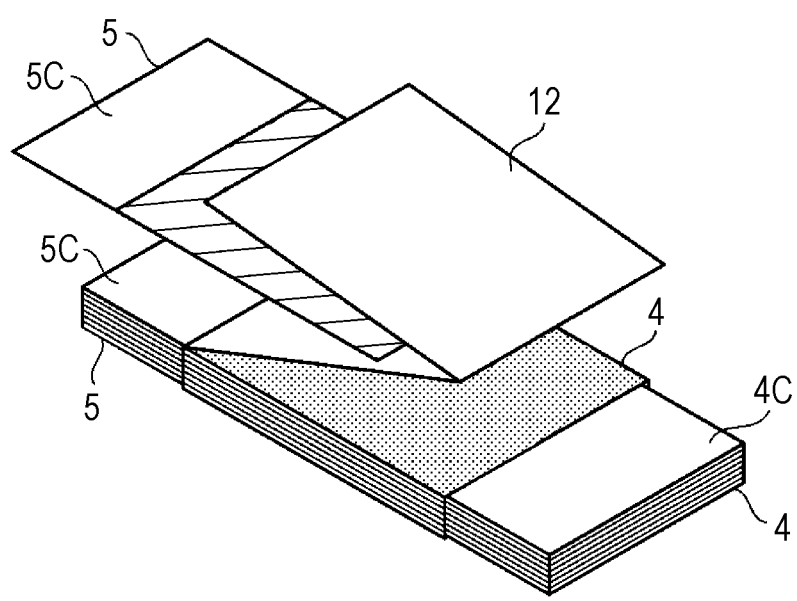

In addition, the folding direction of the separator 12 is not limited to a direction along the longitudinal direction of a folded portion of the separator 12 as shown in FIG. 16A. As shown in FIG. 16B, the separator 12 may be folded in a direction along the lateral direction of the folded portion of the separator 12. In this case, similarly to a case where the folding is performed along the longitudinal direction, the positive electrode 4 and the negative electrode 5 are interposed between the folded portions of the separator 12 in such a manner that the positive electrode current collector exposed portion 4C and the negative electrode current collector exposed portion 5C are lead-out in directions opposite to each other.

Third Embodiment

Configuration of Secondary Battery

Figure 17A:
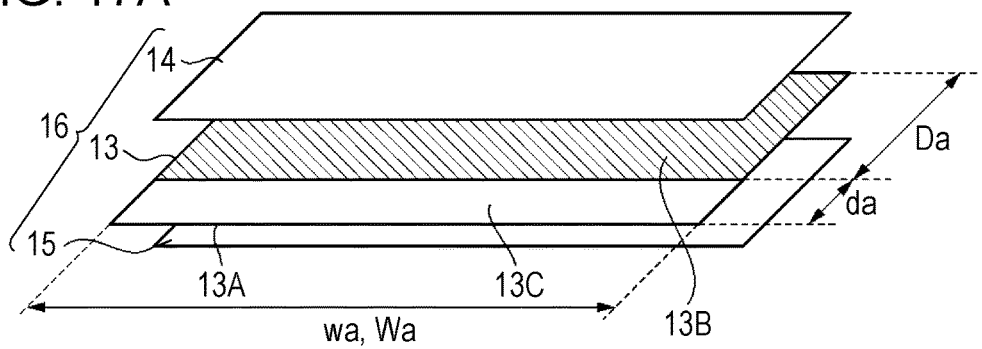
FIG. 17A is a schematic diagram illustrating a laminated structure of a negative electrode and a separator according to a third embodiment of the present disclosure.
Figure 17B:
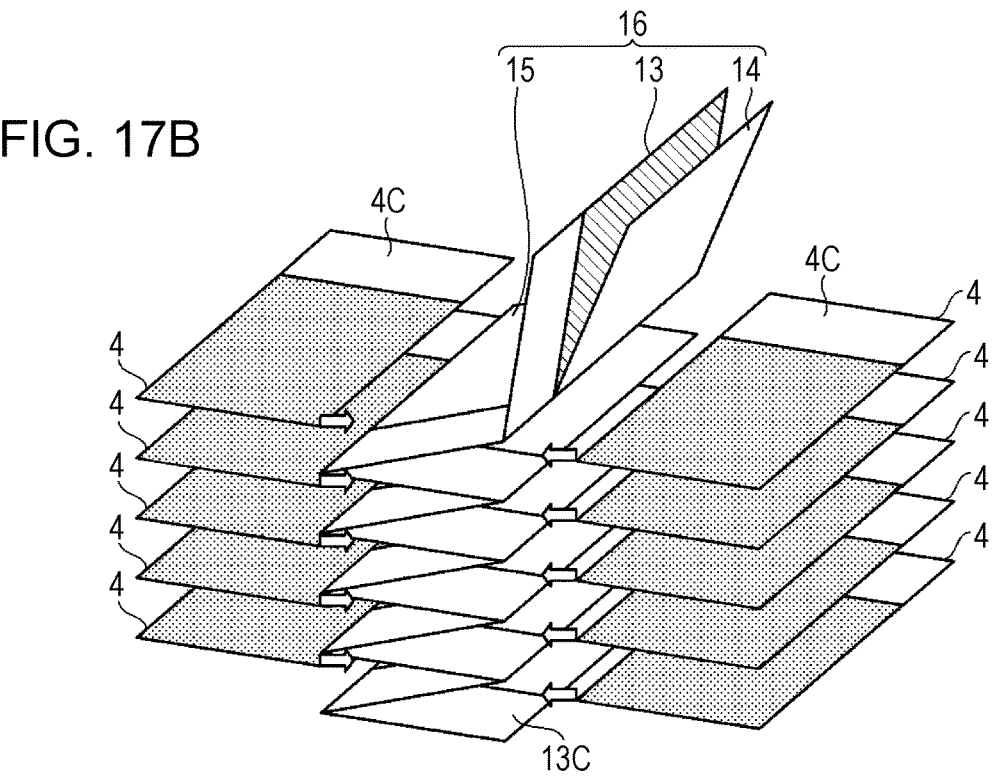
FIG. 17B is a schematic diagram illustrating a laminated structure of a positive electrode, a negative electrode, and a separator in a secondary battery according to the third embodiment of the present disclosure.
Figure 17C:
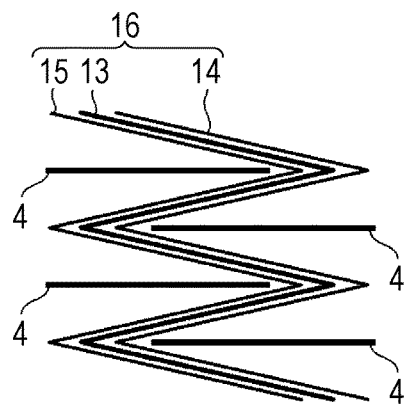
FIG. 17C is a side view illustrating the laminated structure of the positive electrode, the negative electrode, and the separator.

Next, a third embodiment of the present disclosure will be described. FIG. 17A to FIG. 17C show schematic diagrams illustrating a lamination structure of a positive electrode 4, a negative electrode 13 and a separator according to a third embodiment of the present disclosure. FIG. 17A shows a schematic diagram illustrating a lamination structure of a first separator 14, a negative electrode 13 and a second separator 15, and FIG. 17B shows a perspective view illustrating an external appearance of a lamination state, and FIG. 17C shows a schematic side view illustrating the lamination state. In the third embodiment, like reference numerals will be given to substantially the same parts as those in the first embodiment, or parts corresponding thereto.

The third embodiment is similar to the second embodiment in that the positive electrode 4, the negative electrode 13, and the separator are laminated using a folding in zigzag fashion. However, the third embodiment is different from the second embodiment in that the negative electrode 13 is also formed in a long strip shape, the negative electrode 13 is interposed between two sheets of separators, the negative electrode 13 and the two sheets of separators are folded in a zigzag fashion, and the positive electrode 4 is interposed between folded portions of the separators and thereby a battery device is configured. In addition, a configuration of the secondary battery 1 other than that of the separator and the negative electrode 13 is substantially the same as that of the first embodiment.

Negative Electrode

A negative electrode current collector 13A making up the negative electrode 13 is formed in a long strip shape similar to the separator. A negative electrode active material layer 13B is provided on both surfaces of the negative electrode current collector 13A in such a manner that a negative electrode current collector exposed portion 13C having a predetermined dimension of depth is formed in the lateral direction. In this manner, the negative electrode 13 is formed in a long strip shape as shown in FIG. 17A. Similarly to the first and second embodiments, in the third embodiment, a negative electrode active material layer 13B is not provided on the entirety of the both surfaces of the negative electrode current collector 13A. The negative electrode 13 is formed in a long strip shape, such that the width of the negative electrode current collector exposed portion 13C and the width of the negative electrode active material layer 13B are substantially the same as each other. That is, the width wa of the negative electrode current collector exposed portion 13C (a dimension in a longitudinal direction in FIG. 17A) and the width Wa of the negative electrode active material layer 13B (a dimension in a longitudinal direction in FIG. 17A) are configured to satisfy the following equation (9).

$$(wa/Wa)=1.0 \qquad (9)$$

The width of the negative electrode current collector exposed portion 13C and the width of the negative electrode active material layer 13B are substantially the same as each other, such that in the process of manufacturing the negative electrode 13, a process such as a punching process or a cutting process for making the negative electrode current collector exposed portion 13C thin is not necessary, other than a process of applying the negative electrode active material layer 13B on the negative electrode current collector 13A, and therefore it is possible to make a manufacturing process of the negative electrode 13 simple. In addition, a material of the negative electrode current collector 13A, a material of the negative electrode active material layer 13B, or the like are the same as those in the first embodiment.

In addition, similarly to the first embodiment, it is preferable that the depth da of the negative electrode current collector exposed portion 13C (a dimension in a lateral direction in FIG. 17A) and the depth Da of the negative electrode active material layer 13B (a dimension in a lateral direction in FIG. 17A) satisfy the following equation (10).

$$0.02<(da/Da)\leq0.40 \qquad (10)$$

Separator

The separator isolates the positive electrode 4 and the negative electrode 13, and passes lithium ion therethrough while preventing a short circuit of current due to contact between the both electrodes. In the third embodiment, two separators, that is, the first separator 14 and the second separator 15 are used. The first separator 14 and the second separator 15 are formed in a long strip shape similarly to the negative electrode 13, and dimensions of the first and second separators 13 and 14 are substantially the same as each other. In addition, as shown in FIG. 17A, the first separator 14 and the second separator 15 are configured in such a manner that a length in a lateral direction is shorter than that of the negative electrode 13. This is because the negative electrode current collector exposed portion 13C is configured to be lead-out from a space between the first separator 14 and the second separator 15 in a state where the negative electrode 13 is interposed between the first separator 14 and the second separator 15.

In addition, similarly to the first embodiment, the separator may be configured by, for example, a single layer or plural laminated layers of a synthetic resin-based porous film such as polytetrafluoroethylene, polypropylene, and polyethylene, or a ceramic porous film. Particularly, as the separator, a porous film formed of polyolefin is preferable. In addition, as the separator, a layer, which is obtained by forming a porous resin layer formed of polyvinylidene fluoride (PVdF), polytetrafluoroethylene (PTFE), or the like on a minutely porous film formed of polyolefin or the like, may be used.

Battery Device

The negative electrode 13 is interposed between the first separator 14 and the second separator 15 which are configured as described above, such that the first separator 14, the second separator 15, and the negative electrode 13 are integrally configured. Hereinafter, a three-layer structure in which the negative electrode 13 is interposed between the first separator 14 and the second separator 15 is referred to as a three-layer body 16. The negative electrode 13 is configured in such a manner that the dimension thereof in the lateral direction is made to be larger than that of the first separator 14 and the second separator 15, such that the negative electrode current collector exposed portion 13C is led-out from a space between the first separator 14 and the second separator 15 of the three-layer body 16.

The three-layer body 16 is folded in a zigzag fashion with an interval that is substantially the same as the width of the positive electrode 4. The width of each folded portion formed by folding the three-layer body 16 in a zigzag fashion is substantially the same as that of the positive electrode 4.

Each of plural sheets of positive electrodes 4 is interposed between the folded portions of the three-layer body 16 folded in a zigzag fashion, and thereby a battery device is configured. The positive electrode 4 is interposed between the folded portions of the three-layer body 16 in such a manner that a positive electrode collector exposed portion 4C leads-out from a space between the folded portions of the three-layer body 16 in a direction parallel with the folding direction of the three-layer body 16. In addition, the positive electrode 4 is interposed in such a manner that the positive electrode collector exposed portion 4C leads-out in a direction opposite to the leading-out direction of the negative electrode current collector exposed portion 13C. As described above, similarly to the first embodiment, in the third embodiment, the battery device is configured in such a manner that the positive electrode collector exposed portion 4C and the negative electrode current collector exposed portion 13C do not face the same direction. In this manner, a width of a positive electrode tab connected to the positive electrode collector exposed portion 4C and a width of a negative electrode tab connected to the negative electrode current collector exposed portion 13C can be approximately equal to the width of the battery device to be the optimal, such that an input and output of a large current may be realized.

Method of Manufacturing Secondary Battery

The secondary battery 1 according to the third embodiment may be manufactured by the following process. In addition, a process of manufacturing the positive electrode 4 is similar to the first embodiment.

Manufacturing of Negative Electrode

First, for example, a negative electrode active material and a binding agent are mixed, and this negative electrode mixture is dispersed in a solvent such as N-methylpyrrolidone and thereby a negative electrode mixture slurry is obtained. Subsequently, this positive electrode mixture slurry is applied onto the negative electrode current collector 13A. In addition, in this application process, the negative electrode mixture slurry is applied in such a manner that the negative electrode current collector exposed portion 13C in which the negative electrode active material layer 13B is not formed on the negative electrode current collector 13A is formed, instead of being applied onto the entire surface of the negative electrode current collector 13A. Next, the applied negative electrode mixture slurry is dried, and then the negative electrode current collector 13A is compression-molded by a roll pressing machine or the like and thereby the negative electrode active material layer 13B is formed. Through the above-described processes, the negative electrode 13 is manufactured. In addition, in the third embodiment, it is not necessary to perform a cutting process of cutting the negative electrode 13 into a predetermined size, such that manufacturing efficiency is improved.

Lamination Process

First, the negative electrode 13 is interposed between the first separator 14 and the second separator 15, and thereby the three-layer body 16 is formed. Next, the three-layer body 16 is folded in a zigzag fashion in plural times. The three-layer body 16 is folded by bringing a claw-like protrusion into contact with a folded portion. As shown in FIGS. 17A and 17B, each sheet of the positive electrode 4 is interposed between the folded portions of the three-layer body 16 that is folded in a zigzag fashion. In this manner, predetermined sheets of positive electrode 4 and predetermined sheets of negative electrode 13 are laminated alternately with the separator interposed therebetween, for example, in the order of the negative electrode 13, the separator, the positive electrode 4, the separator, the negative electrode 13, . . . , the separator, the negative electrode 13. In addition, in the third embodiment, similarly to the first embodiment, the positive electrode 4 and the negative electrode 13 are laminated in such a manner that the positive electrode collector exposed portion 4C and the negative electrode current collector exposed portion 13C are opposite to each other. That is, the positive electrode current collector exposed portion 4C and the negative electrode current collector exposed portion 13C are configured so as not to face the same direction. In this manner, it is possible to make the width of the positive electrode tab be connected to the positive electrode current collector exposed portion 4C and the width of the negative electrode tab connected to the negative electrode current collector exposed portion 13C can be approximately equal to the width of the battery device to the most, such that an input and output of the large current may be realized.

The positive electrode 4, the negative electrode 13, and the separator are fixed to closely come into contact with each other, and thereby a laminated electrode body is manufactured. In this fixing process, a fixing member (not shown) such an adhesive tape is used. The fixing member is provided at both side portions and the bottom portion of the laminated electrode body. In the case of using a gel electrolyte, a gel electrolyte layer is formed on both surfaces of the positive electrode 4 and the negative electrode 13, respectively, and the positive electrode 4 and the negative electrode 13 are laminated with the separator interposed therebetween, and thereby a battery device is configured.

In addition, similarly to the first embodiment, it is preferable that the dimensions of the separator be set so as not to cover a half or more of the depth of the positive electrode current collector exposed portion 4C and the negative electrode current collector exposed portion 13C. This is because when a half or more of the positive electrode current collector exposed portion 4C and the negative electrode current collector exposed portion 13C are covered by the separator, a bonding area between the positive electrode current collector exposed portion 4C and the positive electrode tab 7, and a connection area between the negative electrode current collector exposed portion 13C and the negative electrode tab 8 become narrow, and therefore an input and output characteristic becomes deteriorated.

Post Process of Lamination

Post processes of a lamination process are similar to the first embodiment. That is, after the lamination process, first, in a bending process, the positive electrode current collector exposed portion 4C and the negative electrode current collector exposed portion 13C are bent as shown in FIG. 9B. Next, in a current collector cutting process, as shown in FIG. 9C, a surplus portion in the front end of the bent positive electrode current collector exposed portion 4C is cut and thereby the front end is made to be even. Similarly, the front end of the negative electrode current collector exposed portion 13C is cut and made to be even.

Next, in a connection process, as shown in FIG. 9D, a connection between the positive electrode current collector exposed portion 4C and the positive electrode tab 7, and a connection between the negative electrode current collector exposed portion 13C and the negative electrode tab 8 are performed, respectively. In addition, in this process, a process of providing the sealant 10 to the positive electrode tab 7 and the negative electrode tab 8 is also included. Next, in the tab bending process, as shown in FIG. 9E, the positive electrode tab 7 connected to the positive electrode current collector exposed portion 4C and the negative electrode tab 8 connected to the negative electrode current collector exposed portion 13C are bent into a predetermined shape.

Next, in a process of providing the insulator, as shown in FIG. 9F, the insulator 11 is provided to a side surface of the battery device at the side of the positive electrode current collector exposed portion 4C. Next, according to necessity, the insulator 11 is further provided to a side surface of the battery device at the side of the negative electrode current collector exposed portion 5C. Next, as shown in FIG. 10A, in a second bending process, in regard to the positive electrode current collector exposed portion 4C, a portion connected to the positive electrode tab 7 is bent at an angle of 90°. Next, in the second bending process, in regard to the negative electrode current collector exposed portion 5C, a portion connected to the negative electrode tab 8 is bent at an angle of 90°. Next, as shown in FIGS. 10B and 10C, in a first packaging process, in a concave portion of a laminated film (first exterior material 3A) as an exterior material that has an approximately rectangular shape and the concave portion formed at a central portion by a deep drawing, the battery device 2 is accommodated and is packaged. Next, as shown in FIG. 10D, in a second packaging process, the concave portion is covered by a laminated film (second exterior material 3B) that has a flat plate shape. In this manner, the battery device 2 is packaged by the exterior material.

As shown in FIG. 10E, in an injecting and sealing process, a peripheral portion of the concave portion 9 with one side left is thermally fused through a thermal fusion, and an electrolytic solution is injected from the non-fused side, and then the remaining one side is thermally welded and is sealed. Through the above-described processes, the secondary battery 1 as shown in FIG. 10F is obtained.

According to the third embodiment, a set of the positive electrode 4, the negative electrode 13, and the separator is laminated by performing the folding in a zigzag fashion one time, such that a lamination velocity can be increased two times compared to a structure in which one sheet of separator is folded in a zigzag fashion. Therefore, manufacturing efficiency of the secondary battery 1 is increased, and productivity is improved. In addition, the separator is not folded alone. The negative electrode 13 is interposed between the first separator 14 and the second separator 15, and the resultant laminated body including the negative electrode 13 is folded in a zigzag fashion, such that the rigidity of the entirety of the battery device can be increased compared to a case where only the separator is folded in a zigzag fashion. In this manner, in addition to the resistance against vibration, impact, or the like, it is possible to prevent lamination variation from occurring in a battery pack configured by using the secondary battery 1.

In addition, the first separator 14, the second separator 15, and the negative electrode 13 are made to closely come into contact with each other, and these are collectively folded in a zigzag fashion, such that it is not necessary to form a clearance for the permission of a lamination accuracy error. Therefore, the size of the positive electrode 4 and the negative electrode 13 can be increased, and thereby it is possible to realize the secondary battery 1 having a high energy density. In addition, it is not necessary to perform a cutting process of cutting the negative electrode 13 into a predetermined size, such that it is possible to decrease a contamination risk.

In addition, as the positive electrode 4 and the negative electrode 13 are not sealed by the separator, conduction with the current collector is easily made, and particularly, this configuration is useful for a large current type secondary battery 1. In addition, an adverse effect on the battery due to a distortion of the separator caused by the folding, which is a concern in a sealing structure by the separator, is not present. In addition, as the positive electrode 4 is configured to be interposed in the negative electrode 13, there is no concern that lithium (Li) precipitates. In addition, as both-side application type positive electrode 4 and negative electrode 13 can be efficiently laminated, instead of laminating foil surfaces of single-side application type positive electrode 4 and negative electrode 13 back to back with each other, it is possible to manufacture a thin secondary battery 1, that is, a secondary battery 1 with a high energy density while maintaining a capacity.

Figure 18A:
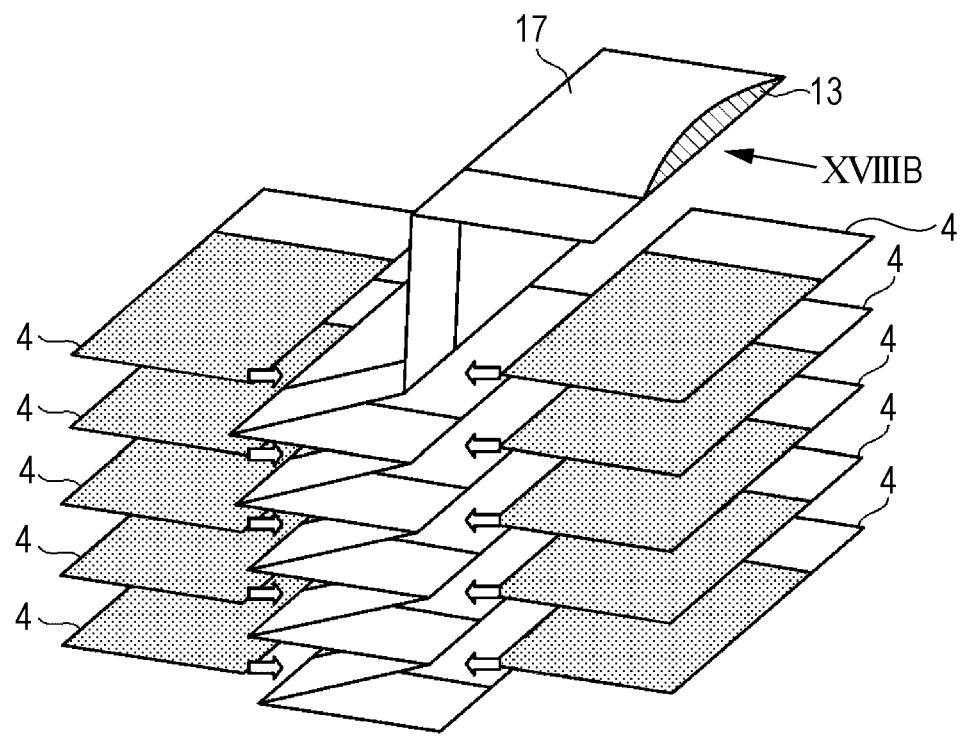
FIG. 18A is a schematic diagram illustrating a modification of the laminated structure of the positive electrode, the negative electrode, and the separator in the secondary battery according to the third embodiment of the present disclosure.
Figure 18B:
FIG. 18B is a view seen in a direction of an arrow XVIIIB in FIG. 18A.

In the above description, as an example where the negative electrode 13 is interposed by the separator, a configuration where the negative electrode 13 is interposed by two sheets of separators, that is, the first separator 14 and the second separator 15 is exemplified, but the configuration of interposing the negative electrode 13 by the separator is not limited to such an example. FIGS. 18A and 18B show diagrams illustrating a modification. FIG. 18A shows a diagram illustrating an exterior appearance of a lamination state, and FIG. 18B show a view seen in a direction of an arrow XVIIIB in FIG. 18A. As shown in FIGS. 18A and 18B, one sheet of separator 17 may be folded back along a longitudinal direction thereof and a negative electrode 13 may be interposed between the folded portions. In this configuration, the same effect as that of the configuration where the above-described two sheets of separator are used may be accomplished.

Fourth Embodiment

Configuration of Secondary Battery

Figure 25A:
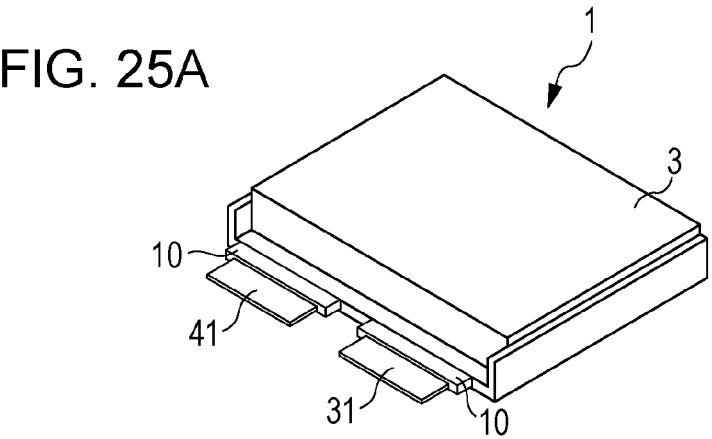
FIG. 25A is perspective view illustrating an example of an exterior appearance of a secondary battery according to a fourth embodiment of the present disclosure.

FIG. 25A shows a perspective view illustrating an external appearance of a secondary battery according to this fourth embodiment of the present disclosure. As shown in FIG. 25A, the secondary battery according to this fourth embodiment is different from that of the first embodiment in that a positive electrode tab 31 and a negative electrode tab 41 are lead-out from the same side surface.

Figure 25B:
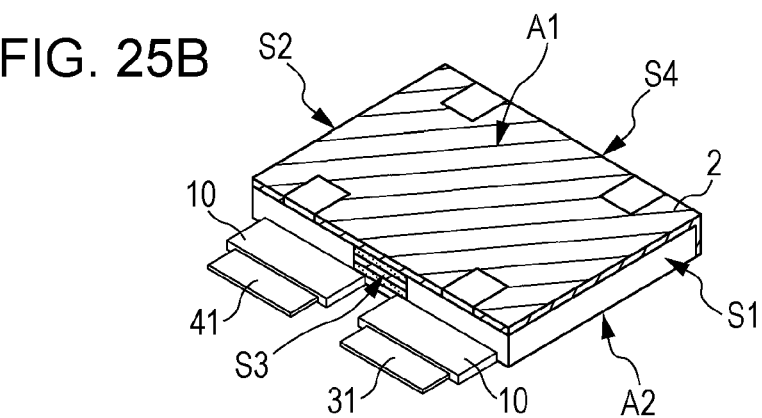
FIG. 25B is a perspective view illustrating an example of a configuration of a battery device.
Figure 25C:
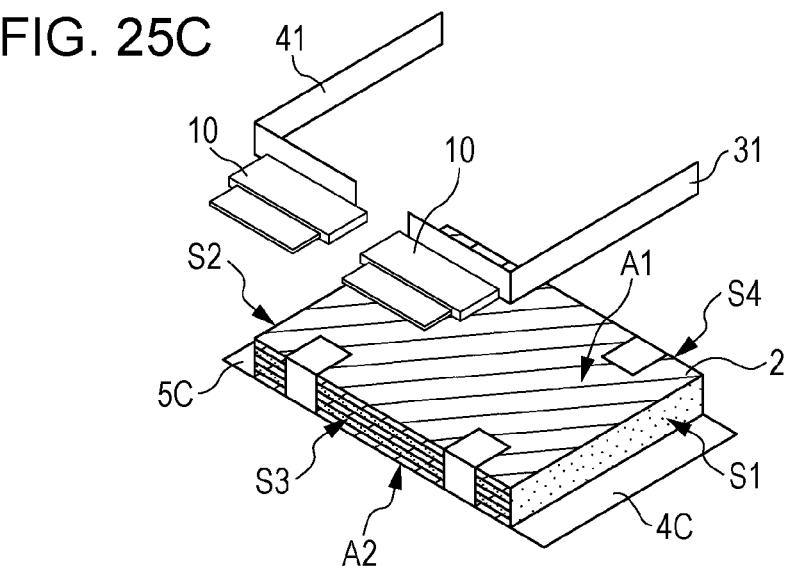
FIG. 25C is an exploded perspective view illustrating an example of a configuration of a battery device.

FIG. 25B shows a perspective view illustrating an example of a configuration of the battery device. FIG. 25C shows an exploded perspective illustrating an example of a configuration of the battery device. The battery device 2 has a first main surface A1 and a second main surface A2 that are opposite to each other, and side surface portions S provided between the first and second main surfaces A1 and A2. The side surface portions S includes a first side surface S1 and a second side surface S2 that are opposite to each other, and a third side surface S3 and a fourth side surface S4 that are opposite to each other. The third and fourth side surfaces S3 and S4 are provided between the first and second side surfaces S1 and S2.

The first and second main surfaces A1 and A2 have a rectangular shape having long sides and short sides. The first to fourth side surfaces S1 to S4 have an elongated rectangular shape. The first and second side surfaces S1 and S2 are provided at a short-side side of the first and second main surfaces A1 and A2, respectively, and the third and fourth side surfaces S3 and S4 are provided at a long-side side of the first and second main surfaces A1 and A2, respectively.

A positive electrode current collector exposed portion 4C is provided at the first side surface S1 side, and a negative electrode current collector exposed portion 5C is provided at the second side surface S2 side. The positive electrode tab 31 is connected to the positive electrode current collector exposed portion 4C at the first side surface S1 side, and leads-out at the third side surface S3 side to the outside of an exterior material 3. On the contrary, the negative electrode tab 41 is connected to the negative electrode current collector exposed portion 5C at the second side surface S2 and leads-out at the third side surface S3 side to the outside of the exterior material 3.

Electrode Tab

Figure 26A:
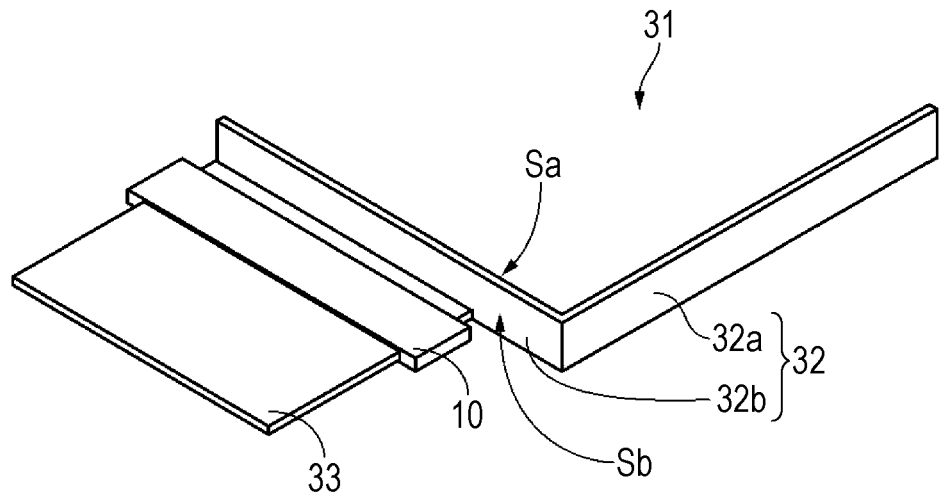
FIG. 26A is a perspective view illustrating an example of a shape of a positive electrode tab.

FIG. 26A shows a perspective view illustrating an example of a shape of the positive electrode tab 31. For example, the positive electrode tab 31 includes a bent portion 32 that is bent to follow the first and third side surfaces S1 and S3 of the battery device 2, and a lead-out portion 33 that leads-out in a direction orthogonal to the third side surface S3. For example, the bent portion 32 has a rear surface Sa that is opposite to the first and third side surfaces S1 and S3 of the battery device 2, and a front surface Sb that is opposite to the rear surface Sa. For example, the bent portion 32 has an approximately L-shaped shape when seen at the side of the first main surface A1 of the battery device 2. More specifically, the bent portion 32 is a plate-like member including a connection portion 32a that is connected to the positive electrode current collector exposed portion 4C, and an extended portion 32b that extends from one end of the connection portion 32a in a direction that is approximately orthogonal to the rear surface Sa of the connection portion 32a. The lead-out portion 33 is provided to be erected in a direction that is approximately orthogonal with respect to the front surface Sa of the extended portion 32b.

Figure 26B:
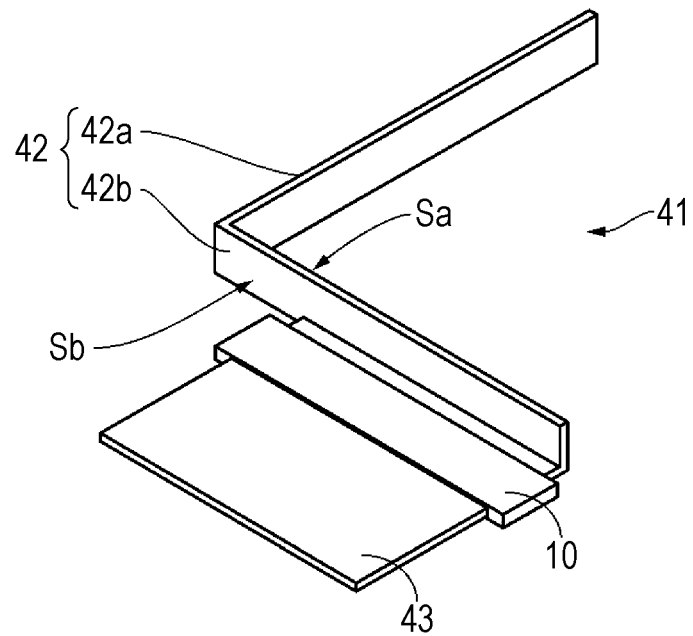
FIG. 26B is a perspective view illustrating an example of a shape of a negative electrode tab.

FIG. 26B shows a perspective view illustrating an example of a shape of the negative electrode tab 41. For example, the negative electrode tab 41 includes a bent portion 42 that is bent to follow the second and third side surfaces S2 and S3 of the battery device 2, and a lead-out portion 43 that leads-out in a direction orthogonal to the third side surface S3. For example, the bent portion 42 has a rear surface Sa that is opposite to the second and third side surfaces S2 and S3 of the battery device 2, and a front surface Sb that is opposite to the rear surface Sa. For example, the bent portion 42 has an approximately L-shaped shape when seen at the side of the first main surface A1 of the battery device 2. More specifically, the bent portion 42 is a plate-like member including a connection portion 42a that is connected to the negative electrode current collector exposed portion 5C, and an extended portion 42b that extends from one end of the connection portion 42a in a direction that is approximately orthogonal to the rear surface Sa of the connection portion 42a. The lead-out portion 43 is provided to br erected in a direction that is approximately orthogonal with respect to the front surface Sa of the extended portion 42b.

An effective cross-sectional area of the positive electrode tab 31 and the negative electrode tab 41 is preferably 0.1 to 3.0 mm$^2$/Ah per a rating capacity (0.2 C discharge capacity) of the secondary battery 1, and more preferably 0.5 to 1.0 mm$^2$/Ah. When the effective cross-sectional area of the positive electrode tab 31 and the negative electrode tab 41 is less than 0.1 mm$^2$/Ah, the effective cross-sectional area of the positive electrode tab 31 and the negative electrode tab 41 with respect to a battery capacity is small, such that when a large current is input and output, the positive electrode tab 31 and the negative electrode tab 41 generate heat. When the positive electrode tab 31 and the negative electrode tab 41 generate heat, a resin at a sealed portion with an exterior material 3 becomes softened, such that there is a concern that leakage may occur. On the other hand, when the effective cross-sectional area of the positive electrode tab 31 and the negative electrode tab 41 exceeds 3.0 mm$^2$/Ah, a ratio of the positive electrode tab 31 and the negative electrode tab 41 in the battery increases, such that a volume energy density may decrease. In addition, the effective cross-sectional area is large, such that defect may be easily generated in sealing with the exterior material 3. Here, the effective cross-sectional area represents the minimum cross-sectional area in vertical cross-sectional areas of the positive electrode tab 31 or the negative electrode tab 41, and a vertical cross-sectional area of a bonding portion of the positive electrode tab 31 and the negative electrode tab 41. In addition, the vertical cross-section area represents an area of a cross-section that is orthogonal to a direction of a current flowing at the time of charge and discharge of the secondary battery 1. In addition, the rating capacity (Ah) represents a quantity of electricity that can be taken out when the secondary battery 1 is discharged at a current value corresponding to 0.2 C.

As a material of the positive electrode tab 31 and the negative electrode tab 41, a material that contains metal with an excellent conductivity as a main component is preferable. As this metal, it is preferable to use one kind or more selected from a group consisting of nickel (Ni), copper (Cu), aluminum (Al), titanium (Ti), phosphorus (P), silver (Ag), tin (Sn), iron (Fe), zirconium (Zr), chromium (Cr), silicon (Si), magnesium (Mg), nickel (Ni), or the like. Specifically, for example, it is preferable to use an elementary substance of nickel (Ni), copper (Cu), aluminum (Al), titanium (Ti), phosphorus (P), silver (Ag), tin (Sn), iron (Fe), zirconium (Zr), chromium (Cr), silicon (Si), magnesium (Mg), nickel (Ni), or the like, or an alloy containing two kinds or more thereof. As the alloy, it is preferable to use stainless steel (SUS), a copper (Cu) alloy, or the like.

It is preferable that the conductivity of the positive electrode tab 31 and the negative electrode tab 41 be 70 (IACS %) or more. In this case, even when the effective cross-sectional area is in a range of 0.1 to 3.0 mm$^2$/Ah, the heat generation in the positive electrode tab 31 and the negative electrode tab 41 is suppressed even at the time of the input and output of a large current. Here, IACS % is a value obtained by measuring a volume resistivity using a conductivity measuring instrument (sigma tester, manufactured by FORESTER JAPAN Limited) and calculating a ratio of the volume resistivity to a conductivity of an annealed copper of $1.7241 \times 10^{-2}$ λΩm.

Shape Example of Electrode Tab

FIG. 27A to 28C show perspective views illustrating first to seventh shape examples of the positive electrode tab. In addition, the shape of the positive electrode tab 31 and the negative electrode tab 41 are symmetrical to each other, such that description will be given with respect to only the shape example of the positive electrode tab 31, and description with respect to the shape example of the negative electrode tab 41 will not be repeated.

Figure 27A:
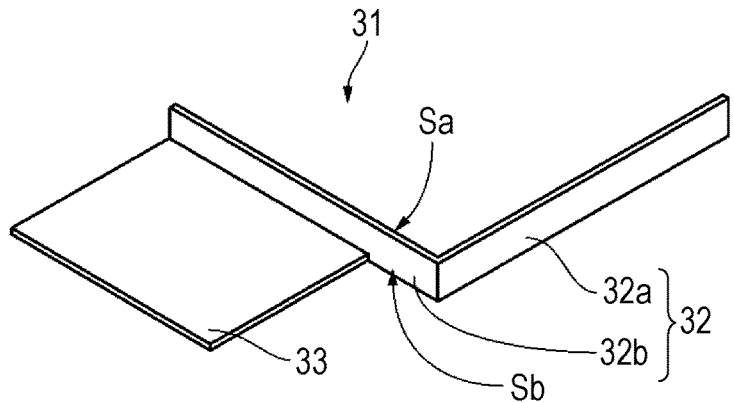
FIGS. 27A to 27D are perspective views illustrating first to fourth examples of a shape of the positive electrode tab.

FIG. 27A illustrates an example where the lead-out portion 33 is provided to be erected at a low-side side of the front surface Sb of the extended portion 32b. This configuration is preferable in a case where the exterior material 3 in which the concave portion 9 is formed in advance through a deep drawing at a side covering the first main surface (top surface) A1 of the battery device 2 is used.

Figure 27B:
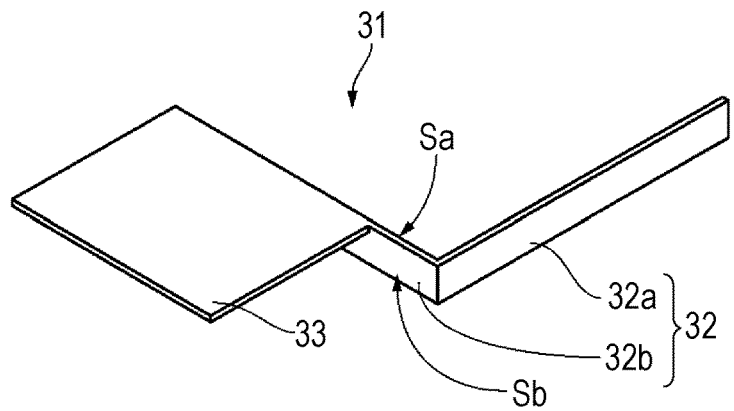

FIG. 27B illustrates an example where the lead-out portion 33 is provided to be erected at an upper-side side of the front surface Sb of the extended portion 32b. This configuration is preferable in a case where the exterior material 3 in which the concave portion 9 is formed in advance through a deep drawing at a side covering the second main surface (bottom surface) A2 of the battery device 2.

Figure 27C:
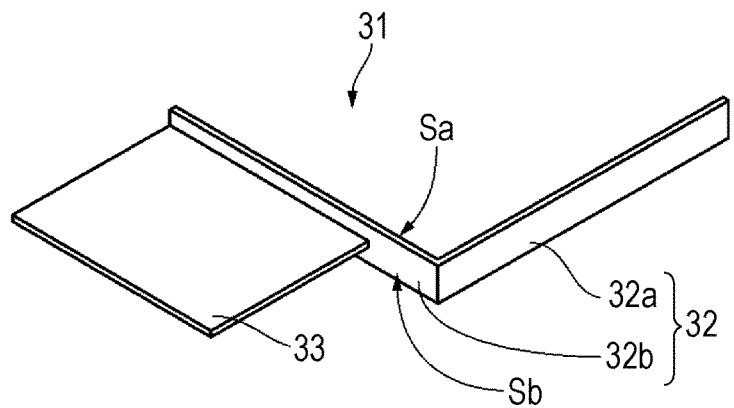

FIG. 27C illustrates an example where the lead-out portion 33 is provided to be erected at a central portion of the front surface Sb of the extended portion 32b. This configuration is preferable in a case where the exterior material 3 in which the concave portion 9 is formed in advance through a deep drawing at a side covering the first main surface (top surface) A1 and the second main surface (bottom surface) A2 of the battery device 2, respectively.

The position where the lead-out portion 33 is erected from the front surface Sb of the extended portion 32b is not particularly limited, but may be an arbitrary position on the front surface Sb, for example, may be appropriately selected depending a position of the concave portion 9 of the exterior material 3.

Figure 27D:
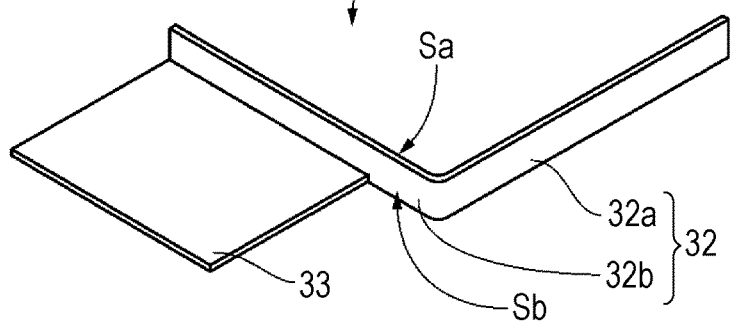

FIG. 27D illustrates an example where each corner portion of the bent portion 32 is subjected to a chamfering process. This chamfering process is preferably performed with respect to at least the front surface Sb in the rear surface Sa and the front surface Sb of the bent portion 32, and may be performed with respect to both of the rear surface Sa and the front surface Sb. When the chamfering process is performed with respect to the front surface Sb, it is possible suppress damage of the battery device 2 or the exterior material 3, which is caused by the corner portion of the positive electrode tab 31 due to vibration, when the secondary battery 1 is manufactured or used. In a case where the chamfering process is performed with respect to the rear surface Sa of the bent portion 32, it is preferable to perform the chamfering process with respect to a corner portion of the battery device 2 similarly to the front surface Sa. This is because the gap between the corner portion of the battery device 2 and the corner portion of the bent portion 32 is removed and therefore both of these may closely come into contact with each other.

As the chamfering process, for example, a C-chamfering, an R-chamfering, or the like may be exemplified, and the corner portion of the positive electrode tab 31 and the corner portion of the negative electrode tab 41 may be subjected to a different chamfering process, respectively. For example, in the corner portion of the positive electrode tab 31 and the corner portion of the negative electrode tab 41, one side may be subjected to the C-chamfering process, and the other side may be subjected to the R-chamfering process.

Figure 28A:
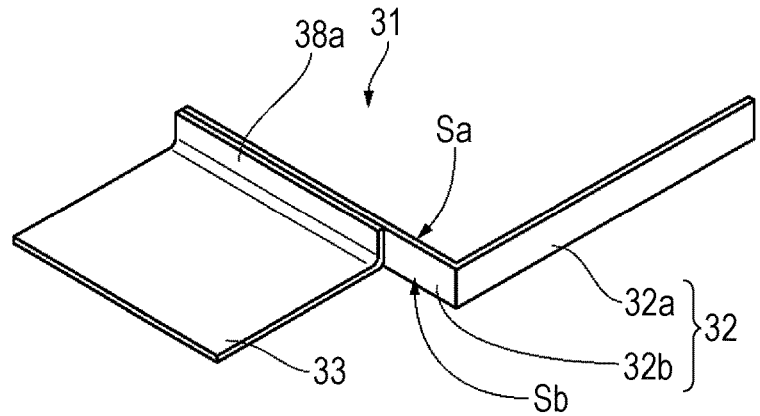
FIGS. 28A to 28C are perspective views illustrating fifth to seventh examples of the shape of the positive electrode tab.

FIG. 28A illustrates an example of the negative electrode tab 41 using the bent portion 32 and the lead-out portion 33 that are formed separately. The lead-out portion 33 has, for example, a rectangular shape, and a bonding portion 38a where the erection of the lead-out portion 33 is performed from one side thereof. This bonding portion 38a is bonded to the front surface Sb of the extended portion 32b of the bent portion 32.

Figure 28B:
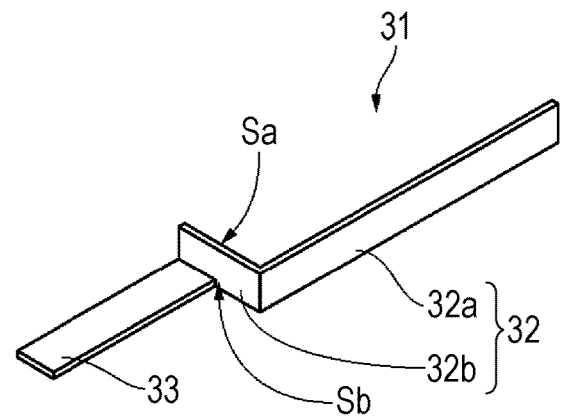

FIG. 28B illustrates an example where a width of the lead-out portion 33 is made to be smaller than that illustrated in FIG. 27A, and the width of the lead-out portion 33 is made to be substantially the same as that of the bent portion 32.

Figure 28C:
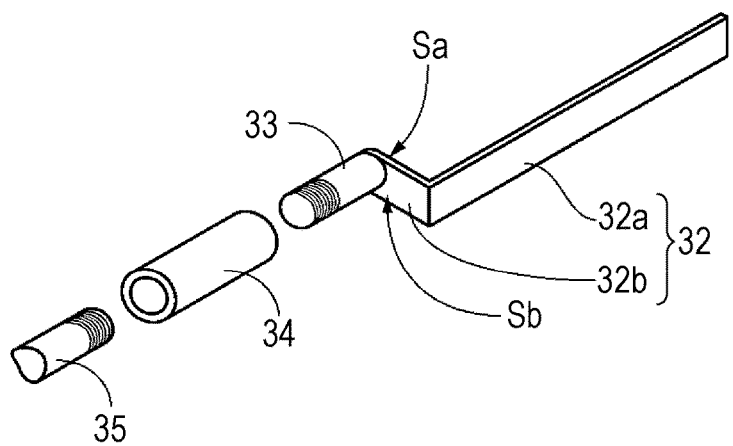

FIG. 28C illustrates an example where a screw portion is provided at a front end portion of the lead-out portion 33. According to this configuration, it is possible to cope with an indirect connection type of a battery through a nut coupling. For example, the lead-out portion 33 of one side secondary battery 1 and a lead-out portion 35 of the other side secondary battery 1 may be electrically connected through a nut 34.

Method of Manufacturing Tab

The positive electrode tab 31 and the negative electrode tab 41 may be manufactured by approximately combining, for example, a molding process, a pressing process, a bending process, a welding process, or the like. Hereinafter, a method of manufacturing the positive electrode tab 31 will be described as an example.

First Example

Figure 29A:
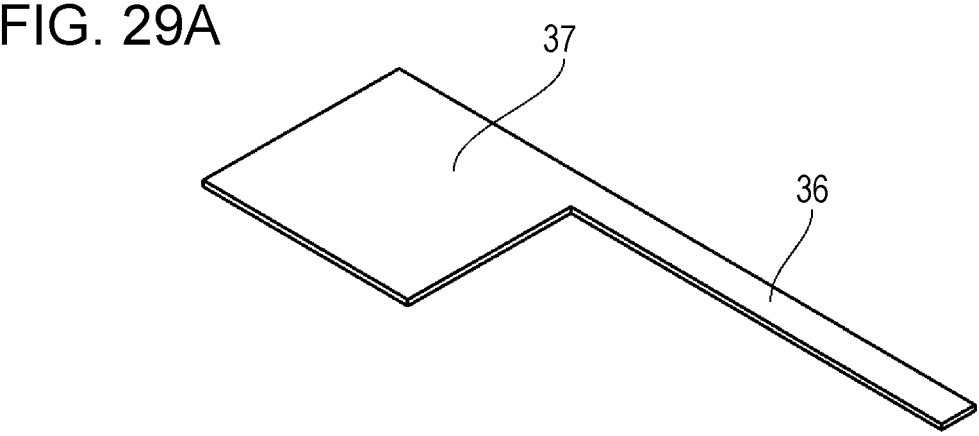
FIGS. 29A to 29C are process diagrams illustrating a first example of a method of manufacturing the positive electrode tab.
Figure 29B:
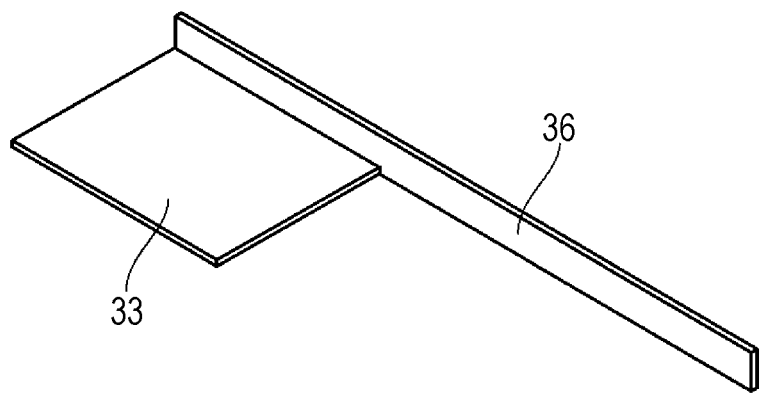
Figure 29C:
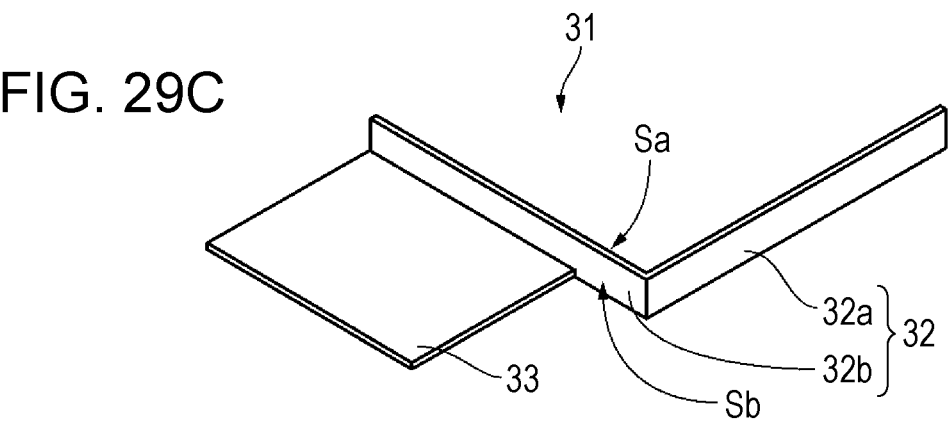

FIGS. 29A to 29C show process diagrams illustrating a first example of a method of manufacturing a positive electrode tab. First, a metallic piece is processed by, for example, a punching process or the like. According to this process, as shown in FIG. 29A, a metallic piece including an elongated rectangular-shaped portion 36 and a wide rectangular-shaped portion 37 that is formed at one end of the elongated rectangular-shaped portion 36 is formed.

Next, an L-shaped bending process is performed with respect to the wide rectangular-shaped portion 37. According to this process, as shown in FIG. 29B, the elongated rectangular-shaped portion 36 is erected from the wide rectangular-shaped portion 37, and thereby the lead-out portion 33 is formed. Next, the L-shape bending process is performed with respect to the elongated rectangular portion 36. According to this process, as shown in FIG. 29C, the positive electrode tab 31 having the bent portion 32 and the lead-out portion 33 is formed.

Second Example

Figure 30A:
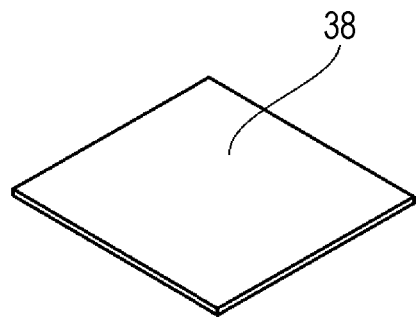
FIGS. 30A to 30C are process diagrams illustrating a second example of a method of manufacturing the positive electrode tab.
Figure 30B:
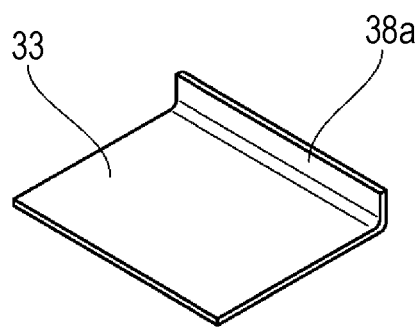
Figure 30C:
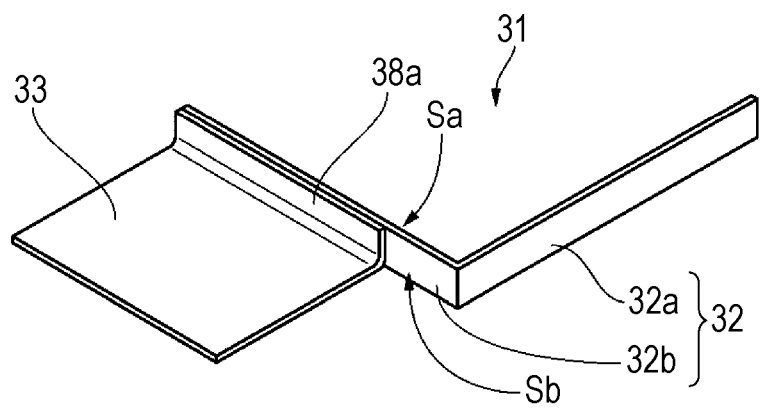

FIGS. 30A to 30C show a second example of a method of manufacturing a positive electrode tab. First, as shown in FIG. 30A, a rectangular-shaped metallic piece is manufactured by, for example, a punching process. Next, the L-shape bending process is performed with respect to the metallic piece. According to this process, as shown in FIG. 30B, one-side side of the rectangular-shaped metallic piece is deformed to be erected, and thereby the lead-out portion 33 having the bonding portion 38a is formed. Next, the bonding portion 38a of the lead-out portion 33 is bonded to the front surface Sb of the extended portion 32b of the bent portion 32 manufactured by a separate process. As a bonding method, for example, an ultrasonic welding, a resistance welding, or the like may be used.

Covering Layer

It is preferable that at least one surface of the positive electrode tab 31 and the negative electrode tab 41 is covered with a covering layer, and more preferably, both surfaces of the positive electrode tab 31 and the negative electrode tab 41 are covered with the covering layer. As the covering layer, the same covering layer as that in the first embodiment may be used.

Bonding Area

Figure 31:
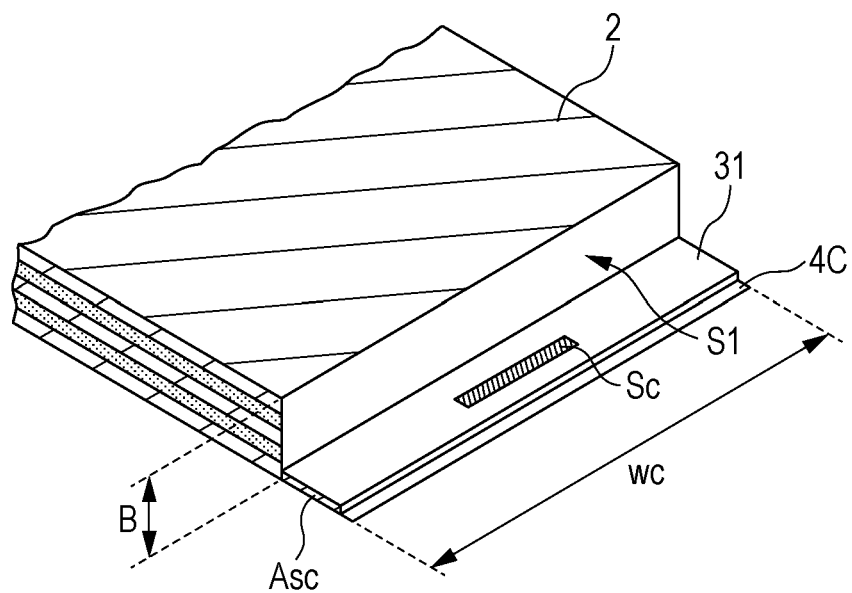
FIG. 31 an enlarged perspective view illustrating a bonding portion of a positive electrode current collector exposed portion and the positive electrode tab.

FIG. 31 shows an enlarged perspective view illustrating a boding portion between a positive electrode current collector exposed portion and a positive electrode tab. It is preferable that a bonding area Sc between the positive electrode current collector exposed portion 4C and the positive electrode tab 31 satisfy the following equation (11) together with an effective cross-section area Asc of the positive electrode tab 31, the exposed width we of the positive electrode current collector, and the thickness B of the battery device 2.

$$Asc \leq Sc \leq wc \times B \tag{11}$$

When Asc>Sc, there is a concern that heat generation may be focused at the bonding portion between the positive electrode current collector exposed portion 4C and the positive electrode tab 31 at the time of charge and discharge of a large current, and thereby a life duration of the battery may decrease. On the other hand, when Sc>wc×B, dimensions of the bonding portion exceed the width of the positive electrode current collector exposed portion 4C or the thickness of the battery device 2, such that a volume energy density of the secondary battery 1 decrease. In addition, due to a protruding positive electrode tab 31 or the positive electrode current collector exposed portion 4C, a resin layer inside an exterior material such as an aluminum laminated film may be damaged, such that there is a concern that an internal short circuit due to an electrical connection with an aluminum layer or the like may occur.

It is preferable that the bonding area Sc between the negative electrode current collector exposed portion 5C and the negative electrode tab 41 satisfy the following equation (12) together with an effective cross-section area Asa of the negative electrode tab 41, the exposed width wa of the negative electrode current collector, and the thickness B of the battery device 2.

$$Asa \leq Sa \leq wa \times B \tag{12}$$

When Asa>Sa, there is a concern that heat generation may be focused at the bonding portion between the negative electrode current collector exposed portion 5C and the negative electrode tab 41 at the time of charge and discharge of a large current, and thereby a life duration of the battery may decrease. On the other hand, when Sa>wa×B, dimensions of the bonding portion exceeds a width of the negative electrode current collector exposed portion 5C or a thickness of the battery device 2, such that a volume energy density of the secondary battery 1 decreases. In addition, due to a protruding negative electrode tab 41 or the negative electrode current collector exposed portion 5C, a resin layer inside an exterior material such as an aluminum laminated film may be damaged, such that there is a concern that an internal short circuit due to an electrical connection with an aluminum layer or the like may occur.

Insulating Member Between Electrode Tab and Battery Device

It is preferable that an insulating member (hereinafter, appropriately referred to as an insulator) be provided to at least a part between the positive electrode tab 31 and the negative electrode tab 41, and the battery device 2. More specifically, it is preferable that the insulator be provided between the bent portion 32 of the positive electrode tab 31, and at least one of the first side surface S1 and the third side surface S3 of the battery device 2. In addition, it is preferable that the insulator be provided between the bent portion 42 of the negative electrode tab 41, and at least one of the second side surface S2 and the third side surface S3 of the battery device 2. Even when a configuration where the positive electrode 4 or the negative electrode 5 is provided at the outermost layer of the battery device 2 is adopted, it is possible to suppress the occurrence of an inner short circuit that is caused when the positive electrode 4 or the negative electrode 5 comes into contact with the positive electrode tab 31 or the negative electrode tab 41. That is, safety of the secondary battery 1 is improved, and it is possible to suppress performance of the secondary battery 1 from being deteriorated.

Figure 32A:
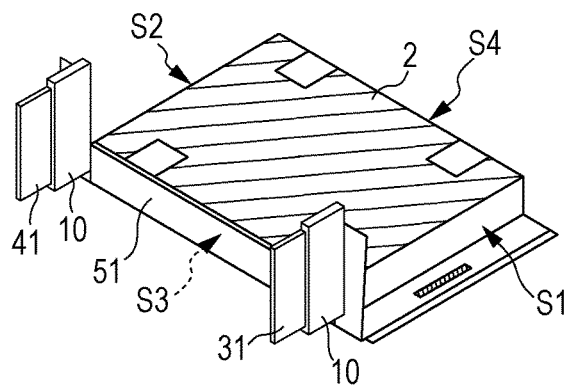
FIGS. 32A to 32D are perspective diagrams illustrating an example of a shape of an insulating member.

FIGS. 32A to 32D show perspective views illustrating a shape example of an insulating member. FIG. 32A illustrates an example where an insulator 51 is provided between the third side surface S3 of the battery device 2, and the positive electrode tab 31 and the negative electrode tab 41.

Figure 32B:
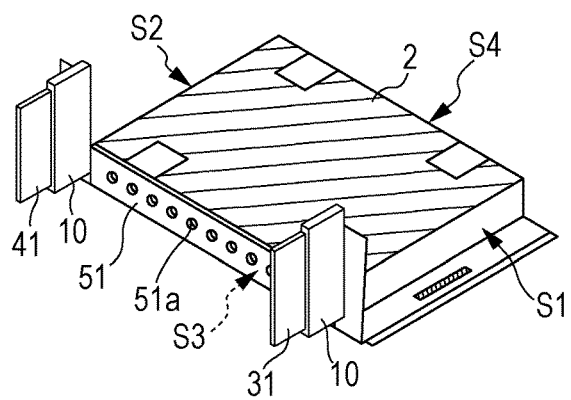
Figure 32C:
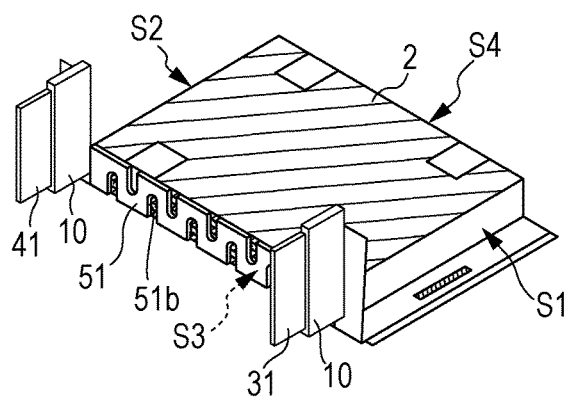

FIG. 32B illustrates an example where the insulator 51 has one or a plurality of hole portions 51a. In this manner, when the hole portion 51a is provided, it is possible to secure an injection property of an electrolytic solution into the inside of the battery device. As a shape of the hole portion 51a, for example, a circle shape, an elliptical shape, a polygonal shape, an undefined shape, or the like may be exemplified, but the shape is not limited thereto, and a composition of two or more shapes may be used. As an arranging pattern of the hole portion 51a, a regular pattern or an irregular pattern may be used. As a method of forming the hole portion 51a, for example, a punching process or the like may be exemplified, but it is not limited thereto.

FIG. 32B illustrates an example where the insulator 51 has one or a plurality of cut-out portions 51b. In this manner, when the cut-out portion 51b is provided, it is possible to secure an injection property of an electrolytic solution into the inside of the battery device. As a shape of the cut-out portion 51b, for example, a partial-circle shape, a partial-elliptical shape, a polygonal shape, an undefined shape, or the like may be exemplified, but the shape is not limited thereto, and a composition of two or more shapes may be used. As an arranging pattern of the cut-out portion 51b, a regular pattern or an irregular pattern may be used. As a method of forming the cut-out portion 51b, for example, a punching process or the like may be exemplified, but it is not limited thereto.

Figure 32D:
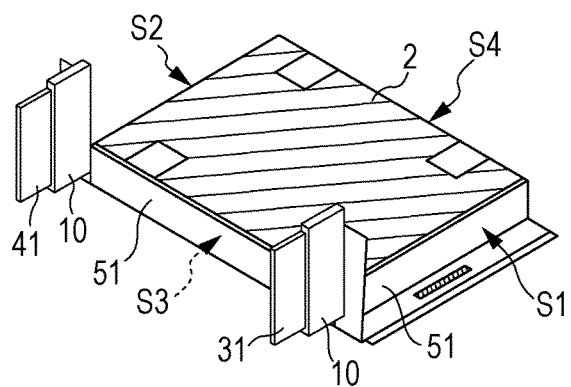

FIG. 32D illustrate an example where the insulator 51 is formed to have an approximately lateral U-shape, and the first side surface S1, the second side surface S2, and the third side surface S3 of the battery device 2 are covered by the insulator 51. According to this configuration, it is possible to suppress an internal short circuit in regard to the first and second side surfaces S1 and S2 in addition to the third side surface. That is, safety may be further improved. In addition, the insulator 51 may be formed to have an approximately square shape to cover all side surfaces S of the battery device 2.

As the shape of the insulator 51, for example, a plate shape, a sheet shape, and a film shape may be exemplified, but it is not limited to thereto. As a material of the insulator 51, a polymer resin or a non-woven fabric is preferable. As the polymer resin, it is preferable to use polypropylene (PP), polyethyleneterephthalate (PET), polyethylene (PE), or polyimide (PI).

The insulator 51 is not limited to the above-described example as long as it is possible to insulate between the positive electrode tab 31 and the negative electrode tab 41, and the battery device 2. For example, as the insulator 51, an adhesive insulating member may be used. In this case, the adhesive insulating member is adhered to the rear surface Sb of the positive electrode tab 31 and the negative electrode tab 41, or the first side surface S1, the second side surface S2, and the third side surface S3 of the battery device 2. As the adhesive insulating member, for example, an adhesive insulating tape may be used. In addition, a resin material having a flowability may be filled between the positive electrode tab 31 and the negative electrode tab 41, and the side surfaces S of the battery device 2 to be solidified. As the resin material, for example, a hot melt resin, a thermoplastic resin, a thermosetting resin, or a photosensitive resin may be used, but the resin is not limited thereto.

The thickness of the insulator 51 is preferably 0.2 mm or more, and more preferably 0.2 to 1.0 mm. When the thickness of the insulator 51 is less than 0.2 mm, a long-term insulating property may not be secured when the secondary battery 1 is used under a circumstance where vibration or the like is applied thereto. On the other hand, when the thickness of the insulator 51 exceeds 1.0 mm, a volume ratio of the insulator 51 with respect to the secondary battery 1 increases, and therefore the volume energy density of the secondary battery 1 may be decreased.

It is preferable that the width of the insulator 51 be equal to or larger than a width of the positive electrode tab 31 and the negative electrode tab 41, and be equal to or less than a thickness of the battery device 2. When the width of the insulator 51 is less than the width of the positive electrode tab 31 and the negative electrode tab 41, there is a concern that a portion, which protrudes from the insulator 51, of the positive electrode tab 31 and the negative electrode tab 41 may be short-circuited with the negative electrode 5 or the positive electrode 4. On the other hand, when the width of the insulator 51 exceeds the thickness of the battery device 2, there is a concern that an end surface of the insulator 51 may break through the exterior material 3.

The shape of the insulator 51 is not particularly limited, but it is preferable to have a rectangular shape, an approximately lateral U-shape, an approximately square shape, or a shape obtained by cutting out a corner portion in the above-described shapes is cut-out. As the shape in which a corner portion is cut-out, a shape where the corner portion has a curvature R and is shaped into an R-shape is preferable, and the curvature R is preferably within a range of 0.5 to 2.0. This is because a shape such as a rectangular shape in which the corner portion is shaped into an R-shape can be easily processed, such that productivity is excellent, and the danger of the corner portion of the insulator 51 breaking through the exterior material 3 is reduced.

Example where Part of Separator is Used as Insulating Member

Instead of further providing the insulator 51, a part of the separator 6 may be used as an insulating member that insulates between the positive electrode tab 31 and the negative electrode tab 41, and the battery device 2.

Figure 33A:
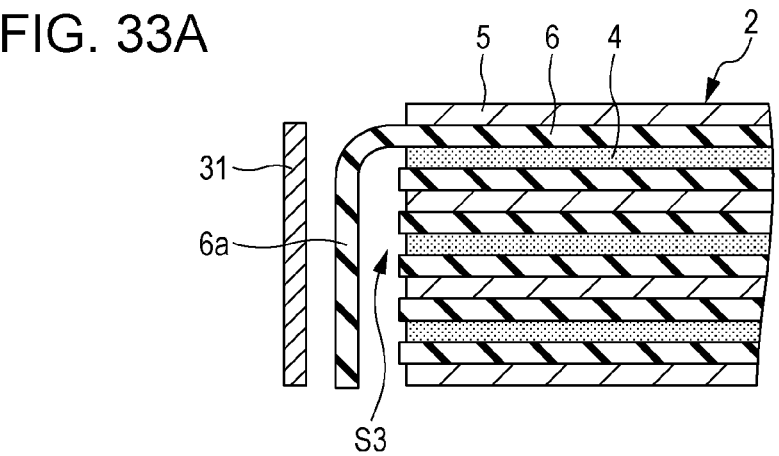
FIGS. 33A to 33C are cross-sectional views illustrating first to third examples in which a separator is used as an insulating member between the positive electrode tab and the battery device.

FIG. 33A shows a cross-sectional view illustrating a first example where a separator is used as an insulating member that insulates between a positive electrode tab and a battery device. A part of a separator 6 or all of the separator 6 included in the battery device 2 is set to be larger than the positive electrode 4 and the negative electrode 5, and a surplus portion 6a of the separator 6 protrudes from the laminated positive electrode 4 and the negative electrode 5. The third side surface S3 of the battery device 2 is covered with this protruding surplus portion 6a. According to this configuration, it is possible to insulate the third side surface S3 of the battery device 2 and the positive electrode tab 31 with the surplus portion 6a of the separator 6.

Figure 33B:
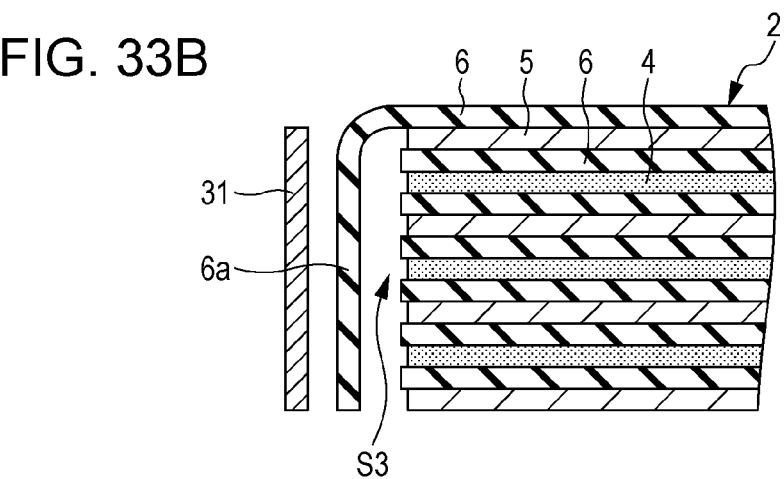

FIG. 33B shows a cross-sectional view illustrating a second example where a separator is used as an insulating member that insulates between a positive electrode tab and a battery device. A battery device 2 is provided with a separator 6 that is further laminated on a surface of a negative electrode 5 that is the outermost-layer electrode. This separator 6 is set to be larger than the laminated positive electrode 4 and negative electrode 5, and therefore a surplus portion 6a of the separator 6 that is the outermost layer of the battery device 2 is made to protrude. The third side surface S3 of the battery device 2 is covered with the protruding surplus portion 6a. According to this configuration, it is possible to insulate between the third side surface S3 of the battery device 2 and the positive electrode tab 31 by using the surplus portion 6a of the separator 6. In addition, the first side surface S1 and/or the second side surface S2 of the battery device 2 may be configured to be covered with the surplus portion 6a.

Figure 33C:
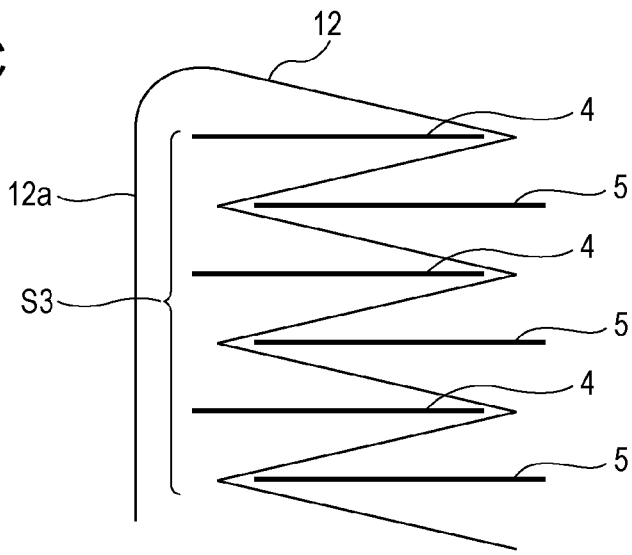

FIG. 33C shows a cross-sectional view illustrating a third example where a separator is used as an insulating member that insulates between a positive electrode tab and a battery device. In regard to the second embodiment, one end of the separator 12 that is folded in a zigzag fashion in a longitudinal direction may be lengthened as a surplus portion, and therefore a surplus portion 12a, which covers the positive electrode 4 that is the outermost-layer electrode and goes around the third side surface S3 of the battery device 2, may be provided. According to this configuration, it is possible to insulate between the third side surface S3 of the battery device 2 and the positive electrode tab 31 by using the surplus portion 12a of the separator 12.

Insulating Member Between Positive Electrode Tab and Exterior Material

It is preferable that an insulating member (hereinafter, appropriately referred to as an insulator) 52 be further provided to at least a part between the positive electrode tab 31 and the negative electrode tab 41, and the exterior material 3. In this case, it is possible to prevent the positive electrode tab 31 and the negative electrode tab 41, particularly, the end portions thereof breaking through a resin layer provided on a surface of the exterior material 3 due to a vibration friction during the secondary battery 1 is used, and electrically coming into contact with an aluminum layer of the exterior material 3, and thereby making an internal short (internal short circuit) occur.

Figure 34A:
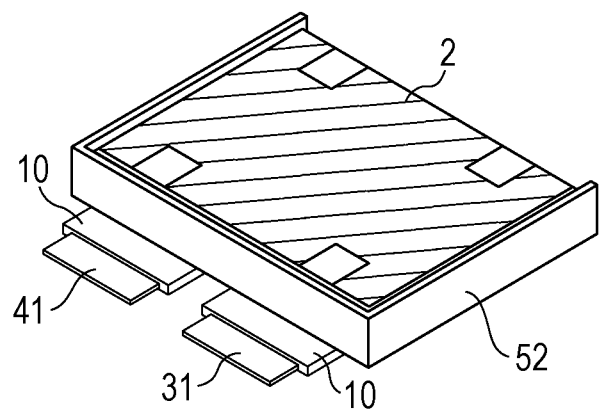
FIG. 34A is an exploded perspective diagram illustrating a first example of a shape of an insulator.
Figure 34B:
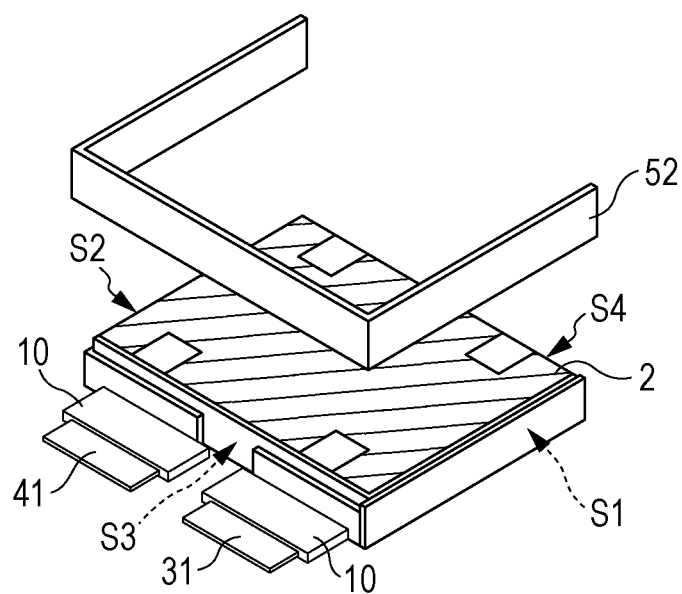
FIG. 34B is an exploded perspective diagram illustrating a first example of the shape of the insulator.

FIG. 34A shows a perspective view illustrating a first example of a shape of the insulator. FIG. 34B shows an exploded perspective view illustrating the first example of the shape of the insulator. In this first example, the insulator 52 is made to have an approximately lateral U-shape, and the first side surface S1, the second side surface S2, and the third side surface S3 of the battery device 2 are covered with the insulator 52.

Figure 35A:
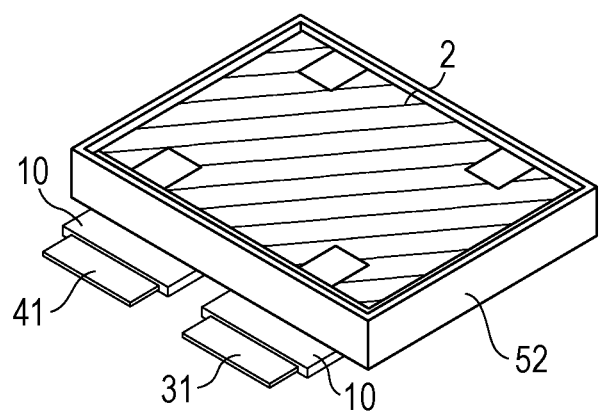
FIG. 35A is an exploded perspective diagram illustrating a second example of the shape of the insulator.
Figure 35B:
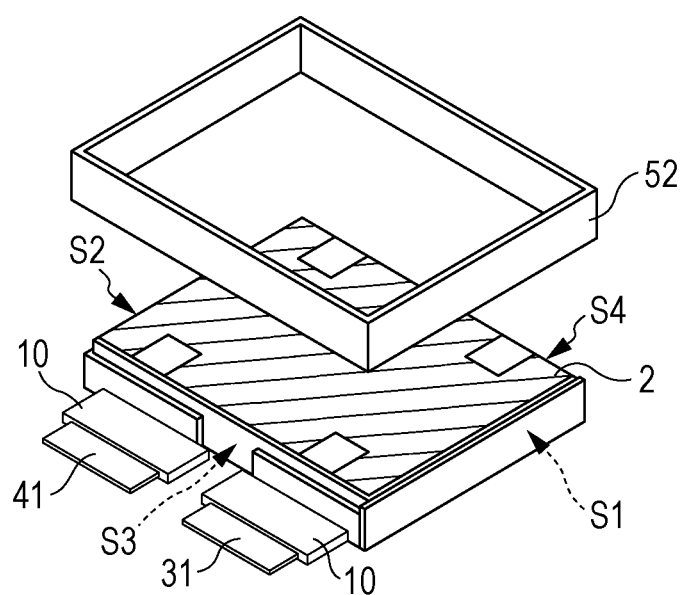
FIG. 35B is an exploded perspective diagram illustrating a second example of the shape of the insulator.

FIG. 35A shows a perspective view illustrating a second example of the shape of the insulator. FIG. 35B shows an exploded perspective view illustrating the second example of the shape of the insulator. In this second example, the insulator 52 is made to have an approximately square shape, and all side surfaces S of the battery device 2 are covered with the insulator 52.

As the shape of the insulator 52, for example, a plate shape, a sheet shape, and a film shape may be exemplified, but it is not limited to thereto. As a material of the insulator 52, a polymer resin or a non-woven fabric is preferable. As the polymer resin, it is preferable to use polypropylene (PP), polyethyleneterephthalate (PET), polyethylene (PE), or polyimide (PI).

A thickness of the insulator 52 is preferably 0.2 mm or more, and more preferably 0.2 to 1.0 mm. When the thickness of the insulator 52 is less than 0.2 mm, a long-term insulating property may not be secured when the secondary battery 1 is used under a circumstance where vibration or the like is applied thereto. On the other hand, when the thickness of the insulator 51 exceeds 1.0 mm, a volume ratio of the insulator 52 with respect to the secondary battery 1 increases, and therefore the volume energy density of the secondary battery 1 may be decreased.

It is preferable that the width of the insulator 52 be equal to or larger than the width of the positive electrode tab 31 and the negative electrode tab 41, and be equal to or less than a thickness of the battery device 2. When the width of the insulator 52 is less than the width of the positive electrode tab 31 and the negative electrode tab 41, there is a concern that a portion, which protrudes from the insulator 52, of the positive electrode tab 31 and the negative electrode tab 41 may break through a resin layer formed on a surface of the exterior material 3 and may be short-circuited with an aluminum layer of the exterior material 3 or the like. On the other hand, when the width of the insulator 52 exceeds the thickness of the battery device 2, there is a concern that an end surface of the insulator 52 may break through the exterior material 3.

It is preferable that the insulator 52 have one or a plurality of hole portions. In this manner, when the hole portion is provided, it is possible to secure an injection property of an electrolytic solution into the inside of the battery device. As a shape of the hole portion, for example, a circle shape, an elliptical shape, a polygonal shape, an undefined shape, or the like may be exemplified, but the shape is not limited to thereto, and a composition of two or more shapes may be used. As an arranging pattern of the hole portion, a regular pattern or an irregular pattern may be used. As a method of forming the hole portion, for example, a punching process or the like may be exemplified, but it is not limited thereto.

It is preferable that the insulator 52 have one or a plurality of cut-out portions. In this manner, when the cut-out portion is provided, it is possible to secure an injection property of an electrolytic solution into the inside of the battery device. As a shape of the cut-out portion, for example, a partial-circle shape, a partial-elliptical shape, a polygonal shape, an undefined shape, or the like may be exemplified, but the shape is not limited to thereto, and a composition of two or more shapes may be used. As an arranging pattern of the cut-out portion, a regular pattern or an irregular pattern may be used. As a method of forming the cut-out portion, for example, a punching process or the like may be exemplified, but it is not limited thereto.

A shape of the insulator 52 is not particularly limited, but it is preferable to have a rectangular shape, an approximately lateral U-shape, an approximately square shape, or a shape obtained by cutting out a corner portion in the above-described shapes which is cut-out. As the shape in which a corner portion is cut-out, a shape where the corner portion has a curvature R and is shaped into an R-shape is preferable, and the curvature R is preferably within a range of 0.5 to 2.0. This is because a shape such as a rectangular shape in which the corner portion is shaped into an R-shape can be easily processed, such that productivity is excellent, and there is less of a danger of the corner portion of the insulator 52 breaking through the exterior material 3.

Method of Manufacturing Secondary Battery

Next, an example of a method of manufacturing a secondary battery will be described with reference to FIG. 36A to FIG. 37C.

Figure 36A:
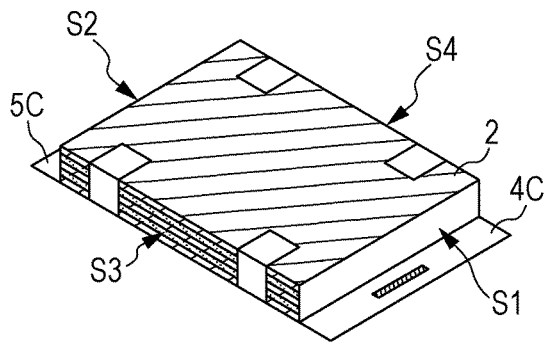
FIGS. 36A to 36D are process diagrams illustrating an example of a method of manufacturing a secondary battery according to a fourth embodiment of the present disclosure.

First, processes before a tab connection process are performed similarly to the first embodiment, and thereby the battery device 2 is manufactured. In this manner, as shown in FIG. 36A, a bent positive electrode current collector exposed portion 4C is formed at the side of the first side surface S1 of the battery device 2, and a bent negative electrode current collector exposed portion 5C is formed at the side of the second side surface S2 of the battery device 2.

Figure 36B:
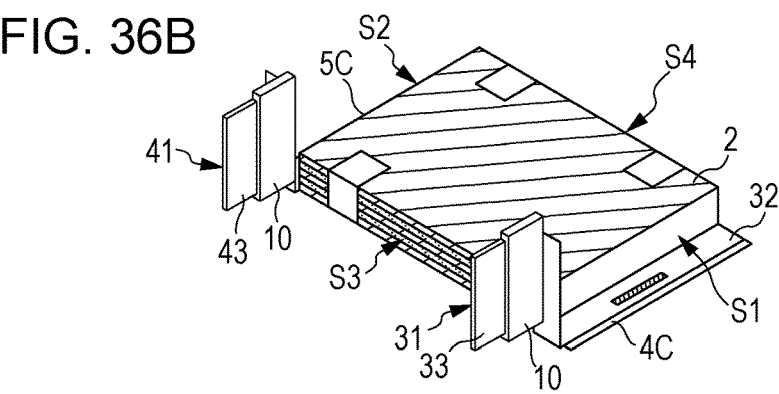

Next, as shown in FIG. 36B, the front surface Sb of the connection portion 32a of the positive electrode tab 31 is bonded to the positive electrode current collector exposed portion 4C, and the front surface Sb of the connection portion 42a of the negative electrode tab 41 is bonded to the negative electrode current collector exposed portion 5C. As a bonding method, for example, an ultrasonic welding, a resistance welding, or the like may be used.

Figure 36C:
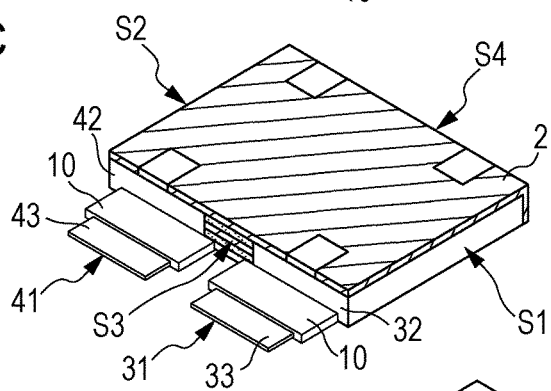

Next, similarly to the first embodiment, a U-shaped bent portion is formed in the positive electrode current collector exposed portion 4C and the negative electrode current collector exposed portion 5C. In this manner, as shown in FIG. 36C, the bent portion 32 of the positive electrode tab 31 is disposed to follow the first side surface S1 and the third side surface S3 of the battery device 2, and the bent portion 42 of the negative electrode tab 41 is disposed to follow the second side surface S2 and the third side surface S3 of the battery device 2. In addition, the lead-out portion 33 of the positive electrode tab 31 is erected from the third side surface S3 of the battery device 2, and the lead-out portion 43 of the negative electrode tab 41 is erected from the third surface S3 of the battery device 2.

Figure 36D:
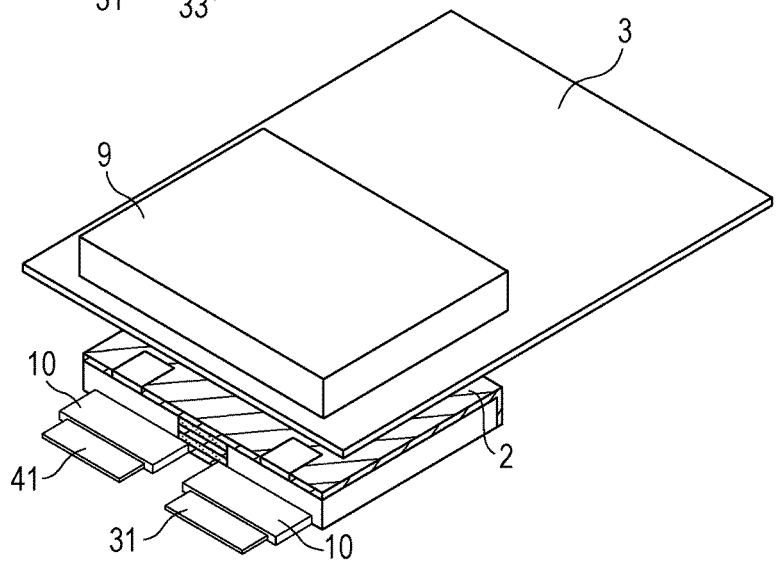
Figure 37A:
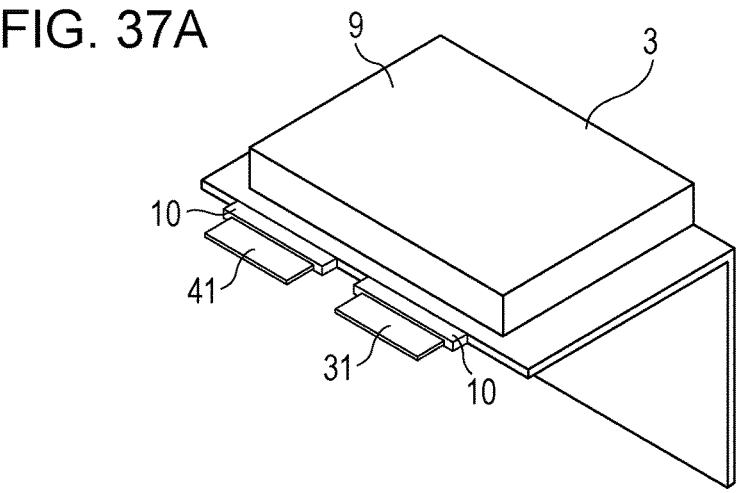
FIGS. 37A to 37C are process diagrams illustrating an example of a method of manufacturing the secondary battery according to the fourth embodiment of the present disclosure.
Figure 37B:
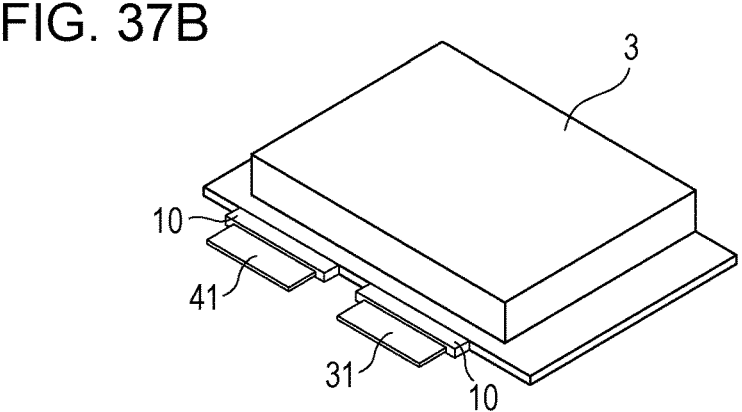
Figure 37C:
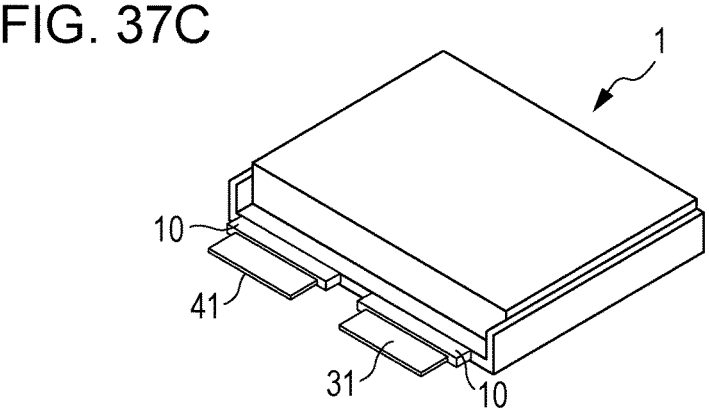

Next, as shown in FIG. 36D, the battery device 2 is accommodated in the concave portion 9 of the exterior material 3, and as shown in FIG. 37A, the exterior material 3 is folded and thereby the peripheries of the exterior material 3 overlap each other. Next, the overlapping peripheries of the exterior material 3 are fused through a thermal fusion and are sealed. At this time, as shown in FIG. 37B, it is preferable that a sealant material 10, which is an adhesive film, be disposed between the positive electrode tab 31 and the negative electrode tab 41, and the exterior material 3. Next, according to necessity, as shown in FIG. 37C, both ends of the fused exterior material 2 are bent to be erected. In this manner, it is possible to obtain the intended secondary battery 1.

In the secondary battery according to the fourth embodiment of the present disclosure, the width of the positive electrode current collector exposed portion 4C as a positive electrode terminal is made to be larger than that of a secondary battery in the related art. When the width of the positive electrode current collector exposed portion 4C is configured to be large, it is possible to realize an input and output of a large current. In addition, when the width of the positive electrode current collector exposed portion 4C is configured to be the same as that of the positive electrode active material layer 4B, in a manufacturing process of the positive electrode 4, a process such as a punching process or a cutting process for making the positive electrode current collector exposed portion 4C thin is not necessary, such that it is possible to make a manufacturing process simple.

Fifth Embodiment

Battery Unit and Battery Module Using Secondary Battery

Hereinafter, a battery unit and a battery module that are configured by using a secondary battery according to the embodiments of the present disclosure will be described with reference to FIGS. 19A to 24B.

Battery Unit

Figure 19A:
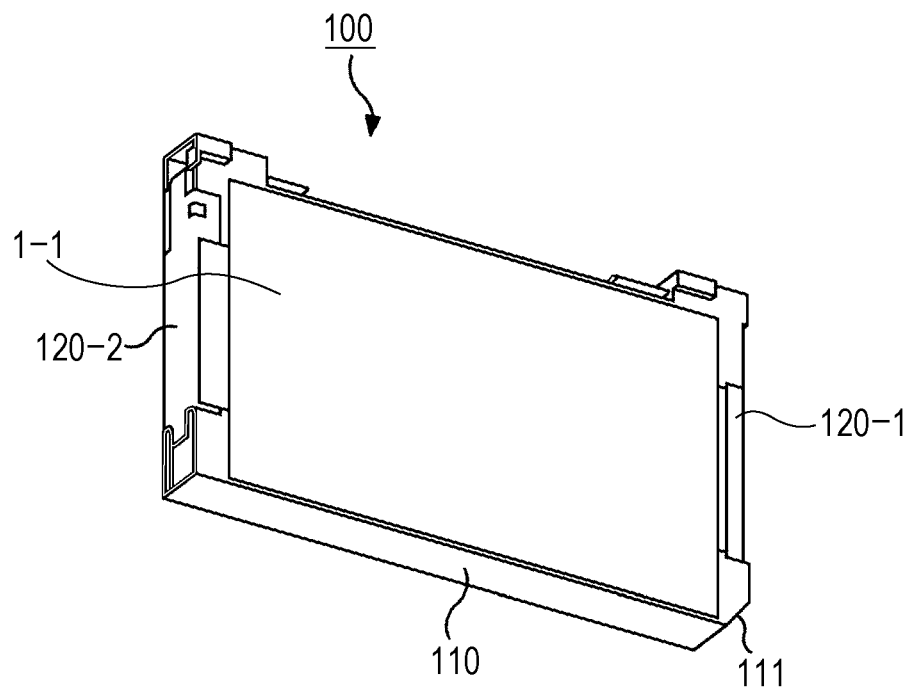
FIGS. 19A and 19B are perspective views illustrating a configuration example of a battery unit to which the secondary battery according to the embodiments of the present disclosure is applied.
Figure 19B:
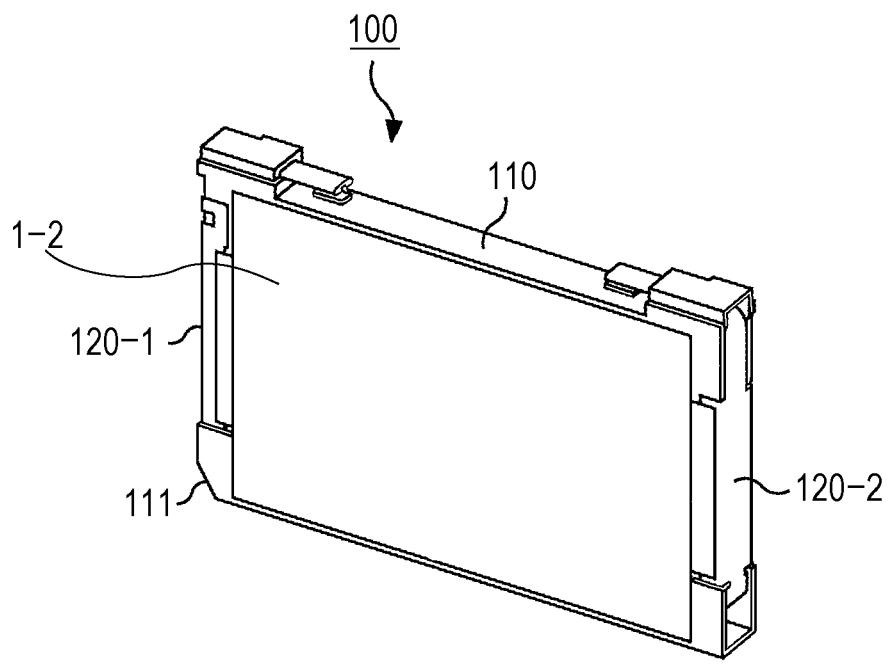

FIGS. 19A and 19B show perspective views illustrating a configuration example of a battery unit to which the battery device of the embodiments of the present disclosure is applied. In FIGS. 19A and 19B, a battery unit 100 seen from a different side is illustrated, respectively. A side that is mainly shown in FIG. 19A is set as a front side of the battery unit 100, and a side that is mainly shown in FIG. 19B is set as a rear side of the battery unit 100. As shown in FIGS. 19A and 19B, the battery unit 100 includes secondary batteries 1-1 and 1-2, a bracket 110, and bus bars 120-1 and 120-2. The secondary batteries 1-1 and 1-2 are secondary batteries that adopt any configuration of the first to fourth embodiments.

The bracket 110 is a support tool for securing strength of the secondary batteries 1-1 and 1-2, and the secondary battery 1-1 is mounted at the front side of the bracket 110 and the secondary battery 1-2 is mounted at the rear side of the bracket 110. In addition, the bracket 110 has substantially the same shape seen from the front side and the rear side, but a chamfered portion 111 is formed at one corner portion of a lower side. A side where the chamfered portion 111 is seen to be located at a right-lower side is set as the front side, and a side where the chamfered portion 111 is seen to be located at a left-lower side is set as the rear side.

Bus bars 120-1 and 120-2 are metallic members having an approximately L-shaped shape, and are mounted on both side surface of the bracket 110, respectively, in such a manner that a connection portion connected to a tab of the secondary batteries 1-1 and 1-2 is disposed at a side surface side of the bracket 110, and a terminal connected to the outside of the battery unit 100 is disposed on a top surface of the bracket 110.

Figure 20:
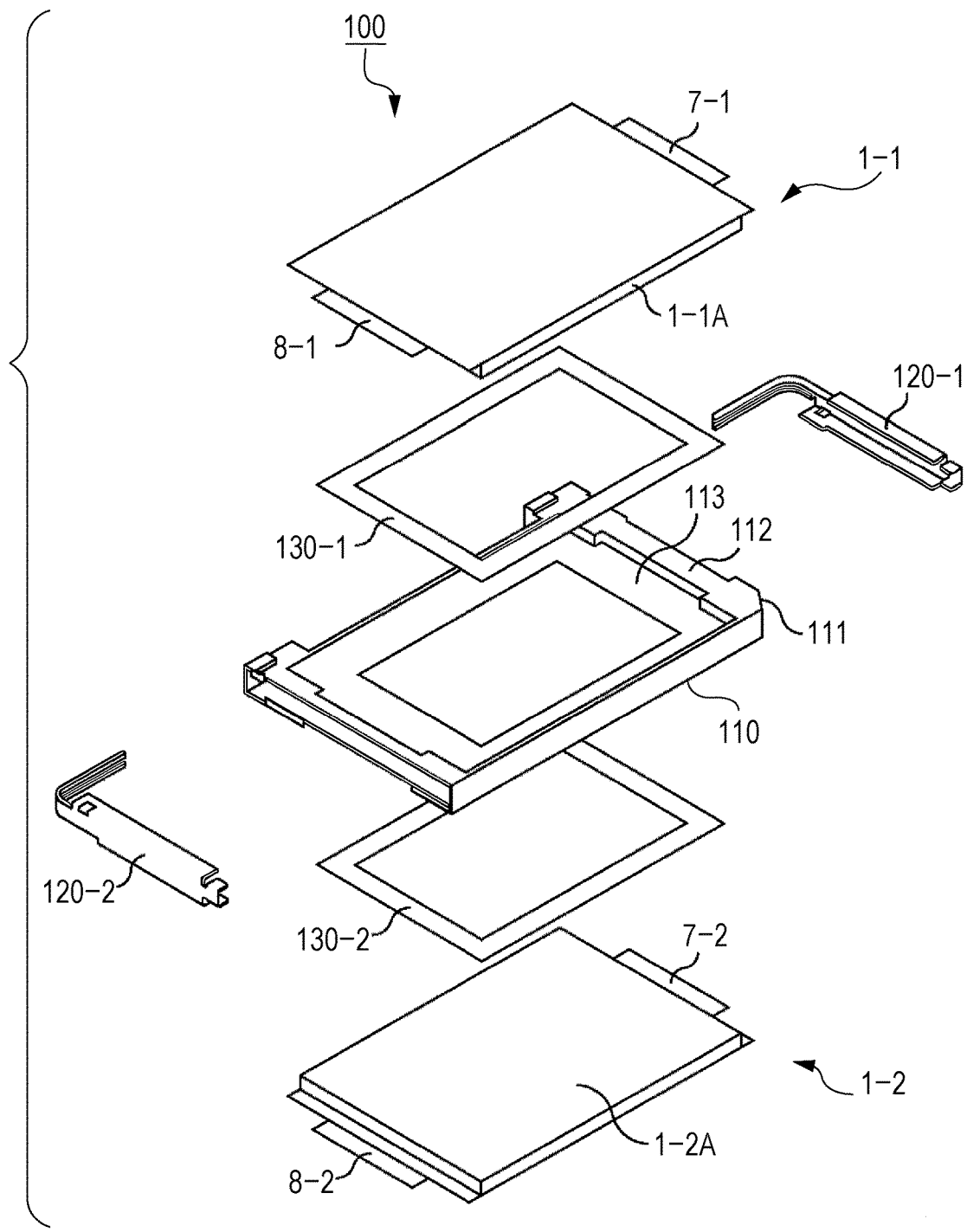
FIG. 20 is an exploded perspective view illustrating the battery unit.

FIG. 20 shows an exploded perspective view illustrating the battery unit 100. An upper side of FIG. 20 is set as a front side of the battery unit 100, and a lower side of FIG. 20 is set as a rear side of the battery unit 100. Hereinafter, in regard to the secondary battery 1-1, a convex portion in which a battery device is accommodated is referred to as a secondary battery main body 1-1A. Similarly, in regard to the secondary battery 1-2, a convex portion in which a battery device is accommodated is referred to as a secondary battery main body 1-2A.

The secondary batteries 1-1 and 1-2 are mounted in the bracket 110 in a state where the sides of the secondary battery main bodies 1-1A and 1-2A face each other. That is, the secondary battery 1-1 is mounted in the bracket 110 in such a manner that a surface where a positive electrode tab 7-1 and a negative electrode tab 8-1 are provided faces the front side, and the secondary battery 2-2 is mounted in the bracket 110 in such a manner that a surface where a positive electrode tab 7-2 and a negative electrode tab 8-2 are provided faces the rear side.

The bracket 110 includes an outer peripheral wall 112 and a rib portion 113. The outer peripheral wall 112 is formed to be slightly broader than an outer periphery of the secondary battery main bodies 1-1A and 1-2A of the secondary batteries 1-1 and 1-2, that is, to surround the secondary battery main bodies 1-1A and 1-2A in a state where the secondary batteries 1-1 and 1-2 are mounted. The rib portion 113 is provided at an inner side surface of the outer peripheral wall 112 so as to extend from a center portion of the outer peripheral wall 112 in a thickness direction toward the inner side.

In a configuration example of FIG. 20, the secondary batteries 1-1 and 1-2 are inserted into the outer peripheral wall 112 from the front side and the rear side of the bracket 110, and are adhered to both surfaces of the rib portion 113 of the bracket 110 by double-sided adhesive tapes 130-1 and 130-2 having adhesiveness at both surfaces. The double-sided adhesive tapes 130-1 and 130-2 have an approximately square shape having a predetermined width along an outer peripheral edge of the secondary batteries 1-1 and 1-2, and the rib portion 113 of the bracket 110 may be provided by an area where the double-sided adhesive tapes 130-1 and 130-2 are bonded.

In this way, the rib portion 113 is formed to extend from an inner side surface of the outer peripheral wall 112 toward the inner side by a predetermined width along the outer peripheral edge of the secondary batteries 1-1 and 1-2, and at an inner side in relation to the rib portion 113, an opening is formed. Therefore, between the secondary battery 1-1 that is adhered to the rib portion 113 by the double-sided tape 130-1 from the front side of the bracket 110, and the secondary battery 1-2 that is adhered to the rib portion 113 by the double-sided tape 130-2 from the rear side of the bracket 110, a gap due to the opening is formed.

That is, the opening is formed at the central portion of the bracket 110, such that the secondary batteries 1-1 and 1-2 are mounted in the bracket 110 with a gap having a total dimension of a thickness of the rib portion 113 and a thickness of the double-sided adhesive tapes 130-1 and 130-2. For example, a swelling may occur in the secondary batteries 1-1 and 1-2 due to a charge and discharge, a generation of gas, or the like, but this gap, which is formed by the opening, allows this swelling of the secondary batteries 1-1 and 1-2 to be accommodated. Therefore, it is possible to exclude an effect such as an increase in the total thickness of the battery unit 100, which is caused by the swelling of the secondary batteries 1-1 and 1-2.

In addition, when the secondary batteries 1-1 and 1-2 are bonded to the rib portion 113, in a case where a bonding area is broad, a significant pressure is necessary, but the bonding surface of the rib portion 113 is restricted to the outer peripheral edge, such that the bonding may be easily performed by an efficient application of pressure. Therefore, it is possible to decrease stress applied to the secondary batteries 1-1 and 1-2 while these are manufactured.

As shown in FIG. 20, two secondary batteries 1-1 and 1-2 are mounted in one bracket 110, such that it is possible to reduce the thickness and space of the bracket 110 compared to a case where one secondary battery is mounted in one bracket. Therefore, it is possible to increase an energy density.

In addition, the rigidity of the battery unit 100 in a thickness direction can be obtained by a synergistic effect obtained when two sheets of secondary batteries 1-1 and 1-2 are adhered, such that it is possible to make the rib portion 113 of the bracket 110 thin. That is, for example, even though the thickness of the rib portion 113 is set to 1 mm or less (a thickness around the limit of resin molding), when the secondary batteries 1-1 and 1-2 are adhered to each other from both sides of the rib portion 113, it is possible to obtain an overall sufficient rigidity of the battery unit 100. In addition, when the thickness of the rib portion 113 is made to be thin, the thickness of the battery unit 100 becomes thin and a volume is decreased, such that it is possible to improve an energy density of the battery unit 100.

In addition, to increase an external stress resistance, the battery unit 100 is configured in such a manner that an outer peripheral surface (both side surfaces and front and bottom surfaces) of the secondary batteries 1-1 and 1-2 does not come into contact with an inner peripheral surface of the outer peripheral wall 112 of the bracket 110, and the wide surface of the secondary batteries 1-1 and 1-2 is adhered to the rib portion 113.

According to this configuration, it is possible to realize a battery unit 100 that has a high energy density and is strong against an external stress.

Battery Module

Next, a configuration example of the battery module 200 in which the battery unit 100 is assembled will be described with reference to FIGS. 21 to 24B. The battery module 200 includes a module case 210, a rubber seat portion 220, a secondary battery portion 230, a secondary battery cover 240, a fixing sheet portion 250, an electric part portion 260, and a box cover 270.

Figure 21:
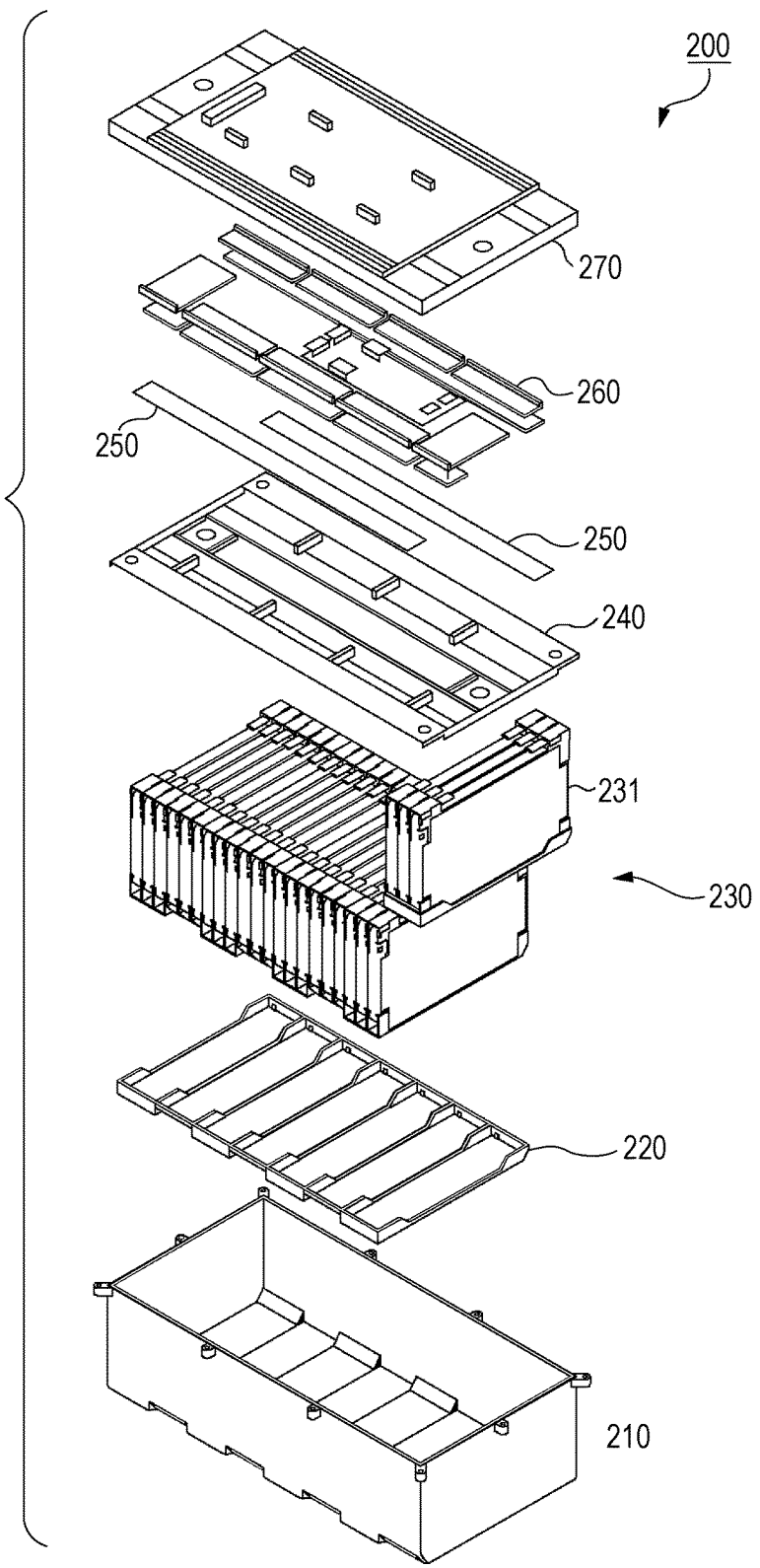
FIG. 21 is a diagram illustrating a configuration example of a battery module to which the battery unit is combined.

The module case 210 is a case that accommodates the battery unit 100 and mounts it in equipment, and has a size capable of accommodating 24 battery units 100 in a configuration example shown in FIG. 21.

The rubber seat portion 220 is a seat that is laid on the bottom surface of the battery unit 100 and relieves an impact. In the rubber seat portion 220, one sheet of a rubber seat is provided for three battery units 100 and eight sheets of rubber seats are provided to cope with 24 battery units 100.

In the configuration example shown in FIG. 21, the secondary battery portion 230 includes 24 battery units 100 that are assembled. In addition, in the secondary battery portion 230, three battery units 100 are connected in parallel with each other and thereby a parallel block 231 is configured, and eight parallel blocks 231 are connected in series.

The secondary battery cover 240 is a cover that fixes the secondary battery portion 230, and has an opening corresponding to the bus bar 120 of the secondary battery 1.

The fixing sheet portion 250 is a sheet that is disposed on the top surface of the secondary battery cover 240, and is brought into closely contact with the secondary battery cover 240 and the box cover 270 and is fixed thereto when the box cover 270 is fixed to the module case 210.

The electric part portion 260 includes an electric part such as a charge and discharge circuit that controls a charge and discharge of the battery unit 100. The charge and discharge circuit is disposed at, for example, a space between two parallel sheets of the bus bar 120 in the secondary battery portion 230.

The box cover 270 is a cover that closes the module case 210 after each portion is accommodated in the module case 210.

Here, in the battery module 200, the parallel blocks 231 including three battery units 100 connected in parallel are connected in series and thereby the secondary battery portion 230 is configured. This series connection is performed by a metallic plate member included in the electric part portion 260. Therefore, in the secondary battery portion 230, the parallel blocks 231 are disposed, respectively, in such a manner that a direction of a terminal for each block is made to be alternate for each parallel block 231, that is, a positive terminal and a negative terminal of adjacent parallel blocks 231 are aligned to each other. Therefore, in the battery module 200, it is necessary to avoid a circumstance where homopolar terminals in adjacent parallel blocks 231 are aligned to each other.

Figure 22:
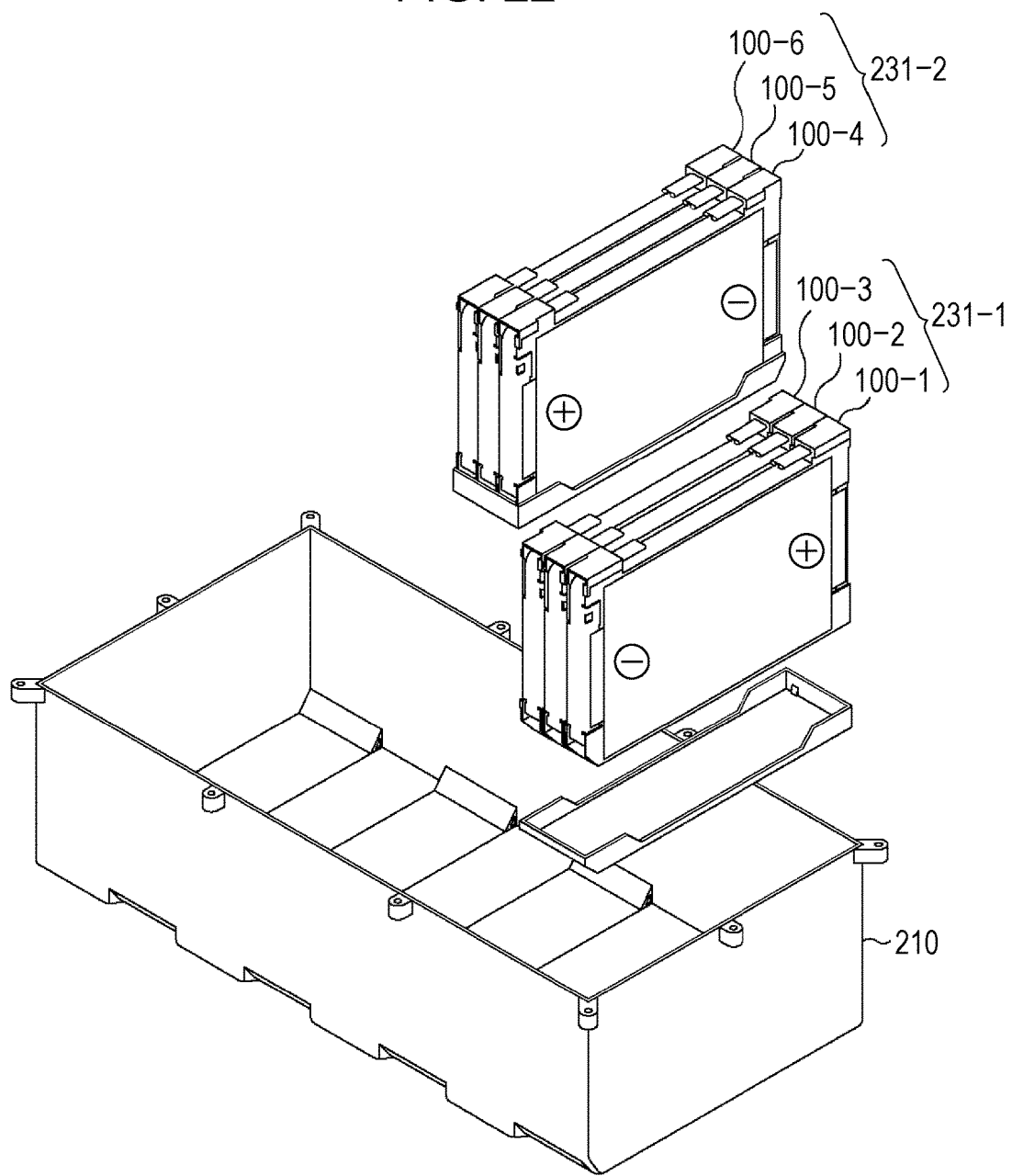
FIG. 22 is a diagram illustrating a direction of a terminal of a parallel block.
Figure 23A:
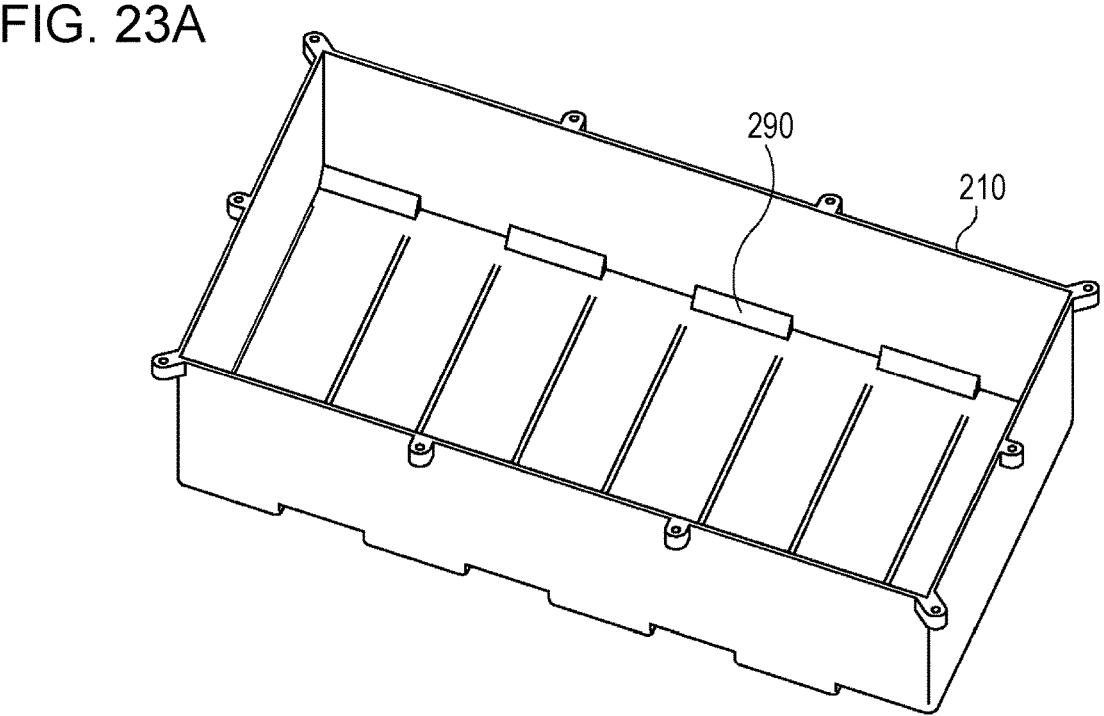
FIG. 23A is a schematic diagram of a module case, which illustrates a contrivance for preventing an error in an insertion direction of the parallel block.
Figure 23B:
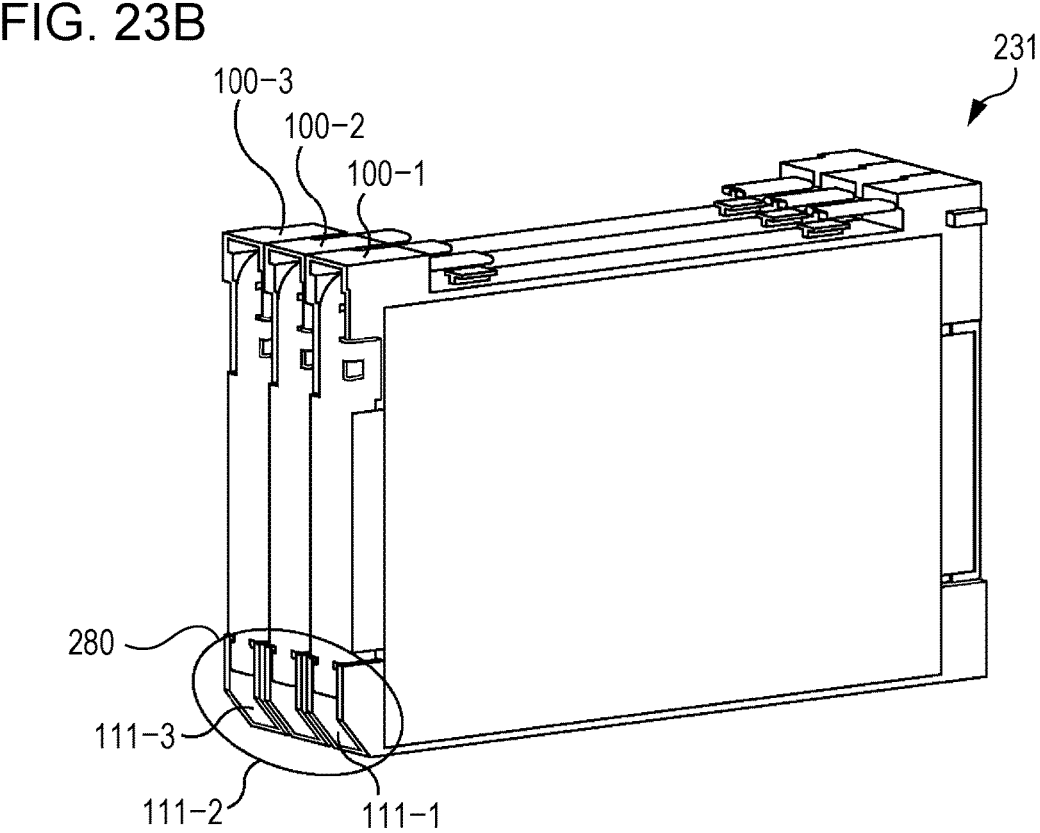
FIG. 23B is a schematic diagram of a parallel block illustrating a contrivance for preventing an error in an insertion direction of the parallel block.
Figure 24A:
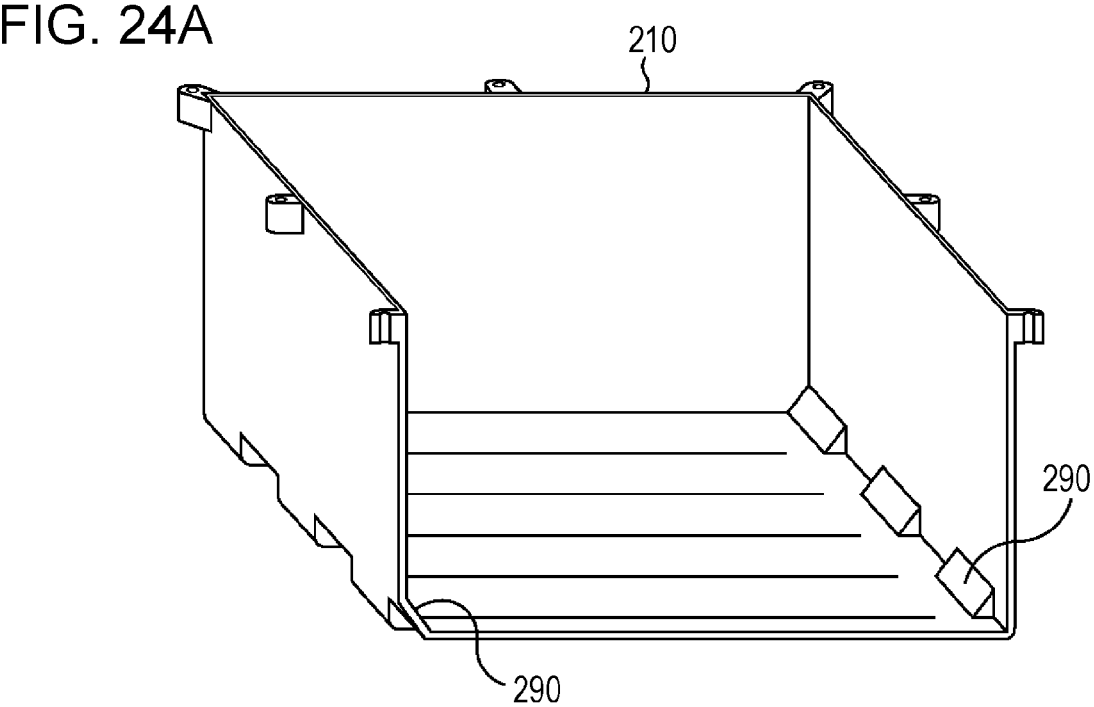
FIG. 24A is a schematic diagram of a module case, which illustrates a contrivance for preventing an error in an insertion direction of the parallel block.
Figure 24B:
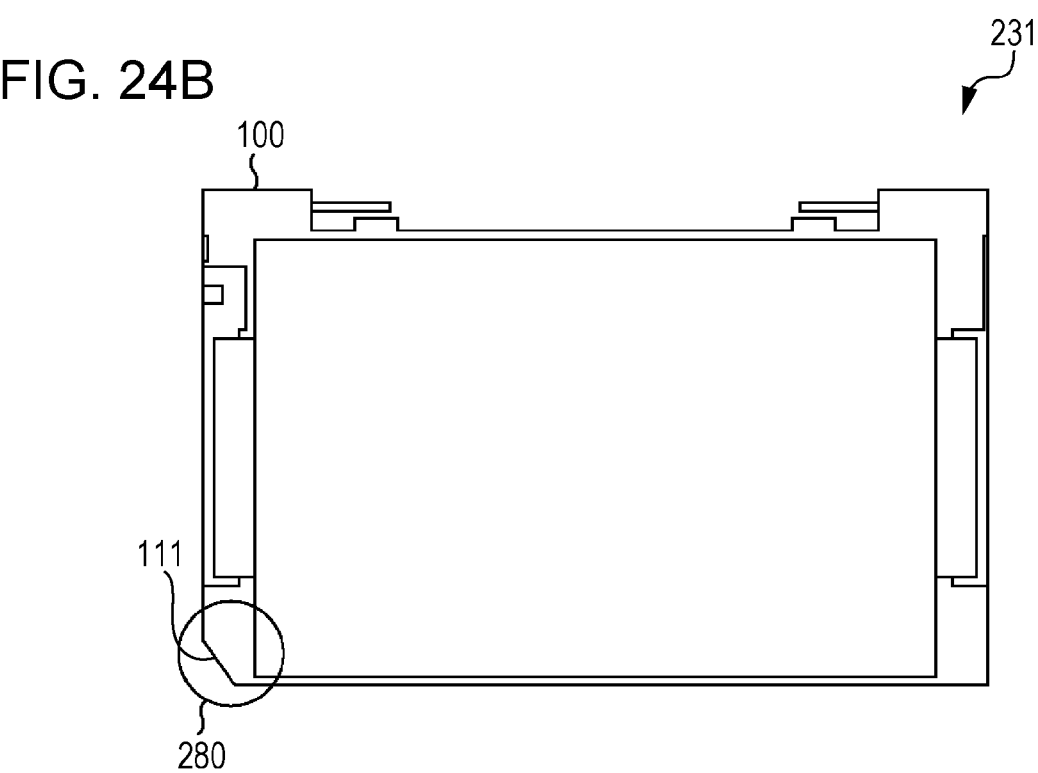
FIG. 24B is a schematic diagram of a battery unit, which illustrates a contrivance for preventing an error in an insertion direction of the parallel block.

For example, as shown in FIG. 22, a parallel block 231-1 including battery units 100-1 to 100-3 and a parallel block 231-2 including battery units 100-4 to 100-6 are accommodated in the module case 210 with a displacement where a positive terminal and a negative terminal are adjacent to each other. To regulate such a displacement, a chamfered portion 111 formed at one corner portion of a lower side of the bracket 110 of the battery unit 100 is used.

For example, as shown in FIGS. 23A to 24B, in a parallel block 231, the battery units 100-1 to 100-3 are assembled in such a manner that respective chamfered portions 111-1 to 111-3 face the same direction and thereby a chamfered region 280 is formed. In addition, the module case 210 has inclined portions 290 corresponding to an inclination of the chamfered region 280 and this inclined portions 290 are alternately disposed in a length corresponding to a total thickness of three secondary batteries 1.

In this manner, when the parallel block 231 is tried to be accommodated in the module case 210 in a wrong direction, due to the chamfered region 280 of the parallel block 231 and the inclined portions 290 of the module case 210, a lower side corner of the parallel block 231 comes into contact with one of the inclined portions 290 of the module case 210. In this case, the parallel block 231 is in a state floated from an inner bottom surface module case 210, such that the parallel block 231 is not completely accommodated in the module case 210. In this manner, in the battery module 200, it is possible to avoid a circumstance where homopolar terminals in adjacent parallel blocks 231 are aligned to each other.

EXAMPLES

Hereinafter, embodiments of the present disclosure will be specifically described with reference to examples, but the embodiments of the present disclosure are not limited to the examples. A test for measuring an output density was performed with respect to examples 1-1 to 1-9, and comparative examples 1-1 to 1-10 related to the secondary battery obtained as described above.

Example 1-1

Manufacturing of Positive Electrode

The positive electrode was manufactured as described below. First, 90 mass parts of lithium iron phosphate, 5 mass parts of polyvinylidene fluoride, 5 mass parts of carbon black, and N-methyl-pyrrolidone (separate from an amount) are kneaded by a mixer, and the resultant kneaded material was dispersed after adding N-methyl-pyrrolidone (NMP) to have a desired viscosity and thereby a positive electrode mixture slurry was obtained. Next, the positive electrode mixture slurry was applied to both surfaces of aluminum foil having a thickness of 15 μm such that a positive electrode current collector exposed portion is formed, the applied positive electrode mixture slurry was dried, the resultant dried mixture was compression-molded by a roll pressing machine or the like, and thereby positive electrode active material layer was formed. Then, the obtained positive electrode active material layer was cut into a rectangular shape and thereby a positive electrode was obtained. A width wc of the positive electrode current collector exposed portion and a width Wc of the positive electrode active material layer were set to satisfy a relationship of wc/Wc=1.0, and a depth dc of the positive electrode current collector exposed portion and a depth Dc of the positive electrode active material layer were set to satisfy a relationship of dc/Dc=0.1.

Manufacturing Negative Electrode

A negative electrode was manufactured as described below. First, 94 mass parts of artificial graphite, 5 mass parts of polyvinylidene fluoride, 1 mass parts of vapor-grown carbon fiber (VGCF), and N-methyl-pyrrolidone (separate from an amount) were kneaded, and thereby a negative electrode mixture slurry was obtained. Next, the negative electrode mixture was applied to both surfaces of copper foil having a thickness of 8 μm in such a manner that a negative electrode current collector exposed portion is formed, and a width wa of the negative electrode current collector exposed portion and a width Wa of the negative electrode active material layer satisfy a relationship of wa/Wa=1.0, the applied negative electrode mixture was dried, the resultant dried mixture was compression-molded by a roll pressing machine or the like, and thereby negative electrode active material layer was formed. Then, the obtained negative electrode active material layer was cut into a rectangular shape and thereby a negative electrode was obtained. A width wa of the negative electrode current collector exposed portion and a width Wa of the negative electrode active material layer were set to satisfy a relationship of wa/Wa=1.0, and a depth da of the negative electrode current collector exposed portion and a depth Da of the negative electrode active material layer were set to satisfy a relationship of da/Da=0.1.

In addition, before the negative electrode active material layer and the positive electrode active material layer were applied and formed on the negative electrode current collector and the positive electrode current collector, respectively, a lithium occluding capability of the negative electrode mixture per weight and a lithium emitting capability of the positive electrode mixture per weight were measured in advance, and the lithium occluding capability of a negative electrode mixture layer per a unit area was set not to exceed the lithium emitting capability of a positive electrode mixture layer per a unit area.

Manufacturing of Battery Device

A battery device was manufactured as described below. First, a minutely porous film, which had a thickness of 20 μm and was formed of polypropylene, was cut into a shape shown in FIGS. 8A and 8B, and this was used as a separator. Next, 26 sheets of negative electrodes, 25 sheets of positive electrodes, 50 sheets of separators, which were obtained as described above, were laminated as shown in FIGS. 8A and 8B, that is, in the order of negative electrode, separator, positive electrode, . . . , positive electrode, separator, and negative electrode. In addition, the positive electrode and the negative electrode were laminated in such a manner that the positive electrode current collector exposed portion and the negative electrode current collector exposed portion were opposite from each other. A thickness of the battery device was set to 8 mm. In this manner, a battery device including 50 layers of a basic lamination unit including the positive electrode mixture layer, the separator, and the negative electrode mixture layer was formed. In addition, the battery device included the negative electrode mixture layer at the outermost upper and lower layers, but this negative electrode mixture layer did not contribute to a battery reaction because this negative electrode mixture layer was not opposite to the positive electrode. In addition, in regard to this lamination, a relative position of the negative electrode and the positive electrode was adjusted such that when seen from a lamination direction, a projection plane of the positive electrode mixture layer was in an internal side of a projection plane of the negative electrode mixture layer.

Manufacturing of Secondary Battery

Next, 25 sheets of the positive electrode current collector exposed portions were collectively connected to a positive electrode tab formed of aluminum (Al) through an ultrasonic welding. Similarly to this, 26 sheets of the negative electrode current collector exposed portions were collectively connected to a negative electrode tab formed of nickel (Ni) through the ultrasonic welding. Next, a resin layer formed of casted polypropylene (CPP), an adhesive layer, aluminum foil, an adhesive layer, and a resin layer formed of nylon are sequentially laminated as a laminated film, and two sheets of these laminated films having a rectangular shape were prepared. A concave portion in which a battery device is accommodated was formed in one side of the two sheets of laminated film. Next, the battery device was accommodated in the concave portion of the laminated film in such a manner that one end of each of the positive electrode tab and the negative electrode tab was lead-out to the outside. Next, the other side laminated film was made to overlap the one side laminated film to cover the concave portion in which the battery device was accommodated, and the periphery of the laminated films with one side left were thermally fused to have a bag shape.

Next, ethylene carbonate and propylene carbonate were mixed in a mass ratio of 50:50, 0.7 kmol/kg of $LiPF_6$ was dissolved, and thereby an electrolytic solution was prepared. Next, the electrolytic solution was injected from the opening side of the laminated film having a bag shape and was impregnated into the battery device, and then the opening was sealed through a thermal fusion.

In this manner, an intended secondary battery was manufactured.

Example 1-2

A secondary battery was manufactured similarly to the example 1-1 except that the width wc of the positive electrode current collector exposed portion and the width Wc of the positive electrode active material layer were set to satisfy a relationship of wc/Wc=0.9.

Example 1-3

A secondary battery was manufactured similarly to the example 1-1 except that the width wc of the positive electrode current collector exposed portion and a width Wc of the positive electrode active material layer were set to satisfy a relationship of wc/Wc=0.8.

Example 1-4

A secondary battery was manufactured similarly to the example 1-1 except that the width wc of the positive electrode current collector exposed portion and the width We of the positive electrode active material layer were set to satisfy a relationship of wc/Wc=0.7.

Example 1-5

A secondary battery was manufactured similarly to the example 1-1 except that the width we of the positive electrode current collector exposed portion and the width We of the positive electrode active material layer were set to satisfy a relationship of wc/Wc=0.6.

Comparative Example 1-1

A secondary battery was manufactured similarly to the example 1-1 except that the width we of the positive electrode current collector exposed portion and the width We of the positive electrode active material layer were set to satisfy a relationship of wc/Wc=0.5.

Comparative Example 1-2

A secondary battery was manufactured similarly to the example 1-1 except that the width we of the positive electrode current collector exposed portion and the width We of the positive electrode active material layer were set to satisfy a relationship of wc/Wc=0.4.

Comparative Example 1-3

A secondary battery was manufactured similarly to the example 1-1 except that the width we of the positive electrode current collector exposed portion and the width We of the positive electrode active material layer were set to satisfy a relationship of wc/Wc=0.3.

Comparative Example 1-4

A secondary battery was manufactured similarly to the example 1-1 except that the width we of the positive electrode current collector exposed portion and the width We of the positive electrode active material layer were set to satisfy a relationship of wc/Wc=0.2.

Comparative Example 1-5

A secondary battery was manufactured similarly to the example 1-1 except that the width we of the positive electrode current collector exposed portion and the width We of the positive electrode active material layer were set to satisfy a relationship of wc/Wc=0.1.

Example 1-6

A secondary battery according to this example 1-6 was manufactured in such a manner that the width we of the positive electrode current collector exposed portion and the width We of the positive electrode active material layer were set to satisfy a relationship of wc/Wc=1.0 and the width wa of the negative electrode current collector exposed portion and the width Wa of the negative electrode active material layer were set to satisfy a relationship of wa/Wa=0.9, Example 1-7

A secondary battery was manufactured similarly to the example 1-6 except that the width wa of the negative electrode current collector exposed portion and the width Wa of the negative electrode active material layer were set to satisfy a relationship of wa/Wa=0.8.

Example 1-8

A secondary battery was manufactured similarly to the example 1-6 except that the width wa of the negative electrode current collector exposed portion and the width Wa of the negative electrode active material layer were set to satisfy a relationship of wa/Wa=0.7.

Example 1-9

A secondary battery was manufactured similarly to the example 1-6 except that the width wa of the negative electrode current collector exposed portion and the width Wa of the negative electrode active material layer were set to satisfy a relationship of wa/Wa=0.6.

Comparative Example 1-6

A secondary battery was manufactured similarly to the example 1-6 except that the width wa of the negative electrode current collector exposed portion and the width Wa of the negative electrode active material layer were set to satisfy a relationship of wa/Wa=0.5.

Comparative Example 1-7

A secondary battery was manufactured similarly to the example 1-6 except that the width wa of the negative electrode current collector exposed portion and the width Wa of the negative electrode active material layer were set to satisfy a relationship of wa/Wa=0.4.

Comparative Example 1-8

A secondary battery was manufactured similarly to the example 1-6 except that the width wa of the negative electrode current collector exposed portion and the width Wa of the negative electrode active material layer were set to satisfy a relationship of wa/Wa=0.3.

Comparative Example 1-9

A secondary battery was manufactured similarly to the example 1-6 except that the width wa of the negative electrode current collector exposed portion and the width Wa of the negative electrode active material layer were set to satisfy a relationship of wa/Wa=0.2.

Comparative Example 1-10

A secondary battery was manufactured similarly to the example 1-6 except that the width wa of the negative electrode current collector exposed portion and the width Wa of the negative electrode active material layer were set to satisfy a relationship of wa/Wa=0.1.

Test for Measuring Output Density

A current of 0.5 C, 1 C, 2 C, 3 C, and 4 C was applied to a battery in a state of charge (SOC) of 50% for 10 seconds, a voltage at 10 seconds in each current value was measured, and an output density was obtained from the current-voltage characteristics. That is, the output (Po) was obtained from an equation of Po=Id×Vd by using a current value (Id) when a discharge terminating voltage (Vd=2.0 V) of the battery, and the current-voltage characteristics are extrapolated until the discharge completion voltage. A value obtained by dividing the output (Po) by a weight of the battery The output density was set as the output density.

Test results were shown in Table 1.

TABLE 1

| | | wc/Wc | wa/Wa | Output density (W/kg) |
|---|---|---|---|---|
| Examples | 1-1 | 1 | 1 | 3018 |
| | 1-2 | 0.9 | 1 | 3014 |
| | 1-3 | 0.8 | 1 | 3009 |
| | 1-4 | 0.7 | 1 | 3002 |
| | 1-5 | 0.6 | 1 | 2991 |
| Comparative Examples | 1-1 | 0.5 | 1 | 2975 |
| | 1-2 | 0.4 | 1 | 2950 |
| | 1-3 | 0.3 | 1 | 2908 |
| | 1-4 | 0.2 | 1 | 2824 |
| | 1-5 | 0.1 | 1 | 2597 |
| Examples | 1-6 | 1 | 0.9 | 3023 |
| | 1-7 | 1 | 0.8 | 3026 |
| | 1-8 | 1 | 0.7 | 3028 |
| | 1-9 | 1 | 0.6 | 3027 |
| Comparative Examples | 1-6 | 1 | 0.5 | 3021 |
| | 1-7 | 1 | 0.4 | 3009 |
| | 1-8 | 1 | 0.3 | 2982 |
| | 1-9 | 1 | 0.2 | 2920 |
| | 1-10 | 1 | 0.1 | 2735 |

As can be seen from Table 1, in the examples 1-1 to 1-5 with respect to the positive electrode, an output density higher than that in the comparative examples 1-1 to 1-5 was obtained. In addition, in the examples 1-6 to 1-9 with respect to the negative electrode, an output density higher than that in the comparative examples 1-6 to 1-10 was obtained. In addition, as a value of wc/Wc and a value of wa/Wa were close to 1.0, the output density became high. Therefore, from the viewpoint of the output density, it can be seen that it is preferable that the width of the current collector exposed portion be large.

In addition, with respect to a secondary battery according to examples 2-1 to 2-6, a test for measuring a discharge capacity maintaining ratio was performed.

Example 2-1

A secondary battery was obtained similarly to the example 1-1 except that the depth dc of the positive electrode current collector exposed portion and the depth Dc of the positive electrode active material layer were set to satisfy a relationship of dc/Dc=0.02, the thickness of the battery device was set to 6.3 mm, and a battery discharge capacity was set to 10 Ah.

Example 2-2

A secondary battery was obtained similarly to the example 2-1 except that the depth dc of the positive electrode current collector exposed portion and the depth Dc of the positive electrode active material layer were set to satisfy a relationship of dc/Dc=0.10, and the thickness of the battery device was set to 6.8 mm.

Example 2-3

A secondary battery was obtained similarly to the example 2-1 except that the depth dc of the positive electrode current collector exposed portion and the depth Dc of the positive electrode active material layer were set to satisfy a relationship of dc/Dc=0.30, and the thickness of the battery device was set to 8.7 mm.

Example 2-4

A secondary battery was obtained similarly to the example 2-1 except that the depth dc of the positive electrode current collector exposed portion and the depth Dc of the positive electrode active material layer were set to satisfy a relationship of dc/Dc=0.40, and the thickness of the battery device was set to 10.0 mm.

Example 2-5

A secondary battery was obtained similarly to the example 2-1 except that the depth dc of the positive electrode current collector exposed portion and the depth Dc of the positive electrode active material layer were set to satisfy a relationship of dc/Dc=0.01.

Example 2-6

A secondary battery was obtained similarly to the example 2-1 except that the depth dc of the positive electrode current collector exposed portion and the depth Dc of the positive electrode active material layer were set to satisfy a relationship of dc/Dc=0.42, and the thickness of the battery device was set to 10.6 mm.

Test for Measuring Discharge Capacity Maintaining Ratio

A test for measuring discharge capacity maintaining ratio was performed as described below. First, a charge was performed with a constant voltage and constant current charge of 10 A and 3.6V, and then a discharge was performed to 2.0V at 10 A, and thereby a discharge capacity at first cycle was obtained. Next, a charge and discharge was repeated under the same condition as that of the case where the discharge capacity at first cycle was measured, and a discharge capacity at $1000^{th}$ cycle was obtained. Next, a discharge capacity maintaining ratio after 1000 cycles was obtained from the following equation by using the discharge capacity at first cycle and the discharge capacity at $1000^{th}$ cycle.

A capacity maintaining ratio (%) after 1000 cycles= (discharge capacity at $1000^{th}$ cycles/discharge capacity at first cycle)×100 Test results were shown in Table 2.

TABLE 2

|  |  | dc/Dc | Cell thickness (mm) | Discharge capacity maintaining ratio at a point of time of $1000^{th}$ cycle (%) |
|---|---|---|---|---|
| Examples | 2-1 | 0.02 | 6.3 | 94 |
|  | 2-2 | 0.10 | 6.8 | 97 |
|  | 2-3 | 0.30 | 8.7 | 92 |
|  | 2-4 | 0.40 | 10.0 | 90 |
|  | 2-5 | 0.01 | 6.3 | 88 |
|  | 2-6 | 0.42 | 10.6 | 85 |

As can be seen from Table 2, in the examples 2-1 to 2-4, a discharge capacity maintaining ratio higher than that in the examples 2-5 and 2-6 was obtained. In addition, in the example 2-5, a welding portion generated heat due to a high rate cycle, and cycle life duration was decreased. In addition, in the example 2-6, a heat dissipation property inside the battery device was deteriorated due to the high rate cycle, and the cycle life duration was decreased. In the examples 2-1 to 2-4, this problem did not occur. From these results, it can be seen that 0.02<(dc/Dc)≤0.40 is preferable range.

In addition, with respect to a secondary battery of examples 3-1 to 3-21, a test for measuring a swelling amount of the battery device, a external short circuit test, and a test for confirming whether or not cracking was present after bending process were performed.

Example 3-1

The positive electrode tab was formed of aluminum (Al), and a conductivity thereof was set to 60 IACS %. In addition, the negative electrode tab was formed of copper (Cu) alloy, and a conductivity thereof was set to 90 IACS %. The thickness of the positive electrode tab and the negative electrode tab was set to 50 μm, respectively. In addition, four surfaces of the negative electrode tab were covered by nickel (NI) at a top surface, a left side surface, a bottom surface, and a right side surface except for one end surface and the other end surface. A thickness of the covering layer of nickel (Ni) was set to 1 μm. A secondary battery was manufactured similarly to the example 1-1 except the above-described conditions.

Example 3-2

A secondary battery was manufactured similarly to the example 3-1 except that each thickness of the positive electrode tab and the negative electrode tab was set to 100 μm.

Example 3-3

A secondary battery was manufactured similarly to the example 3-1 except that each thickness of the positive electrode tab and the negative electrode tab was set to 200 μm.

Example 3-4

A secondary battery was manufactured similarly to the example 3-1 except that each thickness of the positive electrode tab and the negative electrode tab was set to 400 μm.

Example 3-5

A secondary battery was manufactured similarly to the example 3-1 except that each thickness of the positive electrode tab and the negative electrode tab was set to 200 μm, the negative electrode tab was formed of aluminum (Al), the conductivity was set to 60 IACS %, and the covering of tab was not performed.

Example 3-6

A secondary battery was manufactured similarly to the example 3-1 except that each thickness of the positive electrode tab and the negative electrode tab was set to 200 μm, the negative electrode tab was formed of copper (Cu), and the conductivity was set to 100 IACS %.

Example 3-7

A secondary battery was manufactured similarly to the example 3-1 except that each thickness of the positive electrode tab and the negative electrode tab was set to 200 μm, the negative electrode tab was formed of copper (Cu) alloy, and the conductivity the negative electrode tab was set to 70 IACS %.

Example 3-8

A secondary battery was manufactured similarly to the example 3-1 except that each thickness of the positive electrode tab and the negative electrode tab was set to 200 µm, and the conductivity of the negative electrode tab was set to 80 IACS %.

Example 3-9

A secondary battery was manufactured similarly to the example 3-1 except that each thickness of the positive electrode tab and the negative electrode tab was set to 200 µm, and the conductivity of the negative electrode tab was set to 100 IACS %.

Example 3-10

A secondary battery was manufactured similarly to the example 3-1 except that each thickness of the positive electrode tab and the negative electrode tab was set to 200 µm, and the covering material was set to tin (Sn).

Example 3-11

A secondary battery was manufactured similarly to the example 3-1 except that each thickness of the positive electrode tab and the negative electrode tab was set to 200 µm, and the thickness of the covering layer was set to 0.1 µm.

Example 3-12

A secondary battery was manufactured similarly to the example 3-1 except that each thickness of the positive electrode tab and the negative electrode tab was set to 200 µm, and the thickness of the covering layer was set to 3 µm.

Example 3-13

A secondary battery was manufactured similarly to the example 3-1 except that each thickness of the positive electrode tab and the negative electrode tab was set to 25 µm.

Example 3-14

A secondary battery was manufactured similarly to the example 3-1 except that each thickness of the positive electrode tab and the negative electrode tab was set to 450 µm.

Example 3-15

A secondary battery was manufactured similarly to the example 3-1 except that each thickness of the positive electrode tab and the negative electrode tab was set to 200 µm, the negative electrode tab was formed of nickel (Ni), the conductivity of the negative electrode tab was set to 20 IACS %, and the covering of tab was not performed.

Example 3-16

A secondary battery was manufactured similarly to the example 3-1 except that each thickness of the positive electrode tab and the negative electrode tab was set to 200 µm, and the conductivity of the negative electrode tab was set to 50 IACS %.

Example 3-17

A secondary battery was manufactured similarly to the example 3-1 except that each thickness of the positive electrode tab and the negative electrode tab was set to 200 µm, and the conductivity of the negative electrode tab was set to 30 IACS %.

Example 3-18

Figure 3E:
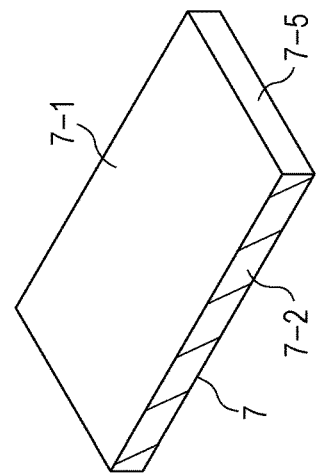
Figure 3D:
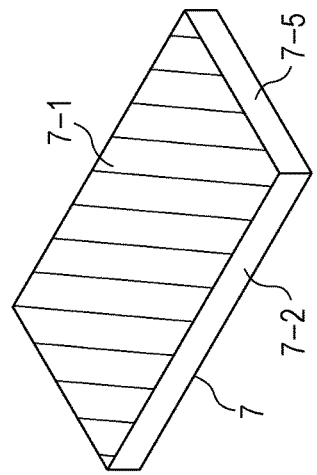

A secondary battery was manufactured similarly to the example 3-1 except that each thickness of the positive electrode tab and the negative electrode tab was set to 200 µm, and two surfaces of the top surface and the bottom surface were covered as indicated by inclined lines of FIG. 3D.

Example 3-19

A secondary battery was manufactured similarly to the example 3-1 except that each thickness of the positive electrode tab and the negative electrode tab was set to 200 µm, and the left side surface and the right side surface were covered as indicated by inclined lines of FIG. 3E.

Example 3-20

A secondary battery was manufactured similarly to the example 3-1 except that each thickness of the positive electrode tab and the negative electrode tab was set to 200 µm, and the thickness of the covering layer was set to 0.05 µm.

Example 3-21

A secondary battery was manufactured similarly to the example 3-1 except that each thickness of the positive electrode tab and the negative electrode tab was set to 200 µm, and the thickness of the covering layer was set to 4 µm.

Test for Measuring Swelling Amount of Secondary Battery

A test for measuring swelling amount of a secondary battery was performed as follows. A battery was interposed between a set of parallel flat plates, and a thickness between two flat plates when a weight of 300 g was pressed thereto was measured as a thickness of the secondary battery. In addition, the test for measuring the swelling amount of the secondary battery was performed by measuring the swelling amount after maintaining the secondary battery for one month under conditions of a temperature of 60° C., and a humidity of RH 90%.

External Short Circuit Test

The external short circuit test was performed as described below. The positive electrode tab and the negative electrode tab were connected through a wire harness, and then observed the battery state.

Test for Confirming Whether or not Cracking is Present after Bending Process

The test for confirming whether or not cracking is present after bending process was performed as follows. A bent tab was observed by an optical microscope, and it was determined whether or not cracking was present.

Test results of the above-described three tests were shown in Table 3.

TABLE 3

| | | Tab thickness (μm) | Material of positive electrode tab | Conductivity of positive electrode tab (IACS %) | Material of negative electrode | Conductivity of negative electrode tab (IACS %) | Coating material | Coated surface | Thickness of coated layer (μm) | cell swelling amount after being maintained for one month at 60° C./RH 90% (mm) | External short circuit test | Whether or not cracking is present after bending process |
|---|---|---|---|---|---|---|---|---|---|---|---|---|
| Examples | 3-1 | 50 | Al | 60 | Cu alloy | 90 | Ni | 4 | 1 | 0.17 | Without cleavage | Not present |
| | 3-2 | 100 | Al | 60 | Cu alloy | 90 | Ni | 4 | 1 | 0.21 | Without cleavage | Not present |
| | 3-3 | 200 | Al | 60 | Cu alloy | 90 | Ni | 4 | 1 | 0.23 | Without cleavage | Not present |
| | 3-4 | 400 | Al | 60 | Cu alloy | 90 | Ni | 4 | 1 | 0.45 | Without cleavage | Not present |
| | 3-5 | 200 | Al | 60 | Al | 60 | Without | Without | Without | 0.26 | Without cleavage | Not present |
| | 3-6 | 200 | Al | 60 | Cu | 100 | Ni | 4 | 1 | 0.25 | Without cleavage | Not present |
| | 3-7 | 200 | Al | 60 | Cu alloy | 70 | Ni | 4 | 1 | 0.22 | Without cleavage | Not present |
| | 3-8 | 200 | Al | 60 | Cu alloy | 80 | Ni | 4 | 1 | 0.24 | Without cleavage | Not present |
| | 3-9 | 200 | Al | 60 | Cu alloy | 100 | Ni | 4 | 1 | 0.27 | Without cleavage | Not present |
| | 3-10 | 200 | Al | 60 | Cu alloy | 90 | Sn | 4 | 1 | 0.35 | Without cleavage | Not present |
| | 3-11 | 200 | Al | 60 | Cu alloy | 90 | Ni | 4 | 0.1 | 0.28 | Without cleavage | Not present |
| | 3-12 | 200 | Al | 60 | Cu alloy | 90 | Ni | 4 | 3 | 0.22 | Without cleavage | Not present |
| | 3-13 | 25 | Al | 60 | Cu alloy | 90 | Ni | 4 | 1 | 0.11 | Cleavage | present |
| | 3-14 | 450 | Al | 60 | Cu alloy | 90 | Ni | 4 | 1 | 1.83 | Without cleavage | Not present |
| | 3-15 | 200 | Al | 60 | Ni | 20 | Without | Without | Without | 0.14 | Cleavage and Ignition of electrolytic solution | Not present |
| | 3-16 | 200 | Al | 60 | Cu alloy | 50 | Ni | 4 | 1 | 0.25 | Cleavage | Not present |
| | 3-17 | 200 | Al | 60 | Cu alloy | 30 | Ni | 4 | 1 | 0.22 | Cleavage and Ignition of electrolytic solution | Not present |
| | 3-18 | 200 | Al | 60 | Cu alloy | 90 | Ni | 2 (plan surface) | 1 | 1.61 | Without cleavage | Not present |
| | 3-19 | 200 | Al | 60 | Cu alloy | 90 | Ni | 2 (side surface) | 1 | 2.30 | Without cleavage | Not present |
| | 3-20 | 200 | Al | 60 | Cu alloy | 90 | Ni | 4 | 0.05 | 1.64 | Without cleavage | Not present |
| | 3-21 | 200 | Al | 60 | Cu alloy | 90 | Ni | 4 | 4 | 0.18 | Cleavage | Not present |

As shown in Table 3, in the test for measuring the swelling amount of the secondary battery, when the thickness of the tab was large, it can be seen that the secondary battery was swelled. This is because that when the tab was thick, the sealing property at a side surface of the tab was insufficient. In addition, the covering of Ni with respect to the negative electrode tab was performed at a flat surface or a side surface, it can be seen that the secondary battery was swelled. This is because that when the Cu alloy directly came into contact with the sealant (resin), damage by copper was generated and thereby the sealing property was deteriorated. In addition, even though the Ni coating was performed, when the coating thickness was approximately 0.01 mm, the damage by copper was generated at a portion where the coating was insufficient, such that the swelling amount of the secondary battery was increased.

In addition, as shown in Table 3, in the external short circuit test, a cleavage was not generated in the examples 3-1 to 3-12. On the other hand, the cleavage was generated in the examples 3-13, 3-16, and 3-21. In addition, the cleavage was generated in the examples 3-15 and 3-17, and the ignition of the electrolytic solution was generated.

In addition, as shown in Table 3, in regard to the test for confirming whether or not the cracking is present after the bending process, in the examples 3-1 to 3-12, the cracking due to the bending process was not generated. On the other hand, in the example 3-13, the cracking after the bending process was generated.

In the example 3-13, the thickness of the positive electrode tab was smaller than that in the examples 3-1 to 3-12, heat was generated due to the large current discharge, and the covering layer was melted. In the example 3-14, the thickness of the positive electrode tab was larger than that in the examples 3-1 to 3-12, such that moisture penetrated from the side of the positive electrode tab. In the example 3-15, the conductivity of the negative electrode tab was lower than that in the examples 3-1 to 3-12, the negative electrode tab was in a red heat state due to a large current discharge, and the covering layer was melted, and thereby the ignition of the electrolytic solution was generated. In the example 3-16, the conductivity of the negative electrode tab was lower than that in the examples 3-1 to 3-12, and the negative electrode tab generated heat due to a large current discharge, and therefore the covering layer was melted. In the example 3-17, the conductivity of the negative electrode tab was lower than that in the examples 3-1 to 3-12, and the negative electrode tab was in a red heat state, such that the covering layer was melted, and the ignition of the electrolytic solution was generated.

In the example 3-18, the sealing property of the covering material was deteriorated due to the generation of the damage by copper, and therefore moisture penetrated. In the example 3-19, the sealing property of the covering layer was deteriorated due to the generation of the damage by copper, and a large amount of moisture penetrated, compared to the example 3-18. In the example 3-20, a tab base portion was exposed due to an unevenness of the covering layer. In addition, due to the generation of the damage by copper, the sealing property of the covering material was deteriorated and moisture penetrated. In the example 3-21, the thickness of the covering layer was larger than that in the examples 3-1 to 3-12, and heat generation occurred due to the large current discharge.

In addition, with respect to the secondary battery according to the following examples 4-1 to 4-6, a test for measuring a tensile strength at a connection portion, and an external short circuit test were performed.

Example 4-1

A secondary battery was manufactured similarly to the example 1-1 except that the connection between the positive electrode current collector exposed portion and the positive electrode tab was performed through an ultrasonic welding, and connection area/width of the positive electrode tab was set to 0.05.

Example 4-2

A secondary battery was manufactured similarly to the example 4-1 except that the connection area/the width of the positive electrode tab was set to 0.2.

Example 4-3

A secondary battery was manufactured similarly to the example 4-1 except that the connection area/the width of the positive electrode tab was set to 7.

Example 4-4

A secondary battery was manufactured similarly to the example 4-1 except that the connection area/the width of the positive electrode tab was set to 10.

Example 4-5

A secondary battery was manufactured similarly to the example 4-1 except that the connection area/the width of the positive electrode tab was set to 0.025.

Example 4-6

A secondary battery was manufactured similarly to the example 4-1 except that the connection area/the width of the positive electrode tab was set to 11.

Test for Measuring Tensile Strength of Connection Portion

A test for measuring a tensile strength of a connection portion was performed as follow. Plural sheets of current collector foil and a tab, which were connected, were pulled at a velocity of 1 mm/sec in a vertical direction, and an average value of the strength per a unit length (N/cm) was calculated.

External Short Circuit Test

The external short circuit test was performed as follows. The positive electrode tab and the negative electrode tab were connected through a wire harness, and then observed the battery state.

Test results of the above-described two tests were shown in Table 4.

TABLE 4

| | | Connection method | Connection area/tab width | Welding strength (N/cm) | External short circuit test |
|---|---|---|---|---|---|
| Examples | 4-1 | Ultrasonic welding | 0.05 | 108.3 | Without cleavage |
| | 4-2 | Ultrasonic welding | 0.2 | 98.7 | Without cleavage |
| | 4-3 | Ultrasonic welding | 7 | 96.5 | Without cleavage |
| | 4-4 | Ultrasonic welding | 10 | 86.7 | Without cleavage |
| | 4-5 | Ultrasonic welding | 0.025 | 112.5 | Cleavage |
| | 4-6 | Ultrasonic welding | 11 | 40.2 | Without cleavage |

In the examples 4-1 to 4-4, a high tensile strength was obtained. On the other hand, in the example 4-5, a high tensile strength was obtained, but cleavage was generated. In addition, in the example 4-6, the value of the tensile strength was low. From these test results, it can be seen that it is preferable to perform the connection in such a manner that the value of connection area/positive electrode tab is 0.05 to 10.0 mm, and more particularly 0.2 to 7.0 mm.

Furthermore, with respect to a secondary battery according to examples 5-1 to 5-36, a test for measuring a volume energy density, a test for measuring an open circuit voltage (OCV) after a vibration test, and a test for measuring an injection completion time were performed.

Example 5-1

A sealant was provided to a bent portion of a positive electrode tab, and a positive electrode tab was connected to a positive electrode tab current collector exposed portion between the positive electrode current collector exposed portion and the battery device. In addition, insulation between the positive electrode tab and the outermost peripheral negative electrode of the battery device was performed by providing an insulator. The insulator was formed of polypropylene (PP), a thickness thereof was set to 0.4 mm, a height thereof was set to 5.5 mm, and a length thereof was set to substantially the same dimension as the width of a negative electrode. In addition, a shape of the insulator was set to a rectangular shape with a round corner, and a punching process was not performed. A secondary battery was manufactured similarly to the example 1-1 except for the above-described conditions.

Example 5-2

A secondary battery was manufactured similarly to the example 5-1 except that the insulation between the positive electrode tab and the outermost peripheral negative electrode of the battery device was performed by providing the insulator and the outermost layer separator.

Example 5-3

A secondary battery was manufactured similarly to the example 5-1 except that as the insulator, polyethylenetelephthalate (PET) was used.

Example 5-4

A secondary battery was manufactured similarly to the example 5-1 except that as the insulator, polyethylene (PE) was used.

Example 5-5

A secondary battery was manufactured similarly to the example 5-1 except that as the insulator, polyimide (PI) was used.

Example 5-6

A secondary battery was manufactured similarly to the example 5-1 except that the thickness of the insulator was set to 0.2 mm.

Example 5-7

A secondary battery was manufactured similarly to the example 5-1 except that the thickness of the insulator was set to 0.75 mm.

Example 5-8

A secondary battery was manufactured similarly to the example 5-1 except that the thickness of the insulator was set to 1.0 mm.

Example 5-9

A secondary battery was manufactured similarly to the example 5-1 except that the height of the insulator was set to 5.0 mm.

Example 5-10

A secondary battery was manufactured similarly to the example 5-1 except that the height of the insulator was set to 6 mm.

Example 5-11

A secondary battery was manufactured similarly to the example 5-1 except that the height of the insulator was set to 6.5 mm.

Example 5-12

A secondary battery was manufactured similarly to the example 5-1 except that the height of the insulator was set to 7.0 mm.

Example 5-13

A secondary battery was manufactured similarly to the example 5-1 except that the width of the insulator was set to substantially the same as that of the separator.

Example 5-14

A secondary battery was manufactured similarly to the example 5-1 except that the shape of the insulator was set to a rectangular shape.

Example 5-15

A secondary battery was manufactured similarly to the example 5-1 except that the insulator was formed of nonwoven fabric, and the shape of the insulator was set to rectangular shape.

Example 5-16

A secondary battery was manufactured similarly to the example 5-1 except that the length of the insulator was set to a dimension that was substantially the same as the width (inner dimension) of the separator, and the shape of the insulator was set to approximately lateral U-shape.

Example 5-17

A secondary battery was manufactured similarly to the example 5-1 except that the length of the insulator was set to a dimension that was substantially the same as the width (inner dimension) of the separator, and the shape of the insulator was set to approximately square shape.

Example 5-18

A secondary battery was manufactured similarly to the example 5-1 except that the length of the insulator was set to a dimension that was substantially the same as the width (inner dimension) of the separator, and the shape of the insulator was set to a box shape.

Example 5-19

A secondary battery was manufactured similarly to the example 5-1 except that the punching process was performed.

Example 5-20

A secondary battery was manufactured similarly to the example 5-1 except that the shape of the insulator was set to a rectangular shape, the height was set to 6 mm, and the punching process was performed.

Example 5-21

A secondary battery was manufactured similarly to the example 5-1 except that the thickness of the insulator was set to 0.75 mm, the height was set to 6 mm, the width of the insulator was set to a dimension that was substantially the same as the width (inner dimension) of the separator, the shape of the insulator was set to an approximately lateral U-shape, and the punching process was performed.

Example 5-22

A secondary battery was manufactured similarly to the example 5-1 except that the thickness of the insulator was set to 0.75 mm, the height was set to 6 mm, the width of the insulator was set to a dimension that was substantially the same as the width (inner dimension) of the separator, the shape of the insulator was set to an approximately square shape, and the punching process was performed.

Example 5-23

A secondary battery was manufactured similarly to the example 5-1 except that the thickness of the insulator was set to 0.75 mm, the height was set to 6 mm, the width of the insulator was set to a dimension that was substantially the same as the width (inner dimension) of the separator, the shape of the insulator was set to a box shape, and the punching process was performed.

Example 5-24

A secondary battery was manufactured similarly to the example 5-1 except that the insulator was formed of non-woven fabric, the thickness of the insulator was set to 0.75 mm, the height was set to 6 mm, the width of the insulator was set to a dimension that was substantially the same as the width (inner dimension) of the separator, and the shape of the insulator was set to an approximately lateral U-shape.

Example 5-25

A secondary battery was manufactured similarly to the example 5-24 except that the shape of the insulator was set to an approximately square shape.

Example 5-26

A secondary battery was manufactured similarly to the example 5-24 except that the shape of the insulator was set to a box shape.

Example 5-27

A secondary battery was manufactured similarly to the example 5-1 except that sealant was not provided at the bent portion of the positive electrode tab.

Example 5-28

A secondary battery was manufactured similarly to the example 5-1 except that the positive electrode tab was connected to the positive electrode current collector exposed portion between the positive electrode current collector exposed portion and the exterior material.

Example 5-29

A secondary battery was manufactured similarly to the example 5-1 except that the insulation between the positive electrode tab and the outermost peripheral negative electrode of the battery device was performed by providing the outermost layer separator without using the insulator.

Example 5-30

A secondary battery was manufactured similarly to the example 5-1 except that the insulation between the positive electrode tab and the outermost peripheral negative electrode of the battery device was performed by using polypropylene (PP) adhesive tape without using the insulator.

Example 5-31

A secondary battery was manufactured similarly to the example 5-1 except that the thickness of the insulator was set to 0.1 mm.

Example 5-32

A secondary battery was manufactured similarly to the example 5-1 except that the thickness of the insulator was set to 1.2 mm.

Example 5-33

A secondary battery was manufactured similarly to the example 5-1 except that the height of the insulator was set to 4.5 mm.

Example 5-34

A secondary battery was manufactured similarly to the example 5-1 except that the height of the insulator was set to 7.5 mm.

Example 5-35

A secondary battery was manufactured similarly to the example 5-1 except that the length of the insulator was set to "the width of the negative electrode −1 mm".

Example 5-36

A secondary battery was manufactured similarly to the example 5-1 except that the length of the insulator was set to "the width of the separator+1 mm".

Test for Measuring Volume Energy Density

A test for measuring a volume energy density was performed as described below. A discharge energy amount (Wh) was obtained from 0.2 C discharge capacity (Ah) and an average discharge voltage (V) of a battery, this discharge energy amount was divided by a maximum dimensional volume (L) of a battery, and the resultant value was set as a volume energy density (Wh/L).

Test of Measuring OCV after Vibration Test

A test of measuring an OCV after vibration test was performed as described below. Vibration was applied to a battery with a vibration accelerating velocity of 3G, and the number of vibrations of 20 Hz, in a longitudinal direction, a lateral direction, and a height direction, for 100 times. Then, the OCV was measured.

Test for Measuring Injection Completion Time

A test for measuring an injection completion time was performed as described. An electrolytic solution was injected from a dispenser with an opening not sealed facing the upper side, and a time when the electrolytic solution face reached a position that was immediately below the opening was measured. (A time taken during the solution naturally descended in a concave portion under an atmospheric pressure was measured).

Test results of the above-described two tests were shown in Table 5.

TABLE 5

| | | Sealant at tab bending position | Tab displacement place | Insulating method | Material of insulator | Thickness (mm) | Height (mm) | Length (mm) | Shape | Punching Process | Volume energy density (Wh/L) | Variation of OCV after vibration test (v) | Injection completion time (sec) |
|---|---|---|---|---|---|---|---|---|---|---|---|---|---|
| Examples | 5-1 | Provided | Between current collector exposed portion and battery device | Insulator | PP | 0.4 | 5.5 | Width of negative electrode | Rectangular shape with a round corner | Without | 298 | 0 | 5 |
| | 5-2 | Provided | Between current collector exposed portion and battery device | Insulator + Outermost layer separator | PP | 0.4 | 5.5 | Width of negative electrode | Rectangular shape with a round corner | Without | 295 | 0 | 5 |
| | 5-3 | Provided | Between current collector exposed portion and battery device | Insulator | PET | 0.4 | 5.5 | Width of negative electrode | Rectangular shape with a round corner | Without | 298 | 0 | 5 |
| | 5-4 | Provided | Between current collector exposed portion and battery device | Insulator | PE | 0.4 | 5.5 | Width of negative electrode | Rectangular shape with a round corner | Without | 298 | 0 | 5 |
| | 5-5 | Provided | Between current collector exposed portion and battery device | Insulator | PI | 0.4 | 5.5 | Width of negative electrode | Rectangular shape with a round corner | Without | 298 | 0 | 5 |
| | 5-6 | Provided | Between current collector exposed portion and battery device | Insulator | PP | 0.2 | 5.5 | Width of negative electrode | Rectangular shape with a round corner | Without | 305 | 0 | 5 |
| | 5-7 | Provided | Between current collector exposed portion and battery device | Insulator | PP | 0.75 | 5.5 | Width of negative electrode | Rectangular shape with a round corner | Without | 291 | 0 | 5 |
| | 5-8 | Provided | Between current collector exposed portion and battery device | Insulator | PP | 1 | 5.5 | Width of negative electrode | Rectangular shape with a round corner | Without | 285 | 0 | 5 |
| | 5-9 | Provided | Between current collector exposed portion and battery device | Insulator | PP | 0.4 | 5 | Width of negative electrode | Rectangular shape with a round corner | Without | 298 | 0 | 5 |
| | 5-10 | Provided | Between current collector exposed portion and battery device | Insulator | PP | 0.4 | 6 | Width of negative electrode | Rectangular shape with a round corner | Without | 298 | 0 | 5 |
| | 5-11 | Provided | Between current collector exposed portion and battery device | Insulator | PP | 0.4 | 6.5 | Width of negative electrode | Rectangular shape with a round corner | Without | 298 | 0 | 5 |
| | 5-12 | Provided | Between current collector exposed portion and battery device | Insulator | PP | 0.4 | 7 | Width of negative electrode | Rectangular shape with a round corner | Without | 298 | 0 | 5 |
| | 5-13 | Provided | Between current collector exposed portion and battery device | Insulator | PP | 0.4 | 5.5 | Width of separator | Rectangular shape with a round corner | Without | 298 | 0 | 5 |
| | 5-14 | Provided | Between current collector exposed portion and battery device | Insulator | PP | 0.4 | 5.5 | Width of negative electrode | Rectangular shape | Without | 298 | 0 | 5 |
| | 5-15 | Provided | Between current collector exposed portion and battery device | Insulator | Non-woven fabric | 0.4 | 5.5 | Width of negative electrode | Rectangular shape | Without | 298 | 0 | 5 |

TABLE 5-continued

| | Sealant at tab bending position | Tab displacement place | Insulating method | Material of insulator | Thickness (mm) | Height (mm) | Length (mm) | Shape | Punching Process | Volume energy density (Wh/L) | Variation of OCV after vibration test (v) | Injection completion time (sec) |
|---|---|---|---|---|---|---|---|---|---|---|---|---|
| 5-16 | Provided | Between current collector exposed portion and battery device | Insulator | PP | 0.4 | 5.5 | Width of separator (inner dimension) | Approximately lateral U-shape | Without | 288 | 0 | 7 |
| 5-17 | Provided | Between current collector exposed portion and battery device | Insulator | PP | 0.4 | 5.5 | Width of separator (inner dimension) | Approximately square shape | Without | 286 | 0 | 7 |
| 5-18 | Provided | Between current collector exposed portion and battery device | Insulator | PP | 0.4 | 5.5 (inner dimension) | Width of separator (inner dimension) | Box shape | Without | 283 | 0 | 12 |
| 5-19 | Provided | Between current collector exposed portion and battery device | Insulator | PP | 0.4 | 5.5 | Width of negative electrode | Rectangular shape with a round corner | Yes | 298 | 0 | 4 |
| 5-20 | Provided | Between current collector exposed portion and battery device | Insulator | PP | 0.4 | 6 | Width of negative electrode | Rectangular shape | Yes | 298 | 0 | 4 |
| 5-21 | Provided | Between current collector exposed portion and battery device | Insulator | PP | 0.75 | 6 | Width of separator (inner dimension) | Approximately lateral U-shape | Yes | 288 | 0 | 6 |
| 5-22 | Provided | Between current collector exposed portion and battery device | Insulator | PP | 0.75 | 6 | Width of separator (inner dimension) | Approximately square shape | Yes | 286 | 0 | 6 |
| 5-23 | Provided | Between current collector exposed portion and battery device | Insulator | PP | 0.75 | 6 (inner dimension) | Width of separator (inner dimension) | Box shape | Yes | 283 | 0 | 7 |
| 5-24 | Provided | Between current collector exposed portion and battery device | Insulator | Non-woven fabric | 0.75 | 6 | Width of separator (inner dimension) | Approximately lateral U-shape | Without | 288 | 0 | 5 |
| 5-25 | Provided | Between current collector exposed portion and battery device | Insulator | Non-woven fabric | 0.75 | 6 | Width of separator (inner dimension) | Approximately square shape | Without | 286 | 0 | 5 |
| 5-26 | Provided | Between current collector exposed portion and battery device | Insulator | Non-woven fabric | 0.75 | 6 (inner dimension) | Width of separator (inner dimension) | Box shape | Without | 283 | 0 | 6 |
| 5-27 | Not provided | Between current collector exposed portion and battery device | Insulator | PP | 0.4 | 5.5 | Width of negative electrode | Rectangular shape with a round corner | Without | 298 | −3.5 | 5 |
| 5-28 | Provided | Between current collector terminal and exterior material | Insulator | PP | 0.4 | 5.5 | Width of negative electrode | Rectangular shape with a round corner | Without | 298 | −3.5 | 5 |
| 5-29 | Provided | Between current collector terminal and exterior material | Outermost layer separator | — | — | — | — | — | — | 308 | −1.5 | 5 |
| 5-30 | Provided | Between current collector exposed portion and battery device | PP adhesive tape | — | — | — | — | — | — | 312 | −1.2 | 5 |
| 5-31 | Provided | Between current collector exposed portion and battery device | Insulator | PP | 0.1 | 5.5 | Width of negative electrode | Rectangular shape with a round corner | Without | 308 | −0.8 | 5 |

TABLE 5-continued

| | Sealant at tab bending position | Tab displacement place | Insulating method | Material of insulator | Thickness (mm) | Height (mm) | Length (mm) | Shape | Punching Process | Volume energy density (Wh/L) | Variation of OCV after vibration test (v) | Injection completion time (sec) |
|---|---|---|---|---|---|---|---|---|---|---|---|---|
| 5-32 | Provided | Between current collector exposed portion and battery device | Insulator | PP | 1.2 | 5.5 | Width of negative electrode | Rectangular shape with a round corner | Without | 272 | 0 | 5 |
| 5-33 | Provided | Between current collector exposed portion and battery device | Insulator | PP | 0.4 | 4.5 | Width of negative electrode | Rectangular shape with a round corner | Without | 298 | −1.3 | 5 |
| 5-34 | Provided | Between current collector exposed portion and battery device | Insulator | PP | 0.4 | 7.5 | Width of negative electrode | Rectangular shape with a round corner | Without | 285 | −0.3 | 5 |
| 5-35 | Provided | Between current collector exposed portion and battery device | Insulator | PP | 0.4 | 5.5 | Width of negative electrode − 1 mm | Rectangular shape with a round corner | Without | 298 | −1.6 | 5 |
| 5-36 | Provided | Between current collector exposed portion and battery device | Insulator | PP | 0.4 | 5.5 | Width of separator + 1 mm | Rectangular shape with a round corner | Without | 292 | −0.4 | 5 |

From the test results, it can be seen that the volume energy density was apt to increase in a case where the insulator was not provided like the examples 5-29 and 5-30, and in a case where the thickness of the insulator was small like the example 5-31. On the other hand, the volume energy density was apt to decrease in a case where the thickness of the insulator was large like the example 5-33.

In regard to the test for measuring the OCV after the vibration test, it was confirmed that in the examples 5-1 to 5-26 and the example 5-32, the OCV did not vary, but in the examples 5-27 to 5-31, and the examples 5-33 to 5-36, the OCV was changed to be decreased.

In the test for measuring the injection completion time, it was confirmed that the injection completion time in a case where the shape of the insulator was an approximately lateral U-shape, an approximately square shape, and a box shape was longer than a case where the shape of the insulator was a rectangular shape and a rectangular shape with a round corner.

In addition, in the example 5-27 where the sealant was not provided to the bent portion of the positive electrode tap, a short circuit occurred due to contacting between front ends of the positive electrode and the negative electrode tab and the outermost layer of the battery device. In addition, in the example 5-28 where the positive electrode tab was connected to the positive electrode current collector exposed portion between the positive electrode current collector exposed portion and the exterior material, a short circuit occurred due to contacting between front ends of the positive electrode tab and the negative electrode tab and the outermost layer of the battery device.

In addition, in the example 5-29 where the outermost layer separator was used for the insulation, a short circuit occurred due to contacting between the positive electrode current collector exposed portion and the outermost layer negative electrode which was caused when the separator was broke through. In addition, in the example 5-30 where the polypropylene (PP) adhesive tape was used for the insulation, a short circuit occurred due to contacting between the positive electrode current collector exposed portion and the outermost layer negative electrode which was caused by the peeling-off of the adhesive tape.

In addition, in the example 5-31, the insulator was thin, such that a short circuit occurred due to contacting between the positive electrode current collector exposed portion and the outermost layer negative electrode. In the example 5-32 where the thickness of the insulator was 1.2 mm, the insulator was thick and this thickness was equal to or larger than a bending interval of the positive electrode current collector exposed portion, and thereby the volume energy density was decreased significantly. In addition, in the example 5-33, the insulator was low, such that a short circuit occurred due to contacting between the positive electrode current collector exposed portion and the outermost negative electrode.

In addition, in the example 5-34, since the insulator was equal to or higher than the battery device, the insulator broke through the exterior material due to vibration. Due to this, moisture penetrated into the secondary battery and thereby the OCV was decreased. In addition, in the example 5-35, the width of the insulator was small, a short circuit due to contacting between the contacting between the positive electrode current collector exposed portion and the outermost negative electrode. In addition, in the example 5-36, the width of the insulator was equal to or larger than that of the battery device, such that the insulator broke through the insulator due to vibration. Due to this, moisture penetrated into the secondary battery, and thereby the OCV was decreased.

From the above-described results, it can be seen that it is preferable that the sealant be provided at the bent portion of the positive electrode tab and the negative electrode tab, the positive electrode tab and the negative electrode tab be connected to the current collect exposed portion between the current collector exposed portion and the battery device, and the insulation be performed by the insulator. In addition, it can be seen that the thickness of the insulator is preferably approximately 0.2 mm or more.

In this manner, the secondary battery, the battery unit, and the battery module according to the embodiments of the present disclosure are configured. In addition, the present disclosure is not limited to the above-described embodiments, but various modifications may be made without departing from the technical idea of the present disclosure.

For example, in the above-described embodiments, configurations, methods, processes, shapes, materials, dimensions, or the like are illustrative only, and other configurations, methods, processes, shapes, materials, dimensions, or the like, which are different from that described above, may be used. In addition, the above-described configurations, methods, processes, shapes, materials, and dimensions of the embodiments may be combined to each other without departing from the scope of the present disclosure.

In addition, in the above-described embodiments, examples where the present embodiments are applied to the lithium ion secondary battery are described, but the present disclosure is not limited to the examples, but may be applied to various secondary batteries and primary batteries having the structure in which a battery device is sealed with an exterior material.

The secondary battery 1, the battery unit 100 in which the secondary battery 1 is assembled, and the battery module 200 may be used in an electricity accumulation system used in an electric tool, an electric automobile or a hybrid electric automobile, an electric assisted bicycle, and a house or building.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A secondary battery, comprising:
   a battery device that has a thickness B that ranges from 3 mm to 20 mm and a discharge capacity that ranges from 3 Ah to 50 Ah; and
   an exterior material that packages the battery device,
   wherein the battery device includes:
      a positive electrode that comprises a positive electrode current collector, a positive electrode active material layer on the positive electrode current collector, and a positive electrode current collector exposed portion, wherein a width wc of the positive electrode current collector exposed portion and a width Wc of the positive electrode active material layer satisfy equation (1);
      a negative electrode that comprises a negative electrode current collector, a negative electrode active material layer on the negative electrode current collector, and a negative electrode current collector exposed portion, wherein a width wa of the negative electrode current collector exposed portion and a width Wa of the negative electrode active material layer satisfy equation (2);

a separator between the positive electrode and the negative electrode, wherein the positive electrode and the negative are alternately laminated;

a positive electrode tab electrically connected to the positive electrode current collector exposed portion, wherein the positive electrode tab is led-out to an outside of the exterior material;

a negative electrode tab electrically connected to the negative electrode current collector exposed portion, wherein the negative electrode tab is led-out to the outside of the exterior material, $$0.5<(wc/Wc)<1.0 \qquad (1)$$

$$0.5<(wa/Wa)<1.0 \qquad (2),$$

wherein the positive electrode tab leads-out from a first side surface of side surfaces, of the battery device, to the outside of the exterior material, and wherein the negative electrode tab leads-out from the first side surface of the side surfaces, of the battery device, to the outside of the exterior material; and a first insulating member on the first side surface of the side surfaces of the battery device, and between the positive electrode tab and the negative electrode tab, wherein the first insulating member comprises a plurality of circular shape holes.

2. The secondary battery according to claim 1, wherein a first depth dc of the positive electrode current collector exposed portion and a second depth Dc of the positive electrode active material layer satisfy equation (3), and a third depth da of the negative electrode current collector exposed portion and a fourth depth Da of the negative electrode active material layer satisfy equation (4)

$$0.02<(dc/Dc)\leq0.40 \qquad (3)$$

$$0.02<(da/Da)\leq0.40 \qquad (4).$$

3. The secondary battery according to claim 1, wherein a bonding area Sc between the positive electrode tab and the positive electrode current collector exposed portion, a width Tc of the positive electrode tab, a thickness Hc of the positive electrode tab, and the thickness B of the battery device satisfy equation (5), and wherein a bonding area Sa between the negative electrode tab and the negative electrode current collector exposed portion, a width Ta of the negative electrode tab, a thickness Ha of the negative electrode tab, and the thickness B of the battery device satisfy equation (6)

$$Hc\leq Sc/Tc\leq B \qquad (5)$$

$$Hc\leq Sa/Ta\leq B \qquad (6).$$

4. The secondary battery according to claim 1, further comprising:

a positive electrode side sealant that covers the positive electrode tab; and a negative electrode side sealant that covers the negative electrode tab, wherein the positive electrode current collector exposed portion is bent in a first direction orthogonal to a first surface of each of the positive electrode and the negative electrode, the positive electrode tab includes a positive electrode side connection portion connected to the positive electrode current collector exposed portion, and a positive electrode side lead-out portion led-out to the outside of the exterior material, and the positive electrode side connection portion is bent together with the positive electrode side sealant in a second direction orthogonal to a second surface of each of the positive electrode and the negative electrode, the positive electrode side connection portion is connected to a first surface, which is opposite to the battery device, of the positive electrode current collector exposed portion, the negative electrode current collector exposed portion is bent in the first direction orthogonal to the first surface of each of the positive electrode and the negative electrode, the negative electrode tab includes a negative electrode side connection portion connected to the negative electrode current collector exposed portion, and a negative electrode side lead-out portion led-out to the outside of the exterior material, and the negative electrode side connection portion is bent together with the negative electrode side sealant in a third direction orthogonal to a third surface of each of the positive electrode and the negative electrode, and the negative electrode side connection portion is connected to a second surface, which is opposite to the battery device, of the negative electrode current collector exposed portion.

5. The secondary battery according to claim 4, further comprising a second insulating member between the battery device and the positive electrode side connection portion of the positive electrode tab.

6. The secondary battery according to claim 1, wherein the positive electrode and the negative electrode are laminated such that the positive electrode current collector exposed portion faces in a first direction and the negative electrode current collector exposed portion faces in a second direction.

7. The secondary battery according to claim 1, wherein the separator is folded in a zigzag fashion, and the positive electrode and the negative electrode are between folded portions of the separator, respectively.

8. The secondary battery according to claim 7, wherein the negative electrode is between a pair of separators, and the negative electrode and the pair of separators are folded in the zigzag fashion, and the positive electrode is between the folded portions of the separator.

9. The secondary battery according to claim 1, wherein the battery device comprises a first main surface, a second main surface opposite to the first main surface, and the side surfaces between the first main surface and the second main surface, wherein the side surfaces include a second side surface, a third side surface opposite to the second side surface, and the first side surface between the second side surface and the third side surface, the positive electrode current collector exposed portion is at the second side surface, and the negative electrode current collector exposed portion is at the third side surface, the positive electrode tab is connected to the positive electrode current collector exposed portion at the second side surface, the negative electrode tab is connected to the negative electrode current collector exposed portion at the third side surface.

10. The secondary battery according to claim 9,
wherein the positive electrode tab includes a first bent portion that is bent to follow the second side surface and the first side surface, and a led-out portion that is led-out in a direction orthogonal to the first side surface, and
the negative electrode tab includes a second bent portion that is bent to follow the third side surface and the first side surface, and a lead-out portion that is led-out in the direction orthogonal to the first side surface.

11. The secondary battery according to claim 10, further comprising:
a second insulating member between the first bent portion of the positive electrode tab, and the second side surface, and
a third insulating member between the second bent portion of the negative electrode tab, and the third side surface.

12. The secondary battery according to claim 10, further comprising:
a second insulating member between the first bent portion of the positive electrode tab and the exterior material, and
a third insulating member between the second bent portion of the negative electrode tab and the exterior material.

13. The secondary battery according to claim 1, wherein the positive electrode tab and the negative electrode tab comprise an alloy of copper (Cu) and aluminum (Al).

14. The secondary battery according to claim 1, further comprising a covering layer that covers the positive electrode tab and the negative electrode tab,
wherein a thickness of at least one of the positive electrode tab or the negative electrode tab is in a range of 50 μm to 400 μm.

15. The secondary battery according to claim 14, wherein a thickness of the covering layer is in a range of 0.1 μm and 3 μm.

* * * * *